(12) United States Patent
Brown Elliott et al.

(10) Patent No.: US 8,605,017 B2
(45) Date of Patent: Dec. 10, 2013

(54) HIGH DYNAMIC CONTRAST DISPLAY SYSTEM HAVING MULTIPLE SEGMENTED BACKLIGHT

(75) Inventors: Candice Hellen Brown Elliott, Santa Rosa, CA (US); Michael Francis Higgins, Cazadero, CA (US)

(73) Assignee: Samsung Display Co., Ltd. (KR)

( * ) Notice: Subject to any disclaimer, the term of this patent is extended or adjusted under 35 U.S.C. 154(b) by 484 days.

(21) Appl. No.: 12/303,102

(22) PCT Filed: May 14, 2007

(86) PCT No.: PCT/US2007/068885
§ 371 (c)(1),
(2), (4) Date: Dec. 1, 2008

(87) PCT Pub. No.: WO2007/143340
PCT Pub. Date: Dec. 13, 2007

(65) Prior Publication Data
US 2009/0174638 A1  Jul. 9, 2009

Related U.S. Application Data

(60) Provisional application No. 60/803,855, filed on Jun. 2, 2006, provisional application No. 60/828,594, filed on Oct. 6, 2006, provisional application No. 60/891,668, filed on Feb. 26, 2007.

(51) Int. Cl.
| G09G 3/36 | (2006.01) |
| G09G 5/10 | (2006.01) |
| G09G 5/02 | (2006.01) |
| H04N 5/235 | (2006.01) |
| H04N 9/73 | (2006.01) |
| G02F 1/1335 | (2006.01) |
| G03B 21/00 | (2006.01) |
| G03B 21/16 | (2006.01) |

(52) U.S. Cl.
USPC ............. 345/88; 345/102; 345/690; 345/691; 345/694; 348/222.1; 348/228.1; 349/64; 349/112; 353/31; 353/52

(58) Field of Classification Search
USPC ............. 345/88, 694, 426, 634, 83, 590, 420, 345/531, 613, 440, 474, 204, 87, 98, 99, 345/589, 600, 690, 102, 76–77; 315/169.3, 315/291, 292; 257/40; 348/253, 458, 222.1; 359/245, 634, 891, 247, 298, 9, 114, 359/232; 362/231, 272, 744; 382/260, 254, 382/299, 222.1, 162, 167, 275, 298; 353/31, 52; 600/443, 437; 715/704, 715/764; 463/13; 340/465; 700/9; 250/559.04, 332, 208.1; 367/11; 379/88.05; 331/57; 349/96, 114, 115, 349/64; 313/501; 702/69; 356/218, 124.5; 428/690; 358/518

See application file for complete search history.

(56) References Cited

U.S. PATENT DOCUMENTS 4,470,064 A * 9/1984 Michener ...................... 348/194
4,602,277 A * 7/1986 Guichard ................... 348/228.1
(Continued)

FOREIGN PATENT DOCUMENTS

| CN | 1693968 A | 11/2005 |
| EP | 1569195 | 5/2012 |
(Continued)

OTHER PUBLICATIONS

European Search Report, EP6770785.1-2205, Nov. 9, 2009, 9 pages.
(Continued)

Primary Examiner — Quan-Zhen Wang
Assistant Examiner — Lin Li
(74) Attorney, Agent, or Firm — Innovation Counsel LLP

(57) ABSTRACT

In one embodiment, a display system includes a subpixelated display panel and a backlight array of individually controllable multi-color light emitters. When the display panel comprises a multi-primary subpixel arrangement having a white (clear) subpixel, the backlight control techniques allows the white subpixel to function as a saturated primary display color. In another embodiment, the display system may calculate a set of virtual primaries for a given image and process the image using a novel field sequential control employing the virtual primaries. In another embodiment, a display system comprises a segmented backlight comprising: a plurality of N+M light guides, said light guides forming a N×M intersections; a plurality of N+M individually addressable light emitter units, each of said N+M light emitter unit being associated with and optically connected to one of said N+M light guide respectively.

31 Claims, 29 Drawing Sheets

(56) References Cited

U.S. PATENT DOCUMENTS

| | | | |
|---|---|---|---|
| 5,046,827 A * | 9/1991 | Frost et al. | 349/112 |
| 6,111,560 A * | 8/2000 | May | 345/102 |
| 6,215,564 B1 | 4/2001 | Okino | |
| 7,018,046 B2 * | 3/2006 | Childers et al. | 353/31 |
| 7,714,824 B2 * | 5/2010 | Roth | 345/88 |
| 7,916,159 B2 * | 3/2011 | Shiomi | 345/690 |
| 2001/0005243 A1 | 6/2001 | Yamaguchi | |
| 2001/0035853 A1 | 11/2001 | Hoelen et al. | |
| 2002/0057253 A1 | 5/2002 | Lim et al. | |
| 2002/0060662 A1 | 5/2002 | Hong | |
| 2002/0158978 A1 * | 10/2002 | Gann et al. | 348/272 |
| 2002/0163791 A1 | 11/2002 | Hoelen et al. | |
| 2004/0046725 A1 | 3/2004 | Lee | |
| 2004/0174389 A1 * | 9/2004 | Ben-David et al. | 345/694 |
| 2004/0246275 A1 | 12/2004 | Yoshihara et al. | |
| 2004/0263528 A1 | 12/2004 | Murdoch et al. | |
| 2004/0264212 A1 | 12/2004 | Chung et al. | |
| 2005/0140612 A1 | 6/2005 | Baek | |
| 2005/0231457 A1 | 10/2005 | Yamamoto et al. | |
| 2005/0248520 A1 | 11/2005 | Feng et al. | |
| 2005/0270796 A1 | 12/2005 | Ichikawa et al. | |
| 2006/0152597 A1 * | 7/2006 | Shimizu | 348/222.1 |
| 2006/0284805 A1 | 12/2006 | Baek | 345/88 |
| 2006/0285217 A1 * | 12/2006 | Roth | 359/634 |
| 2007/0085789 A1 * | 4/2007 | De Vaan | 345/88 |
| 2007/0103646 A1 * | 5/2007 | Young | 353/52 |
| 2007/0139352 A1 * | 6/2007 | Pugh et al. | 345/102 |
| 2007/0146689 A1 * | 6/2007 | Araki et al. | 356/124.5 |
| 2007/0257944 A1 * | 11/2007 | Miller et al. | 345/694 |
| 2007/0296835 A1 * | 12/2007 | Olsen et al. | 348/234 |
| 2008/0094426 A1 * | 4/2008 | Kimpe | 345/691 |
| 2008/0204479 A1 * | 8/2008 | Seetzen | 345/690 |
| 2008/0291362 A1 * | 11/2008 | Whitehead | 349/64 |

FOREIGN PATENT DOCUMENTS

| | | | | |
|---|---|---|---|---|
| JP | 2002328631 | | 11/2002 | |
| JP | 2003241714 | | 8/2003 | |
| JP | 2005070421 | | 3/2005 | |
| TW | 546990 | | 8/2003 | |
| TW | 558899 | | 10/2003 | |
| TW | 200415944 A | | 8/2004 | |
| WO | WO 2006/045585 | * | 4/2006 | G09G 5/10 |
| WO | WO 2006045585 | * | 4/2006 | G09G 5/10 |

OTHER PUBLICATIONS

European Patent Application No. 11194579.6; Extended European Search Report, Aug. 6, 2013.

Konno et al.; "40.2: RBG Color Control System for LED Backlights in IPS-LCD TVs"; Materials Research Laboratory, Hitachi Ltd., 7-1-1, Omika-cho, Hitachi, Ibaraki 319-1292, Japan; SID 05 Digest 2005; pp. 1380-1383.

Berquist et al.; "49.2: Fields-Sequential-Colour Display with Adaptive Gamut"; Multimedia Technologies Laboratory, Nokia Research Centre, Tokya Japan; SID 06 Digest 2006; pp. 1594-1597.

European Patent Application No. 11194583.8; Extended European Search Report, Aug. 6, 2013.

European Patent Application No. 11194586.1; Extended European Search Report, Aug. 6, 2013.

\* cited by examiner

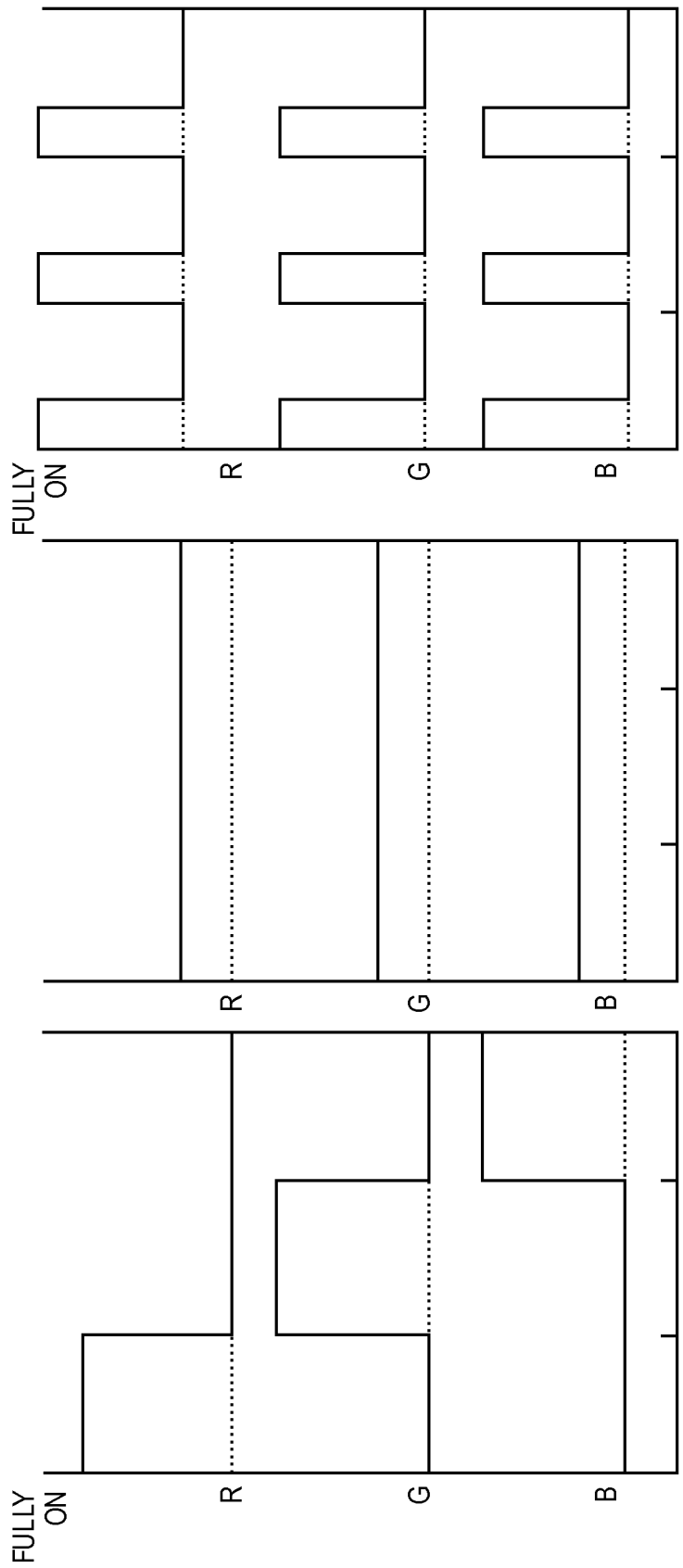

HIGH DYNAMIC CONTRAST DISPLAY SYSTEM HAVING MULTIPLE SEGMENTED BACKLIGHT

CROSS REFERENCE TO RELATED APPLICATIONS

This application claims the benefit of U.S. Provisional Application 60/803,855 entitled COLOR IMAGING BACKLIGHT FOR COLOR DISPLAY SYSTEMS AND METHODS OF OPERATION, filed on Jun. 2, 2006, U.S. Provisional Application 60/828,594 entitled DISPLAY SYSTEMS AND METHODS HAVING DYNAMIC VIRTUAL PRIMARIES, filed on Oct. 6, 2006, and U.S. Provisional Application 60/891,668 entitled HIGH DYNAMIC CONTRAST DISPLAY SYSTEM HAVING MULTIPLE SEGMENTED BACKLIGHT, filed on Feb. 26, 2007, which are hereby incorporated by reference herein in their entirety.

FIELD OF INVENTION

The present application is related to display systems, and more particularly, to techniques for utilizing and controlling light from the backlighting component in a display system.

BACKGROUND

Novel sub-pixel arrangements are disclosed for improving the cost/performance curves for image display devices in the following commonly owned United States Patents and Patent Applications including: (1) U.S. Pat. No. 6,903,754 ("the '754 patent") entitled "ARRANGEMENT OF COLOR PIXELS FOR FULL COLOR IMAGING DEVICES WITH SIMPLIFIED ADDRESSING;" (2) United States Patent Publication No. 2003/0128225 ("the '225 application") having application Ser. No. 10/278,353 and entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) United States Patent Publication No. 2003/0128179 ("the '179 application") now issued as U.S. Pat. No. 7,417,648 and entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002; (4) United States Patent Publication No. 2004/0051724 ("the '724 application") having application Ser. No. 10/243,094 and entitled "IMPROVED FOUR COLOR ARRANGEMENTS AND EMITTERS FOR SUB-PIXEL RENDERING," filed Sep. 13, 2002; (5) United States Patent Publication No. 2003/0117423 ("the '423 application") having application Ser. No. 10/278,328 and entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) United States Patent Publication No. 2003/0090581 ("the '581 application") now issued as U.S. Pat. No. 7,283,142 and entitled "COLOR DISPLAY HAVING HORIZONTAL SUB-PIXEL ARRANGEMENTS AND LAYOUTS," filed Oct. 22, 2002; and (7) United States Patent Publication No. 2004/0080479 ("the '479 application") having application Ser. No. 10/347,001 and entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003. Each of the aforementioned '225, '179, '724, '423, '581, and '479 published applications and U.S. Pat. No. 6,903,754 are hereby incorporated by reference herein in its entirety.

For certain subpixel repeating groups having an even number of subpixels in a horizontal direction, systems and techniques to affect improvements, e.g. polarity inversion schemes and other improvements, are disclosed in the following commonly owned United States patent documents: (1) United States Patent Publication No. 2004/0246280 ("the '280 application") having application Ser. No. 10/456,839 and entitled "IMAGE DEGRADATION CORRECTION IN NOVEL LIQUID CRYSTAL DISPLAYS"; (2) United States Patent Publication No. 2004/0246213 ("the '213 application") (U.S. patent application Ser. No. 10/455,925) entitled "DISPLAY PANEL HAVING CROSSOVER CONNECTIONS EFFECTING DOT INVERSION"; (3) United States Patent Publication No. 2004/0246381 ("the '381 application") now issued as U.S. Pat. No. 7,218,301 and entitled "SYSTEM AND METHOD OF PERFORMING DOT INVERSION WITH STANDARD DRIVERS AND BACKPLANE ON NOVEL DISPLAY PANEL LAYOUTS"; (4) United States Patent Publication No. 2004/0246278 ("the '278 application") now issued as U.S. Pat. No. 7,209,105 and entitled "SYSTEM AND METHOD FOR COMPENSATING FOR VISUAL EFFECTS UPON PANELS HAVING FIXED PATTERN NOISE WITH REDUCED QUANTIZATION ERROR"; (5) United States Patent Publication No. 2004/0246279 ("the '279 application") now issued as U.S. Pat. No. 7,187,353 entitled "DOT INVERSION ON NOVEL DISPLAY PANEL LAYOUTS WITH EXTRA DRIVERS"; (6) United States Patent Publication No. 2004/0246404 ("the '404 application") now issued as U.S. Pat. No. 7,397,455 and entitled "LIQUID CRYSTAL DISPLAY BACKPLANE LAYOUTS AND ADDRESSING FOR NON-STANDARD SUBPIXEL ARRANGEMENTS"; (7) United States Patent Publication No. 2005/0083277 ("the '277 application") having application Ser. No. 10/696,236 entitled "IMAGE DEGRADATION CORRECTION IN NOVEL LIQUID CRYSTAL DISPLAYS WITH SPLIT BLUE SUBPIXELS", filed Oct. 28, 2003; and (8) United States Patent Publication No. 2005/0212741 ("the '741 application") now issued as U.S. Pat. No. 7,268,758 and entitled "IMPROVED TRANSISTOR BACKPLANES FOR LIQUID CRYSTAL DISPLAYS COMPRISING DIFFERENT SIZED SUBPIXELS", filed Mar. 23, 2004. Each of the aforementioned '280, '213, '381, '278, '404, '277 and '741 published applications are hereby incorporated by reference herein in its entirety.

These improvements are particularly pronounced when coupled with sub-pixel rendering (SPR) systems and methods further disclosed in the above-referenced U.S. Patent documents and in commonly owned United States Patents and Patent Applications: (1) United States Patent Publication No. 2003/0034992 ("the '992 application") now issued as U.S. Pat. No. 7,123,277 and entitled "CONVERSION OF A SUB-PIXEL FORMAT DATA TO ANOTHER SUB-PIXEL DATA FORMAT," filed Jan. 16, 2002; (2) United States Patent Publication No. 2003/0103058 ("the '058 application") now issued as U.S. Pat. No. 7,221,381 entitled "METHODS AND SYSTEMS FOR SUB-PIXEL RENDERING WITH GAMMA ADJUSTMENT," filed May 17, 2002; (3) United States Patent Publication No. 2003/0085906 ("the '906 application") now issued as U.S. Pat. No. 7,184,066 and entitled "METHODS AND SYSTEMS FOR SUB-PIXEL RENDERING WITH ADAPTIVE FILTERING," filed Aug. 8, 2002; (4) United States Publication No. 2004/0196302 ("the '302 application") having application Ser. No. 10/379,767 and entitled "SYSTEMS AND METHODS FOR TEMPO- RAL SUB-PIXEL RENDERING OF IMAGE DATA" filed Mar. 4, 2003; (5) United States Patent Publication No. 2004/0174380 ("the '380 application") now issued as U.S. Pat. No. 7,167,186 and entitled "SYSTEMS AND METHODS FOR MOTION ADAPTIVE FILTERING," filed Mar. 4, 2003; (6) U.S. Pat. No. 6,917,368 ("the '368 patent") entitled "SUB-PIXEL RENDERING SYSTEM AND METHOD FOR IMPROVED DISPLAY VIEWING ANGLES"; and (7) United States Patent Publication No. 2004/0196297 ("the '297 application") now issued as U.S. Pat. No. 7,352,374 and entitled "IMAGE DATA SET WITH EMBEDDED PRE-SUBPIXEL RENDERED IMAGE" filed Apr. 7, 2003. Each of the aforementioned '992, '058, '906, '302, 380 and '297 applications and the '368 patent are hereby incorporated by reference herein in its entirety.

Improvements in gamut conversion and mapping are disclosed in commonly owned United States Patents and co-pending United States Patent Applications: (1) U.S. Pat. No. 6,980,219 ("the '219 patent") entitled "HUE ANGLE CALCULATION SYSTEM AND METHODS"; (2) United States Patent Publication No. 2005/0083341 ("the '341 application") having application Ser. No. 10/691,377 and entitled "METHOD AND APPARATUS FOR CONVERTING FROM SOURCE COLOR SPACE TO TARGET COLOR SPACE", filed Oct. 21, 2003; (3) United States Patent Publication No. 2005/0083352 ("the '352 application") having application Ser. No. 10/691,396 and entitled "METHOD AND APPARATUS FOR CONVERTING FROM A SOURCE COLOR SPACE TO A TARGET COLOR SPACE", filed Oct. 21, 2003; and (4) United States Patent Publication No. 2005/0083344 ("the '344 application") now issued as U.S. Pat. No. 7,176,935 and entitled "GAMUT CONVERSION SYSTEM AND METHODS" filed Oct. 21, 2003. Each of the aforementioned '341, '352 and '344 applications and the '219 patent is hereby incorporated by reference herein in its entirety.

Additional advantages have been described in (1) United States Patent Publication No. 2005/0099540 ("the '540 application") now issued as U.S. Pat. No. 7,084,923 and entitled "DISPLAY SYSTEM HAVING IMPROVED MULTIPLE MODES FOR DISPLAYING IMAGE DATA FROM MULTIPLE INPUT SOURCE FORMATS", filed Oct. 28, 2003; and in (2) United States Patent Publication No. 2005/0088385 ("the '385 application") having application Ser. No. 10/696,026 and entitled "SYSTEM AND METHOD FOR PERFORMING IMAGE RECONSTRUCTION AND SUB-PIXEL RENDERING TO EFFECT SCALING FOR MULTI-MODE DISPLAY" filed Oct. 28, 2003, each of which is hereby incorporated herein by reference in its entirety.

Additionally, each of these co-owned and co-pending applications is herein incorporated by reference in its entirety: (1) United States Patent Publication No. 2005/0225548 ("the '548 application") having application Ser. No. 10/821,387 and entitled "SYSTEM AND METHOD FOR IMPROVING SUB-PIXEL RENDERING OF IMAGE DATA IN NON-STRIPED DISPLAY SYSTEMS"; (2) United States Patent Publication No. 2005/0225561 ("the '561 application") now issued as U.S. Pat. No. 7,301,543 and entitled "SYSTEMS AND METHODS FOR SELECTING A WHITE POINT FOR IMAGE DISPLAYS"; (3) United States Patent Publication No. 2005/0225574 ("the '574 application") and United States Patent Publication No. 2005/0225575 ("the '575 application") having application Ser. Nos. 10/821,353 and 10/961,506 respectively, and both entitled "NOVEL SUBPIXEL LAYOUTS AND ARRANGEMENTS FOR HIGH BRIGHTNESS DISPLAYS"; (4) United States Patent Publication No. 2005/0225562 ("the '562 application") having application Ser. No. 10/821,306 and entitled "SYSTEMS AND METHODS FOR IMPROVED GAMUT MAPPING FROM ONE IMAGE DATA SET TO ANOTHER"; (5) United States Patent Publication No. 2005/0225563 ("the '563 application") now issued as U.S. Pat. No. 7,248,268 and entitled "IMPROVED SUBPIXEL RENDERING FILTERS FOR HIGH BRIGHTNESS SUBPIXEL LAYOUTS"; and (6) United States Patent Publication No. 2005/0276502 ("the '502 application") having application Ser. No. 10/866,447 and entitled "INCREASING GAMMA ACCURACY IN QUANTIZED DISPLAY SYSTEMS."

Additional improvements to, and embodiments of, display systems and methods of operation thereof are described in: (1) Patent Cooperation Treaty (PCT) Application No. PCT/US 06/12768, entitled "EFFICIENT MEMORY STRUCTURE FOR DISPLAY SYSTEM WITH NOVEL SUB-PIXEL STRUCTURES" filed Apr. 4, 2006, and published in the United States as United States Patent Application Publication 2008/0170083; (2) Patent Cooperation Treaty (PCT) Application No. PCT/US 06/12766, entitled "SYSTEMS AND METHODS FOR IMPLEMENTING LOW-COST GAMUT MAPPING ALGORITHMS" filed Apr. 4, 2006, and published in the United States as United States Patent Application Publication 2008/0150958; (3) U.S. patent application Ser. No. 11/278,675, entitled "SYSTEMS AND METHODS FOR IMPLEMENTING IMPROVED GAMUT MAPPING ALGORITHMS" filed Apr. 4, 2006, and published as United States Patent Application Publication 2006/0244686; (4) Patent Cooperation Treaty (PCT) Application No. PCT/US 06/12521, entitled "PRE-SUBPIXEL RENDERED IMAGE PROCESSING IN DISPLAY SYSTEMS" filed Apr. 4, 2006, and published in the United States as United States Patent Application Publication 2008/0186325; and (5) Patent Cooperation Treaty (PCT) Application No. PCT/US 06/19657, entitled "MULTIPRIMARY COLOR SUBPIXEL RENDERING WITH METAMERIC FILTERING" filed on May 19, 2006 and published in the United States as United States Patent Application Publication 200Y/EEEEEEE (referred to below as the "Metamer Filtering application".) Each of these co-owned applications is also herein incorporated by reference in their entirety.

A display system with a light emitting component or source, referred to as a backlight, functions as a dynamic light modulation device that absorbs or transmits optical energy from the light emitting source in order to provide images for viewing by a user. A backlit liquid crystal display (LCD) device is an example of such a display system. The optical energy emitted by the light emitting source is the active source of light that creates the displayed image seen by a user viewing an image on the display panel of an LCD. In display systems that utilize color filters to produce the colors in an image, the typically relatively narrow band color filters subtract optical energy from the light emitted by the display system's light emitting source to create the appearance of colors. The color filters are disposed on the display panel to correspond to various sub-pixel layouts such as those described in the applications referenced above, including those illustrated in FIGS. 3 and 6-9 herein. It has been estimated that as little as four to ten percent (4-10%) of the illumination from a backlight source is actually emitted from the display as light viewed by the viewer of the image. In an LCD display, the TFT array and color filter substrate are typically the largest illumination barriers.

Arrays of light emitting diodes (LEDs) are used as light emitting sources in backlit display systems. U.S. Pat. No.

6,923,548 B2 discloses a backlight unit in a liquid crystal display that includes a plurality of lamps or chips arranged such that LED chips realizing R, G, and B colors are built in the respective lamps or chips. U.S. Pat. No. 6,923,548 B2 describes the backlight unit as realizing high brightness and providing a thin backlight unit. U.S. Pat. No. 7,002,547, which is hereby incorporated by reference herein, discloses a backlight control device for a transmissive type or for a transreflective type liquid crystal display equipped with LEDs as a backlight. The backlight control device includes an LED driving circuit connected to a power supply circuit for driving the LED, and a current control device that detects brightness around the liquid crystal display for controlling the driving current for the LED according to the detected brightness. Hideyo Ohtsuki et al., in a paper entitled "18.1-inch XGA TFT-LCD with wide color reproduction using high power led-backlighting," published in the Proc. of the Society for Information Display International Symposium, in 2002, disclose an 18.1 inch XGA TFT-LCD module using an LED-backlighting unit Ohtsuki et al disclose that a side-edge type backlight is applied and two LED strips are located on the top and bottom edges of a light-pipe. Each LED strip arranges multiple red, green and blue LEDs. The lights from the red, green and blue LEDs are mixed and injected into the light-pipe. The brightness of the red, green and blue LEDs can be dimmed independently by a control circuit. Ohtsuki et al. disclose that the color-filter of this LCD panel is well-tuned to get higher color saturation.

U.S. Pat. No. 6,608,614 B1 entitled "Led-based LCD backlight with extended color space" discloses a backlight for a liquid-crystal display that includes a first LED array that provides light with a first chromaticity and a second LED array that provides light with a second chromaticity. A combining element combines the light from the first LED array and the second LED array and directs the combined light toward the liquid crystal display. A control system is operationally connected to the second LED array. The controller adjusts the brightness of at least one LED in the second LED array to thereby adjust the chromaticity of the combined light.

US 2005/0162737 A1 (hereafter, "the '737 publication"), entitled "High Dynamic Range Display Devices," discloses a display having a screen which incorporates a light modulator and which is illuminated with light from a light source comprising an array of controllable light-emitters. The controllable-emitters and elements of the light modulator may be controlled to adjust the intensity of light emanating from corresponding areas on the screen. FIG. 15 shows a section through a display 60 in which a rear-projection screen 53 comprising a diffusing layer 22 is illuminated by an array 50 of LEDs 52. The brightness of each LED 52 is controlled by a controller 39. Screen 53 includes a light modulator 20. The rear face of light modulator 20 is illuminated by LED array 50. FIG. 14 is a schematic front view of a portion of display 60 for a case where controllable elements (pixels) 42 of light modulator 20 correspond to each LED 52. Each of the controllable elements 42 may comprise a plurality of colored sub-pixels. The '737 publication discloses that LEDs 52 may be arranged in any suitable manner, and shows two likely arrangements of LEDs 52 as being rectangular and hexagonal arrays. A diffuser 22A in conjunction with the light-emitting characteristics of LEDs 52 causes the variation in intensity of light from LEDs 52 over the rear face of light modulator 20 to be smooth. The '737 publication further discloses that light modulator 20 may be a monochrome light modulator, or a high resolution color light modulator. Light modulator 20 may comprise, for example, a LCD array. The '737 publication discloses that display 60 can be quite thin. For example, display 60 may be 10 centimeters or less in thickness. US 2005/0162737 A1 is hereby incorporated by reference herein.

BRIEF DESCRIPTION OF THE DRAWINGS

The organization and methods of operation of the display systems and techniques disclosed herein are best understood from the following description of several illustrated embodiments when read in connection with the following drawings in which the same reference numbers are used throughout the drawings to refer to the same or like parts:

FIGS. 20A, 20B, and 20C are diagrammatical representations of methods of using virtual primaries.

DETAILED DESCRIPTION

Figure 1A:
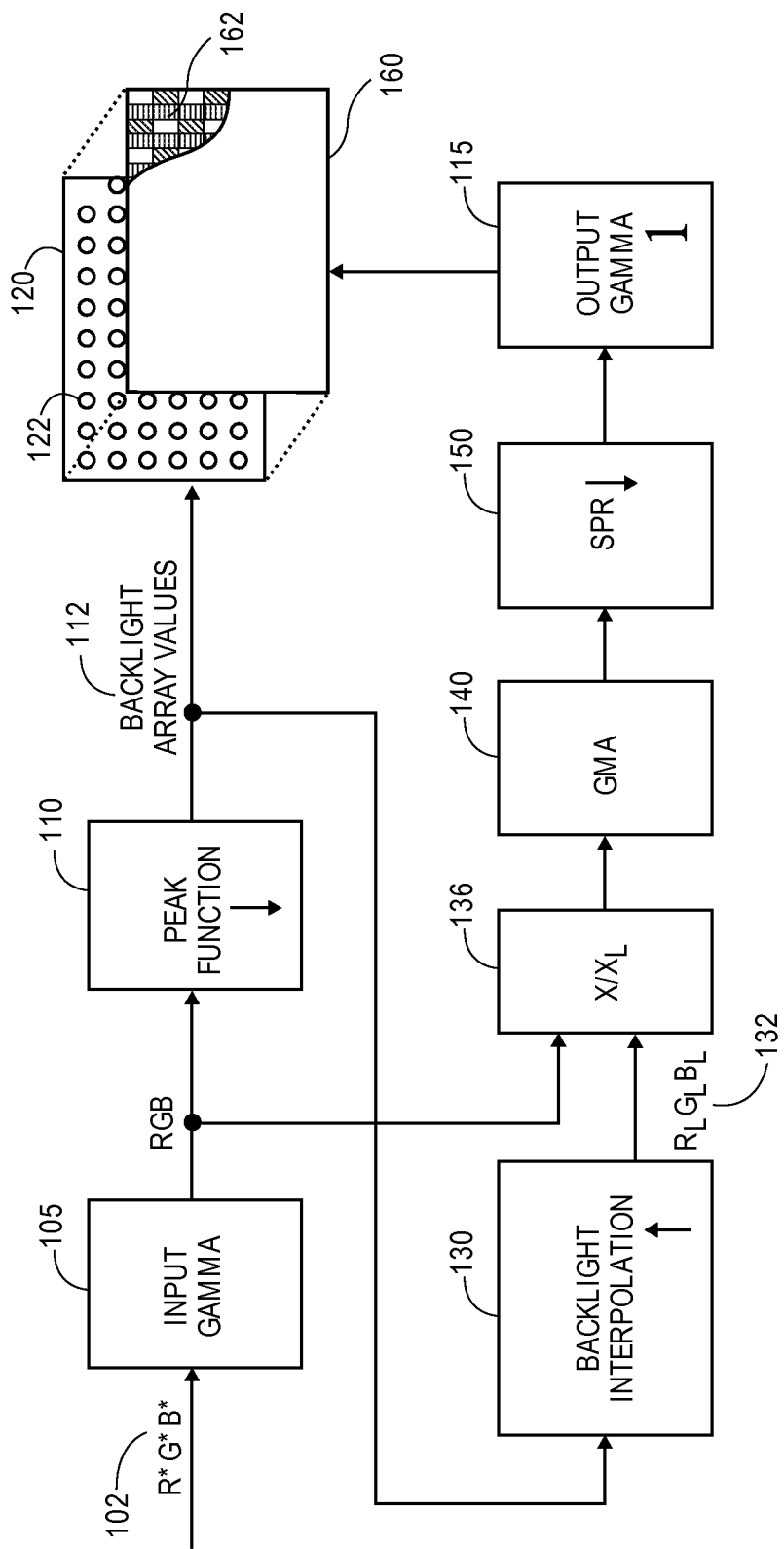
FIG. 1A is a block diagram of selected components of a first embodiment of a multi-primary display system with a first backlight array of multi-color light emitters.

The use of an array of light emitters, such as light emitting diodes (LED), as a backlight in a subpixelated display system generally provides higher purity color points that can be filtered for reasonably high color purity on the display when compared to other backlight technologies. However, since contrast is not infinite (i.e., the black level is not perfectly black) in some types of display panels (e.g., LCDs), there is typically some bleed of color from the off-state subpixels that will limit the saturation of the color. In addition, the color filters themselves may not have good color purity, and may allow some unwanted light to pass through from other colored light emitters. In a display system in which the individual light emitters disposed in a backlight array can be independently addressed, adjustment of the color of the backlight is possible. This ability to adjust the color of the backlight provides an additional degree of freedom that may be used to increase the dynamic range and color purity of the display. It may also increase the effectiveness of the subpixel rendering algorithms by optimizing the spread of luminance information on the display panel subpixels with the color temperature, either globally or locally, of the light emitted from the backlight array.

The discussion proceeds now to an overview of the components of the display system, followed by a description of techniques for controlling the backlight array, and concluding with a discussion of techniques for implementing backlight control that show the interaction among aspects of the human vision system, the colors in the particular image being displayed and the particular subpixel layout of the display panel.

In the discussion that follows, a display system includes a display panel on which color images are formed by combining the individual colors disposed on a color filter substrate in an arrangement, or layout, referred to as a subpixel repeating group. The term "primary color" refers to each of the colors that occur in the subpixel repeating group. When a subpixel repeating group is repeated across a display panel to form a device with the desired matrix resolution, the display panel is said to be substantially comprised of the subpixel repeating group. In this discussion, a display panel is described as "substantially" comprising a subpixel repeating group because it is understood that size and/or manufacturing factors or constraints of the display panel may result in panels in which the subpixel repeating group is incomplete at one or more of the panel edges. By way of example, a display panel substantially comprised of a subpixel repeating group of red, green and blue (RGB) colors disposed on the color filter substrate in vertical columns (i.e., the conventional RGB stripe configuration) has three primary colors of red, green and blue, while a display panel substantially comprising subpixel repeating group 801 of FIG. 8 including magenta subpixels 809, and green subpixels 808 has two primary colors of magenta and green. Reference to display systems using more than three primary subpixel colors to form color images are referred to as "multi-primary" display systems. In a display panel having a subpixel repeating group that includes a white (clear) subpixel, the white subpixel represents a primary color referred to as white (W) or "clear", and so a display system with a display panel having a subpixel repeating group including RGBW subpixels is a multi-primary display system.

The term "emitter" is sometimes used in earlier ones of the above-referenced patent applications to refer to an individual subpixel of a particular color. In the discussion herein, "light emitter" refers to a light source disposed in the backlight array of the display system. The term "backlight-controlled (BC) primary color" refers to the color of the light that passes through a white (W) subpixel that is produced by one or more light emitters in an array of light emitters functioning as a backlight in the display system.

First Embodiment of a Display System

Figure 3:
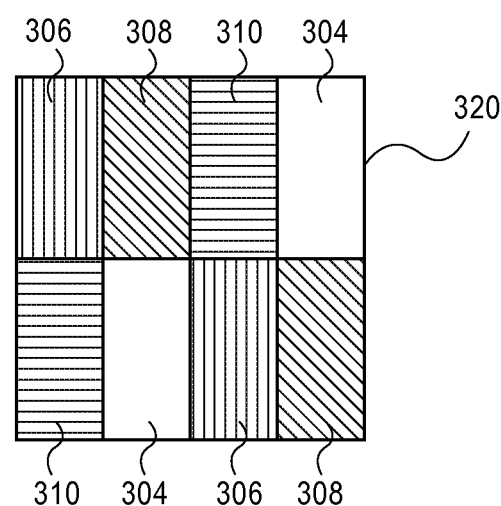
FIG. 3 shows an eight subpixel repeating group for a four color display panel.

FIG. 1A is a block diagram of an exemplary display system 100 having a spatial light modulator panel 160 for producing images Panel 160 is a subpixelated display panel substantially comprising a subpixel repeating group 162 as shown, for example in any one of FIGS. 3, 6, 7, 8 and 9. FIG. 3 illustrates a subpixel repeating group 320 suitable for use on panel 160. Subpixel repeating group 320 includes red subpixels 306, green subpixels 308, blue subpixels 310, and white (i.e., clear, with no color filter) subpixels 304. Many other variations of RGBW subpixel repeating group 320 are possible, as described in US Patent Application Publication 2005/0225574 referenced above. For example, subpixel repeating group 620 of FIG. 6 comprises two red subpixels 606 and two green subpixels 608 on a checkerboard with white subpixel 604 and blue subpixel 610 between them. Note that in the figures showing subpixel repeating groups or portions of display panels showing subpixel layouts, the hatching lines used to represent the subpixel colors are used consistently across all figures.

Figure 7:
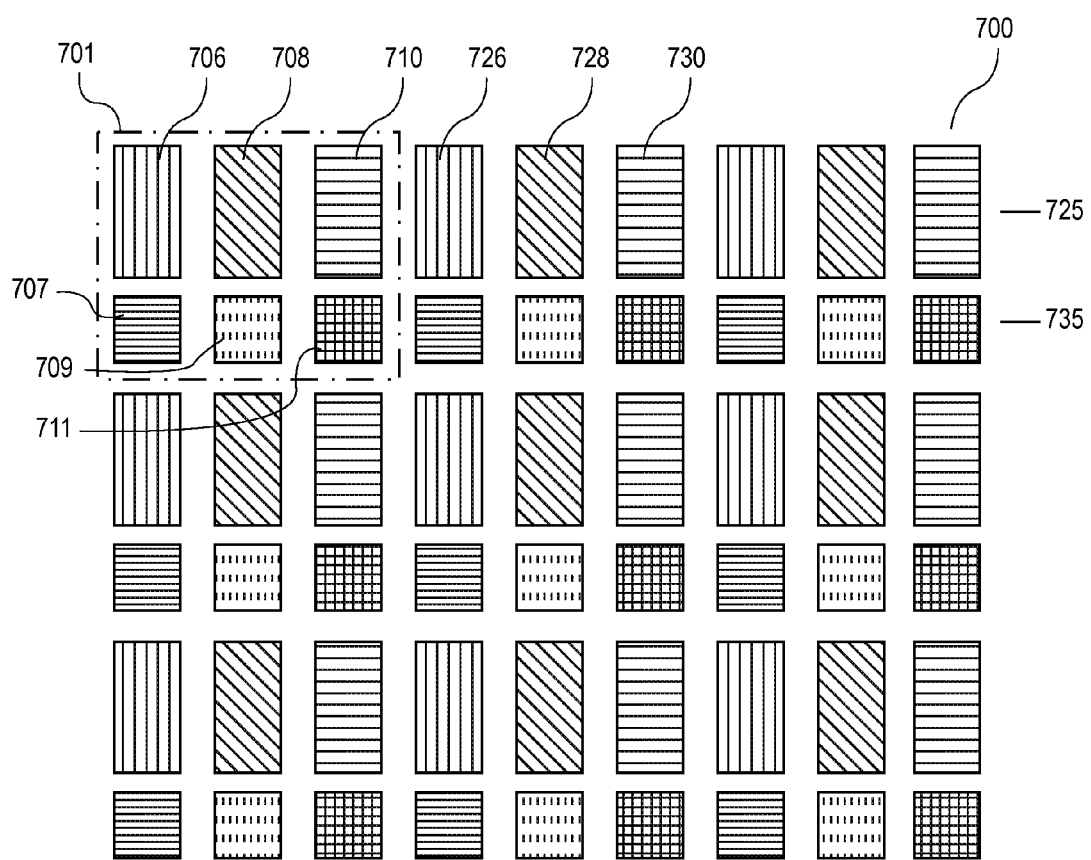
FIG. 7 shows a portion of a six color display panel that includes a six subpixel repeating group.
Figure 9:
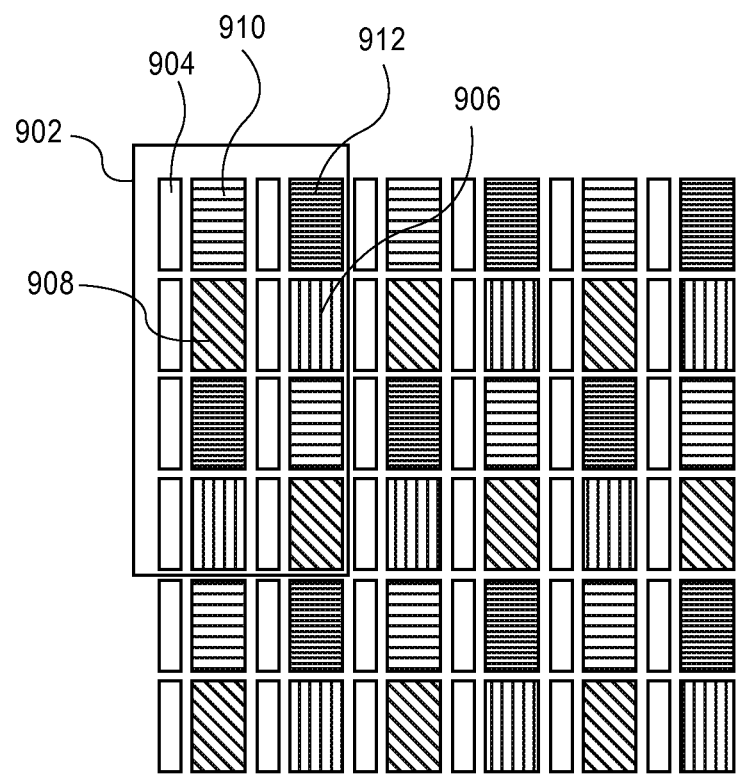
FIG. 9 shows a portion of a display panel that includes a sixteen subpixel repeating group using rectangular subpixels in five colors.

It is understood that the techniques disclosed for controlling the backlight of the display system as described below apply equally to display systems having different, fewer, or more colors than the RGBW subpixel repeating group of FIG. 3. For example, FIG. 7 illustrates portion 700 of a six-color display panel having subpixel repeating group 701 comprising red subpixels 706, green subpixels 708, large blue subpixels 710, cyan subpixels 707 (shown in finer horizontal hatching lines than the blue subpixels in these figures), magenta subpixels 709, and yellow subpixels 711 FIG. 9 illustrates a portion of a five-color subpixelated display panel substantially comprising subpixel repeating group 902 having sixteen (16) subpixels of red subpixels 906, green subpixels 908, blue subpixels 910, and cyan subpixels 912 with white subpixels interspersed.

Figure 8:
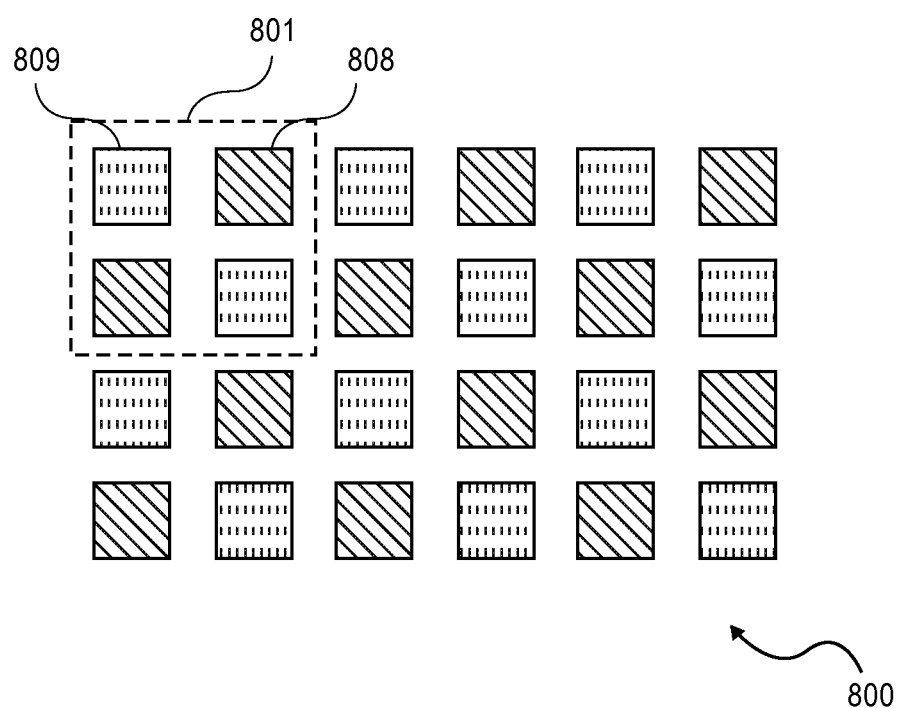
FIG. 8 shows a portion of a display panel that includes a two subpixel repeating group using square subpixels in two colors.

It is also to be understood that the techniques disclosed for utilizing the backlight of the display system as described below apply equally to display systems having as few as two primary colors. For example, FIG. 8 illustrates portion 800 of a two-color display panel having subpixel repeating group 801 comprising magenta subpixels 809, and green subpixels 808. Display panel 160 of FIG. 1A may substantially comprise subpixel repeating group 801.

With reference again to FIG. 1A, exemplary display system 100 further includes an array 120 of light emitting sources 122 used as a backlight for panel 160. Array 120 may be comprised of light emitters 122 in different colors, each of the emitters being independently addressable under electronic control such that the control of each individual color may be completely separated from control of each of the other colors in array 120. The array 120 of light emitting sources may comprise light emitting diodes (LEDs) or other types of light emitters that are capable of being independently addressable and controlled. For example, a color flat panel display of any type may be used, such as a second LCD, an Organic Light Emitting Display (OLED), Plasma Display Panel (PDP), a Rear Projection Television (RPTV and the like), or even a Cathode Ray Tube (CRT).

Figure 4:
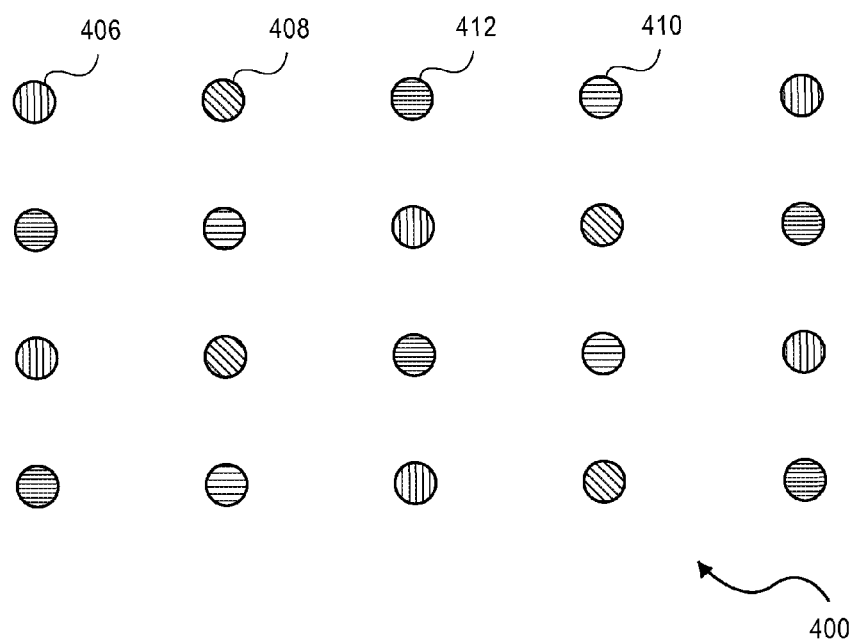
FIG. 4 shows a portion of a backlight array having light emitters in three colors.
Figure 5:
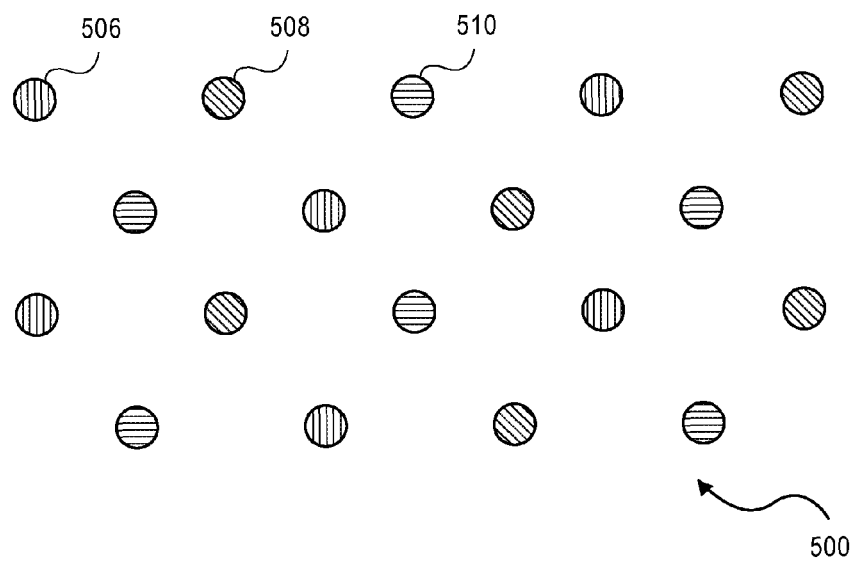
FIG. 5 shows a portion of a backlight array having light emitters in four colors.
Figure 6:
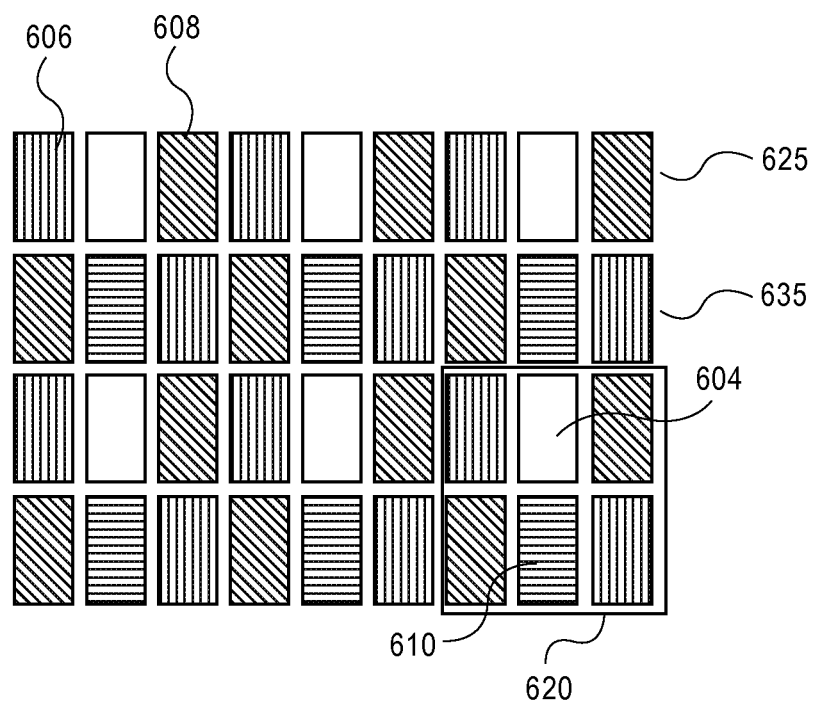
FIG. 6 shows a portion of a four color display panel that includes a six subpixel repeating group.

FIGS. 4 and 5 illustrate portions of two layouts for array 120 of light emitters that may be useful as backlights. FIG. 5 shows a portion of an offset, or hexagonal, array 500 of red 506, green 508, and blue 510 (RGB) light emitters. Light emitter array 500 is suitable for use as a backlight for an RGB display panel, and is also suitable for use as a backlight for an RGBW panel having a subpixel arrangement of the type illustrated in FIG. 3 or 6, or according to any one of the various RGBW layouts illustrated and described in US Patent Application Publication 2005/0225574 referenced above.

FIG. 4 shows a portion of a rectangular array 400 of red 406, green 408, blue 410, and cyan 412 light emitters, referenced hereafter as RGBC light emitters. Cyan may also be referred to as the color emerald. Light emitter array 400 is suitable for use as a backlight for a display panel substantially comprised of an RGBC subpixel repeating group, or for a display panel substantially comprised of an RGBCW subpixel repeating group such as, for example, subpixel repeating group 902 of FIG. 9. Light emitter array 400 with four different colors of light emitters is also suitable for use as a backlight for a display panel substantially comprised of an RGBW subpixel repeating group; when so used, light emitter array 400 allows the substantially green subpixel to shift to being substantially cyan (or emerald) if the pass band of the green subpixel includes both the green and cyan emitter emission wavelengths.

While the portions of light emitter arrays 400 and 500 illustrated in FIGS. 4 and 5 by way of example have rectangular and hexagonal arrangements of light emitters, respectively, it is understood that other arrangements are possible and suitable for implementing the backlight control techniques described in more detail below. All such possible and suitable layouts are contemplated as being included in the implementation of the backlight control techniques discussed herein. Additional discussion follows below about the interactions among the light emitters, the colors in the image being displayed and the particular subpixel layout of the display panel. Information about the resolution of array 120 of light emitting sources (FIG. 1) is deferred to that discussion.

With reference again to FIG. 1A, display system 100 illustrates two data paths for input RGB image data 102. The first RGB image data path includes input gamma (linearization) module 105, gamut mapping (GMA) function 140, subpixel rendering (SPR) module 150, and output inverse gamma module 115, producing output image data for display on panel 160. In display systems described in various ones of the co-owned applications noted and incorporated by reference above, the GMA function transforms input color data specified in RGB primaries to a multi-primary target color space, such as, for example, RGBW. The output of the GMA function is a set of input image color values in RGBW color space, with a luminance, L, component identified. For information about the operation of gamut mapping functions in general, see, for example, US Published Patent Applications 2005/0083352, 2005/0083341, 2005/0083344 and 2005/0225562.

In display system 100, GMA function 140 generates a requantized image for display on panel 160 using the output of the function designated "$X/X_L$" in box 136, which in turn receives the input RGB image values from input gamma operation 105 as well as input values labeled $R_L G_L B_L$ produced by Backlight Interpolation function 130. The Backlight Interpolation function 130 and $X/X_L$ function 136 are described in further detail below GMA function 140 may utilize any of the gamut mapping algorithms disclosed in the above references or otherwise known in the art or yet to be discovered. In the case of a display system producing images on a display panel having an RGBW subpixel repeating group, GMA function 140 utilizes an RGB to RGBW algorithm.

With continued reference to the first data path in FIG. 1A, the set of gamut-mapped input image color values (e.g., RGBWL) produced by GMA function 140 is then input to subpixel rendering function 150. For information about the operation of SPR function 150, see, for example, US Published Patent Applications 2003/0034992, 2003/0103058, 2003/0085906, 2005/0225548 and 2005/0225563. Note that the downward arrow in box 150 of FIG. 1A signifies that the SPR function here is performing a down sampling function, there being fewer color subpixels in the display than the number of color samples from the GMA function. The output values (e.g., RGBW) of SPR function 150 are then input to output gamma function 115 which produces output image data values for display on panel 160.

Backlight Control Functions

With continued reference to FIG. 1A, RGB input data 102 in display system 100 also proceeds along a second data path that integrates the operation of backlight array 120 of light emitters into the ultimate display of the output image. The second data path includes Peak Function block 110, which computes values for individual light emitters in array 120. Backlight Interpolation Function 130 uses the values of the light emitters to compute the distribution of light of each color at each pixel overlying light emitter array 120. The output of Backlight Interpolation Function 130, designated as $R_L G_L B_L$ in FIG. 1A, is, in effect, a filtered version of the RGB input image data that approximates the distribution of light from light emitter array 120. Each of these functions 110 and 130 will now be described in more detail.

Peak Function block 110 determines the values for light emitters in array 120 using RGB input image data 102. An example of a simple implementation of Peak Function 110 may be Max($V_{PSF}$). This sets the value, V, of the light emitter of a given color to be equal to the maximum (peak) value of that color channel in the original input image (after any gamma pre-conditioning performed in input gamma module 105) in the local area of the light emitter's Point Spread Function (PSF) support. The algorithm used in Peak Function block 110 may be a form of down sampling (indicated by the downward arrow in block 110 in FIG. 1A) whose output values for a given light emitter are the peak values of the input image data in an area bounded by the neighboring light emitters of the same color.

Figure 11:
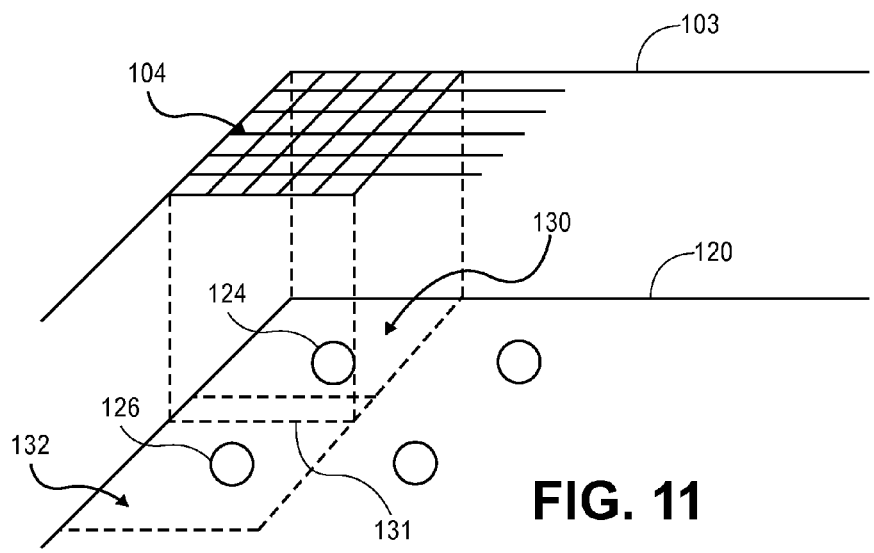
FIG. 11 is a diagrammatic representation illustrating the use of the input image data to determine the value of a light emitter in the backlight array.

FIG. 11 is a simplified diagram illustrating the interaction of the light emitters and the input image data in display system 100 FIG. 11 shows a portion of array 120 of light emitters, including light emitters 124 and 126. A diagrammatic representation 103 of RGB input image data 102 of FIG. 1A (after being processed by input gamma function 105) shows the input image data arranged in an array of input color values overlying array 120 of light emitters. The point spread function of light emitter 124 indicates a coverage area 130 of the light from light emitter 124, shown in dashed lines and bounded by line 131, which corresponds to an image portion 104 of the input image color data as represented in diagrammatic representation 103. Light from light emitter 124 has to have an illumination level sufficient to provide light for the brightest input color data value in image portion 104. The point spread function of light emitter 124 overlaps with the point spread function of light emitter 126, as shown by the dashed lines of the two areas 130 and 132, and thus some of the input image color values used to determine the value of light emitter 124 are also used to determine the value of light emitter 126.

Table 1 provides an example of a Peak Function, called "dopeak," in pseudo code that uses the maximum value of the input image region to determine the value for one light emitter. For simplicity of illustration, this peak function makes the assumptions that the output display panel has a resolution of 8 times that of the backlight array, that the backlight array includes red, green and blue light emitters disposed in a rectangular (or square) array, and that the red, green and blue light emitters are coincident.

TABLE 1

Pseudo-Code for Peak Function, "dopeak"

```
function dopeak (x,y)          build backlight image
    local r,g,b
    local Rp,Gp, Bp = 0,0,0
    local i,j
    for i=0, 15 do             find the peak value
        for j=0,15 do
            r,g,b = spr.fetch("ingam",x*8+1-4,y*8+j-4)
            Rp = math.max(Rp,r)
            Gp = math.max(Gp,g)
            Bp = math.max(Bp,b)
```

TABLE 1-continued

Pseudo-Code for Peak Function, "dopeak"

```
        end
    end
    spr.store("led",x,y,Rp,Gp,Bp)
end
```

Those skilled in the art will appreciate that other, more sophisticated down sampling algorithms may also be employed, such as those based on a sync or windowed sync function, or other functions known in the art or yet to be discovered. All such possible down sampling functions are contemplated as being suitable for the backlight control techniques disclosed herein.

In Table 1, the spr.fetch function represents the fetching or arrival of data from the previous step, for example from input gamma module 105 of FIG. 1A. The spr.store function represents storing or passing data on to the next step, such as backlight array values 112 being stored in LED array 122. Note that the pseudo code in table 1 may fetch the input values in "random access" mode which may ultimately result in fetching each value several times while storing each output value in order. This may be an appropriate technique for implementations in software. In hardware, it may use fewer gates to process the inputs in order as they arrive, holding them in input line buffers until enough are available to calculate output values. Alternately, it may use fewer gates to process the inputs in the order they arrive while storing intermediate output results in output line buffers until they are complete.

The output of Peak Function 110 is a value for each light emitter in array 120 indicating the illumination level of the light emitter. These light emitter values are input to a backlight array controller (not shown) for subsequent illumination of backlight array 120 when the output image is displayed on panel 160.

Figure 12:
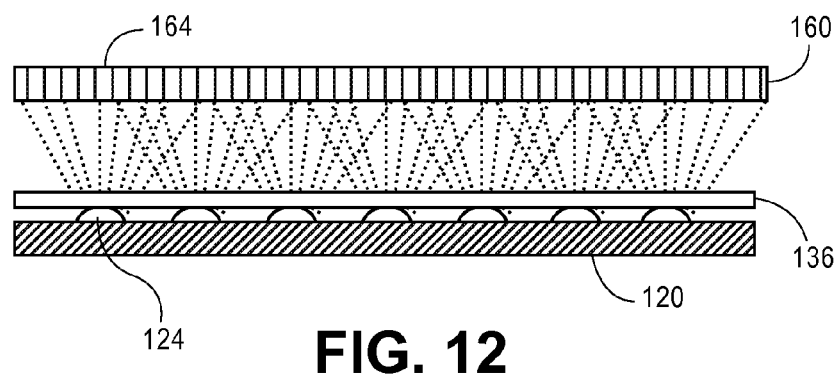
FIG. 12 is a diagrammatic representation illustrating the operation of the backlight interpolation function to produce a low resolution image from the light from the light emitters in the backlight array.
Figure 15:
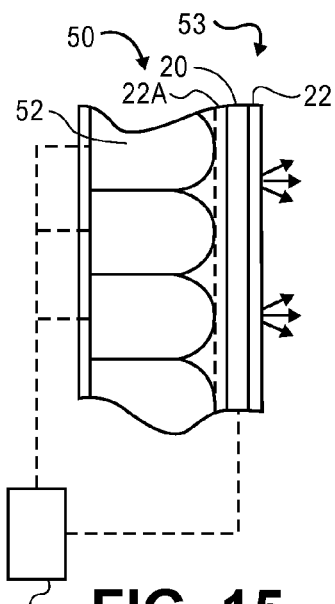
FIG. 15 is a schematic front view of a portion of the prior art display of FIG. 14 for a case where controllable elements (pixels) of the light modulator correspond to each LED.
Figure 14:
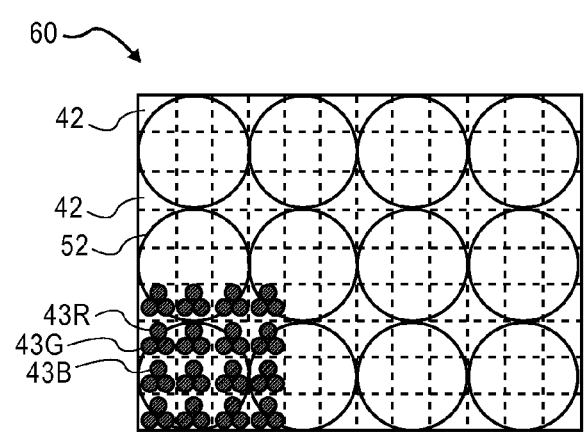
FIG. 14 is a portion of a prior art display in which a rear-projection screen comprising a diffusing layer is illuminated by an array of light emitting diodes (LEDs).

FIG. 12 is a simplified diagrammatic representation illustrating the interaction of the light emitters and the output image data in display system 100. Backlight Interpolation Function 130 uses the value of each light emitter 124 in backlight array 120, as established in Peak Function block 110, to calculate the distribution of light of each color at each output pixel 164 in display panel 160 overlying light emitter 124. This distribution is interpolated from the values of the light emitters established in Peak Function block 110, taking into account the point spread function (PSF) of each light emitter 124 in array 120 and the presence of diffusers 136 and other optical components. This operation is an "up sampling" function, as indicated by the up arrow, and many possible "up sampling" functions may be suitable. One such function is a summation of the point sample contribution of the PSFs of the local light emitters times their values computed by the down sampling Peak function 110.

Table 2 provides pseudo-code for a backlight interpolation function called "dointerp" This function fetches from a memory area called "ledbuf" (LED buffer) and writes to memory area for storing output color values called "fuzbuf." The function "dointerp" is called once for each input pixel and calculates the effect of all the surrounding backlight point spread functions to produce the color value that would be seen under the input (logical) pixel. The "dointerp" function uses a point spread function for each light emitter that assumes that each pixel can only be affected by the surrounding four light emitters.

TABLE 2

Pseudo-Code for Backlight Interpolation Function, "dointerp"

```
function dointerp(x,y)              build the effective backlight image
    local xb,yb = math.floor(x/8),math.floor(y/8)    position of a nearby
                                                      backlight
    local xd,yd = spr.band(x,7),spr.band(y,7)        distance to a nearby
LED center
    local r,g,b          color of the backlight centers
    local rs,gs,bs=0,0,0   sum of the overlapping backlight point
spread functions
    local psf            point spread function for current pixel and LED
    r,g,b = spr.fetch(ledbuf,xb-1,yb-1)              get LED center color
    psf = math.floor(spread[xd]*spread[yd]/4096)     calculate point spread
                                                      function here
    rs = rs + r*psf                  sum upper left LED
    gs = gs + g*psf
    bs = bs + b*psf
    r,g,b = spr.fetch(ledbuf,xb,yb-1)                color of upper right LED
    psf = math.floor(spread[7-xd]*spread[yd]/4096) PSF for this led and
pixel
    rs = rs + r*psf                  sum upper left LED
    gs = gs + g*psf
    bs = bs + b*psf
    r,g,b = spr.fetch(ledbuf,xb-1,yb)                color of lower left LED
    psf = math.floor(spread[xd]*spread[7-yd]/4096) PSF for this led and
pixel
    rs = rs + r*psf                  sum upper left LED
    gs = gs + g*psf
    bs = bs + b*psf
    r,g,b = spr.fetch(ledbuf,xb,yb)                  color of lower right LED
    psf = math.floor(spread[7-xd]*spread[7-yd]/4096) PSF for this led and
pixel
    rs = rs + r*psf                  sum upper left LED
    gs = gs + g*psf
    bs = bs + b*psf
    rs = math.floor(rs/4096)         sum was 12bit precision (+2
for
                                     4 LEDs)
    gs = math.floor(gs/4096)         colapse them back to 8bits
    bs = math.floor(bs/4096)
    spr.store(fuzbuf,x,y,rs,gs,bs);  and save in output buffer
end
```

The combination of the two functions, the "down sampling" of the Peak Function 110 followed by the "up sampling" of the Backlight Interpolation Function 130 may retain the original resolution of the input image in terms of sample count (image size), but produce a set of output image values, designated as $R_L G_L B_L$ in FIG. 1A, with lower spatial frequencies, i.e., a filtered version of the RGB input image data that approximates the distribution of light from light emitter array 120. This data is then input to $X/X_L$ function 136 described below. Note that some images may have regions of uniform (i.e., the same) color values. Knowledge of the location of uniform color regions in the image may be used to reduce computational load in GMA function 140 by retaining/reusing values common to the region.

Prior to being input into GMA function 140, input image RGB data is first modified by the relationship between the brightness of each incoming RGB value after input gamma function 105 and the actual amount of RGB light available at that given pixel from backlight array 120, as provided by Backlight Interpolation function 130 (i.e., the $R_L G_L B_L$ data values.) This modification is accomplished in $X/X_L$ function 136 by the ratio, $X/X_L$, where X is the incoming value of R, G, or B. and $X_L$ is the backlight brightness value at that pixel of $R_L$, $G_L$, or $B_L$. Thus, a given RGB to RGBW gamut mapping algorithm may have the input value $R/R_L$, $G/G_L$, $B/B_L$. Those of skill in the art will appreciate that the use of $X/X_L$ function 136 allows for an "off-the-shelf" GMA function to be utilized (e.g., any of the gamut mapping functions disclosed in the above-referenced applications), without a modification needed to accommodate the light contributions of the light emitters in backlight array 120.

Note that backlight control methods and techniques described herein may also be combined with frame or field blanking for some period so as to reduce or eliminate the motion artifact known as "jutter".

Handling Out-of-Gamut Colors with Expanded Peak Function

When Peak Function 110 uses an algorithm whose output values for a given light emitter are local peak values of the input image data, (e.g., computed in an area bounded by the neighboring light emitters of the same color) setting the light emitters to these local peak values may cause bright (relative to the local peak) saturated image colors to be "out-of-gamut" (OOG). This, in turn, could require the backlight light emitters to be set at a higher brightness to allow these bright image colors to be reached.

Figure 1B:
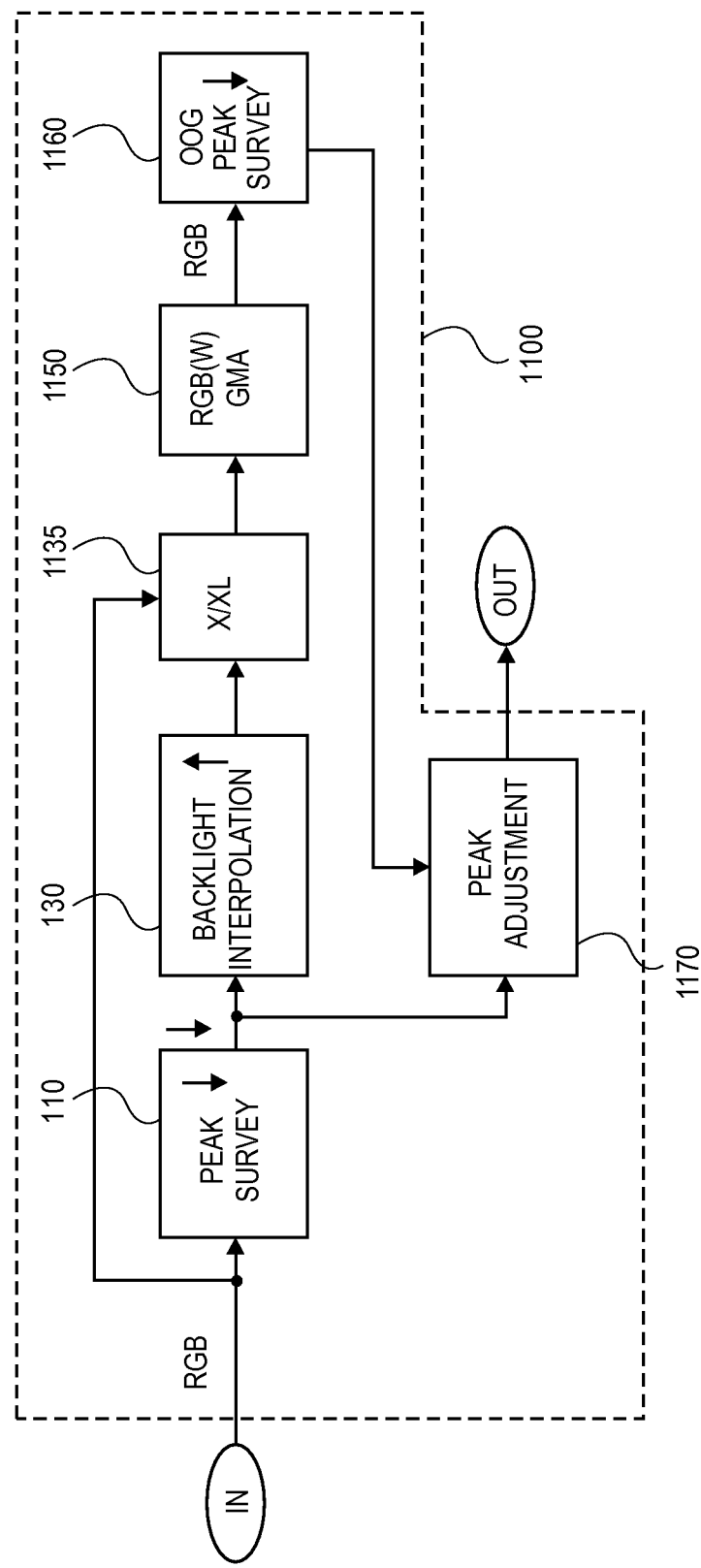
FIG. 1B is a block diagram of an example of a peak down sampling function block that may be used in the embodiment illustrated in FIG. 1A.

The Peak Function may be designed to account for setting light emitter values that are different from those found from a simple local peak function, and that accommodate what could otherwise be out-of-gamut image colors. The block diagram in FIG. 1B illustrates expanded Peak Function 1100, which could be implemented to substitute for Peak Function 110 of FIG. 1A. Peak Survey function 110 (which operates the same as Peak Function 110 in FIG. 1A) surveys the linear input image RGB values of each pixel to find the peak value for a light emitter within each of the light emitter Point Spread Function areas.

To determine if these light emitter values will cause some of the input image colors to be out-of-gamut, a gamut mapping function is performed with the output light emitter values produced by Peak Survey 110. Thus, expanded Peak Function 1100 includes additional functionality that is duplicative of other functions previously described in display system 100 to identify and accommodate input color values that would be out-of-gamut with light emitter settings determined using a local peak function.

With continued reference to FIG. 1B, the light emitter values output from Peak Survey 110 are input to Backlight Interpolation function 130 to produce the $R_L G_L B_L$ values, as described above. The normalization of the input image RGB values and the $R_L G_L B_L$ values, as previously described, is then performed in box 135. Then the normalized values are input to gamut mapping function RGB(W) GMA function 1150. However, the output W and L values that are otherwise generated in the standard RGBW GMA function are not needed in this case, since only the RGB values from RGB(W) GMA function 1150 are subject to being out-of-gamut. The output RGB values from RGB(W) GMA 1150 are then surveyed by the OOG Peak Survey 1160 to find the maximum out-of-gamut value within each light emitter's Point Spread Function area. The maximum out-of-gamut value is multiplied, possibly with a suitable scaling factor, with the original light emitter values produced by Peak Survey 1110, in Peak Adjustment function 1170, to increase the values of the light emitters such that fewer out-of-gamut colors occur.

Second Embodiment of a Display System

Multi-Primary Color Backlight Array with Multi-Primary Display

Figure 2A:
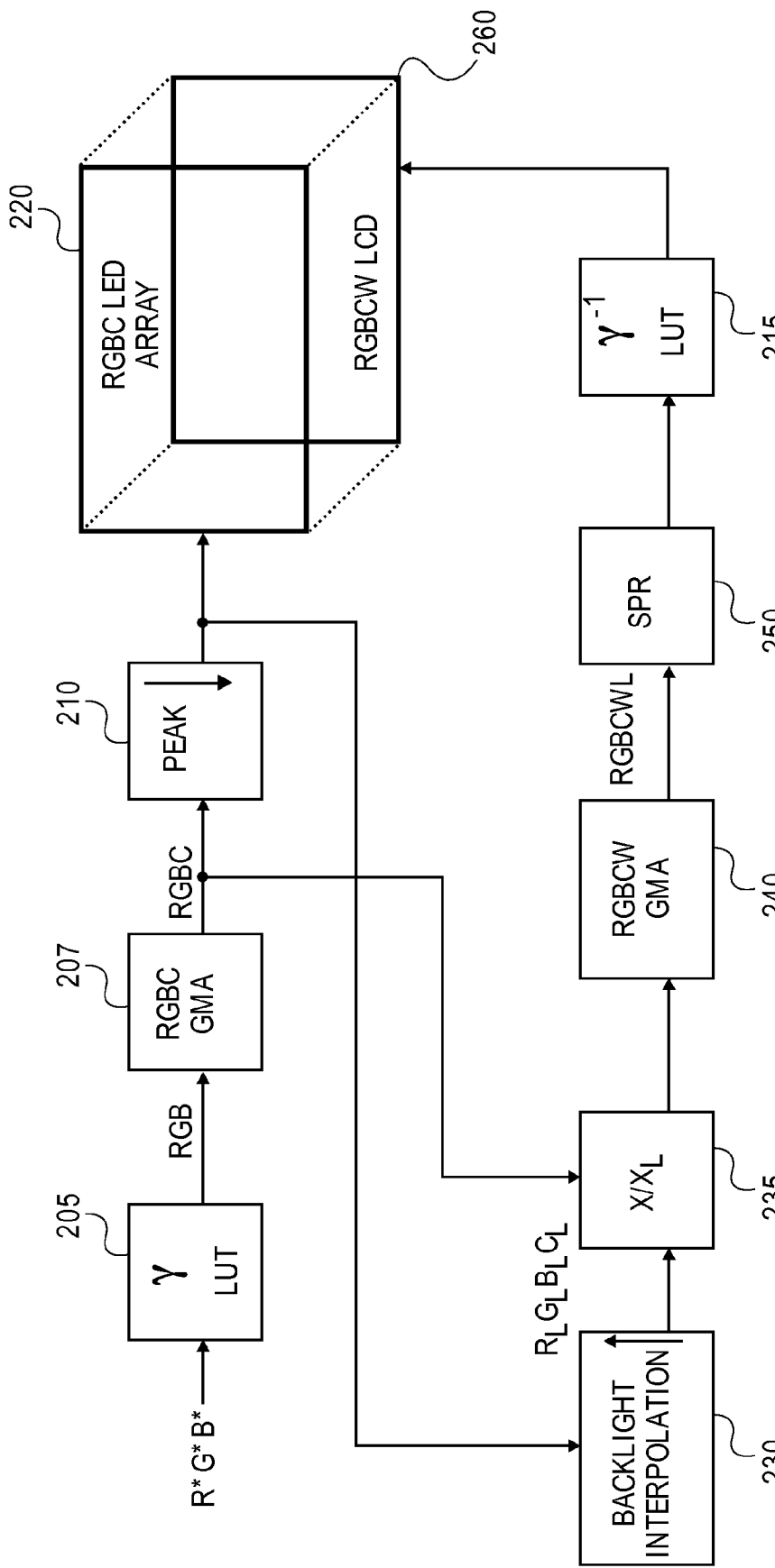
FIG. 2A is a block diagram of a selected components of a second multi-primary display system with a second backlight array of multi-color light emitters.

FIG. 2A is a block diagram of a second exemplary display system 200 having a spatial light modulator panel 260 for producing images, which is labeled as a liquid crystal display (LCD) panel in FIG. 2A. Panel 260 is a multi-primary subpixelated display panel and is shown in FIG. 2A as comprising five colors designated as red-green-blue-cyan-white (RGBCW). Subpixel repeating group 902 of FIG. 9 is an example of a subpixel repeating group suitable for use on panel 260. Exemplary display system 200 also includes an array of light emitting sources 220 used as a backlight for panel 260. Array 220 is comprised of light emitters in different colors, each of which is independently addressable under electronic control such that the control of each individual color may be completely separated from control of each of the other colors in array 220. FIG. 2A shows the array of light emitting sources 220 comprising LEDs but it is understood that other types of light emitters, such as those enumerated above with respect to the display system illustrated in FIG. 1A, that are capable of being independently addressable and controlled are also suitable for use in the embodiment of the display system illustrated in FIG. 2A.

In FIG. 2A, array 220 is labeled as having light emitters in four colors, RGBC, and in particular, in primary colors corresponding to the primary colors used in the subpixel repeating group of panel 260. Display system 200 illustrates a display system in which backlight array 220 has light emitters in N saturated primary colors (referred to as "s.primary") that match the N saturated primary colors of the subpixel repeating group used in display panel 260, where the W primary is considered to be a non-saturated primary. Note that, when the display does not include a W primary, the saturated primary colors of the display may be a one-for-one match with the saturated primary colors of the light emitters of array 220. However, as will be explained in more detail below, there may be significant benefits in image quality and in the dynamic range of the colors achieved in output images from using the backlight control techniques described herein in conjunction with a display system having a W primary.

Input Image Data Path

In display system 200, input image RGB data is subject to gamut mapping for both control of the N-s.primary backlight array and for subpixel rendering to produce the output color image in the gamut of N-primary display panel 260. To operate on linear data, the incoming R*G*B* data, which by common convention is non-linearly, or gamma quantized, is converted by the Gamma (γ) Look-Up-Table (LUT) 205 to higher bit depth linear RGB values.

The RGB data output from input gamma function 205 proceeds to N-s.primary GMA function 207 which maps the RGB input image data to the color gamut of the N saturated primaries of backlight array 220. GMA function 207 may be any of the gamut mapping algorithms that map input RGB to N saturated primary colors as disclosed in the above referenced commonly-owned patent applications, or otherwise known in the art or yet to be discovered. For example, PCT Application PCT/US 06/12766 (entitled "Systems and Methods for Implementing Low-Cost Gamut Mapping Algorithms, hereafter the "PCT '766 application") teaches how to convert three valued color input signals into four valued color signals. This method may be used in GMA function 207 for conversion of RGB input image data into a four primary color gamut of backlight array 220 (FIG. 2A) such as, for example, an RGBC backlight array.

GMA function 207 may also benefit from using metamer selection techniques as described in U.S. patent application Ser. No. 11/278,675, entitled "Systems and Methods for Implementing Improved Gamut Mapping Algorithms." When four or more non-coincident primary colors are used in a multi-primary display, there are often multiple combinations of values for the primaries that may give the same color value. A metamer on a subpixelated display is a combination (or a set) of at least two groups of colored subpixels such that there exist signals that, when applied to each such group, yields a desired color that is perceived by the human vision system. Substituting a metamer for a given color may reduce or equalize the peak values of the component colors in the output N saturated primary color space of the light emitters. This, in turn, may result in one or more of the light emitters being optimally dimmed to allow for optimal requantization of the output image values and reduction of backlight power.

The output color signals of GMA function 207 (specified in the color space of the N saturated primary colors of the light emitters in backlight array 220) is processed by Peak Function 210 to generate the values of the light emitters for array 220. In effect, as described above, Peak Function 210 generates a low resolution color image for array 220, specified in the N s.primary colors of backlight array 220.

The low resolution color image output from Peak Function 210 is also used by Backlight Interpolation module 230 to calculate the color and brightness of the backlight at each input location. Alternatively, module 230 may calculate the color and brightness at every subpixel location of panel 260. Then, prior to processing by gamut mapping operation 240, the input image RGB values, as mapped to the N s.primary colors of backlight array 220, and the low resolution image output by Backlight Interpolation module 230 are normalized, in module 235. In the context of a multi-primary display system having RGBCW primary colors with a backlight array having light emitters in RGBC primary colors, normalization function 235 computes the ratio of RGBC input colors to $R_LG_LB_LCL$ values, effectively making the backlight bright white to gamut mapping function 240. As noted above, using normalization function 235 permits display system 200 to utilize an "off-the-shelf" gamut mapping function, without requiring any special or costly modifications.

Second gamut mapping function 240 converts the normalized input image data, as specified in the color space of the N s.primary colors of array 120 (e.g., RGBC color data) to the primary color system of display panel 260 (e.g., RGBCW.) GMA function 240 may also calculate luminance, L, as well as the primary color values, for use in SPR function 250, as described in US Patent Application Publication 2005/0225563 and in the Metamer Filtering application. The output image data from SPR 250 function is sent to output inverse gamma ($\gamma^{-1}$) Look-Up-Table (LUT) 215 to compensate for the non-linear response of the display.

Operation of Gamut Mapping Functions

As noted above, GMA function 207, which maps the input RGB image data to the color space of the saturated primary colors of the backlight array, may use techniques disclosed in the PCT '766 application for conversion of RGB input image data into a four primary color gamut of backlight array 220 (FIG. 2A) such as, for example, an RGBC backlight array GMA functions 240 (FIG. 2A) and 2160 (FIG. 2B) may use procedures similar to the techniques disclosed in the PCT '766 application, but expanded as shown below, to convert the four valued (RGBC) color signal produced by GMA function 207 to the RGBCW signal needed by display panel 260. For ease of reference, the discussion below will relate specifically to an RGBC backlight array and an RGBCW display panel, but it is understood that the methods and equations may be adapted to operate when the backlight array and display panel have the same number of saturated primaries (e.g., RGBC to RGBCW or RGBY (Y=yellow) to RGBYW, or other primary color combinations,) or when the display panel has one more primary than the n.saturated primaries of the backlight array.

In the process of developing GMA function 207, a 4×3 matrix is calculated from the luminosity and chromaticity of the RGBC backlight array. This matrix converts RGBC values to CIE XYZ and can be calculated using methods well known in the literature. This matrix is used in equations like the following:

$$\begin{pmatrix} X \\ Y \\ Z \end{pmatrix} = \begin{pmatrix} m00 & m01 & m02 & m03 \\ m10 & m11 & m12 & m13 \\ m20 & m21 & m22 & m23 \end{pmatrix} \cdot \begin{pmatrix} Rc \\ Gc \\ Bc \\ Cc \end{pmatrix} \quad \text{Equation 1}$$

Similarly, a 5×3 matrix can be calculated to convert RGBCW values to CIE XYZ using the same methods. This matrix is used in equations like the following:

$$\begin{pmatrix} X \\ Y \\ Z \end{pmatrix} = \begin{pmatrix} n00 & n01 & n02 & n03 & n04 \\ n10 & n11 & n12 & n13 & n14 \\ n20 & n21 & n22 & n23 & n24 \end{pmatrix} \cdot \begin{pmatrix} Rw \\ Gw \\ Bw \\ Cw \\ Ww \end{pmatrix} \quad \text{Equation 2}$$

For a single color, these two equations can be set equal to each other, giving:

$$\begin{pmatrix} m00 & m01 & m02 & m03 \\ m10 & m11 & m12 & m13 \\ m20 & m21 & m22 & m23 \end{pmatrix} \cdot \begin{pmatrix} Rc \\ Gc \\ Bc \\ Cc \end{pmatrix} = \quad \text{Equation 3}$$

$$\begin{pmatrix} n00 & n01 & n02 & n03 & n04 \\ n10 & n11 & n12 & n13 & n14 \\ n20 & n21 & n22 & n23 & n24 \end{pmatrix} \cdot \begin{pmatrix} Rw \\ Gw \\ Bw \\ Cw \\ Ww \end{pmatrix}$$

Equation 3 cannot be directly solved for [Rw,Gw,Bw,Cw,Ww] given a set of the [Rc,Gc,Bc,Cc] values because none of the matrices are square. However, the inability to solve the equation symbolically does not mean there is no solution. To the contrary, there are many solutions and only one may suffice to produce a reasonable display.

The above-referenced PCT '766 application teaches that equations with 4×3 matrices may be solved by setting one of the unknowns to a "reasonable" constant. This converts the matrix to a square matrix, which allows for solving for the remaining variables. In Equation 3, the cyan (Cw) and white (Ww) values can both be declared constants and then "factored" out of the matrix. For example, in displays with a white (clear) subpixel it has been found reasonable to set the Ww value to the luminosity of the input value. In a similar manner, the Cw value may be set to the input Cc value. With these two variables converted to constants, the equation can be changed to the following:

$$\begin{pmatrix} m00 & m01 & m02 & m03 \\ m10 & m11 & m12 & m13 \\ m20 & m21 & m22 & m23 \end{pmatrix} \cdot \begin{pmatrix} Rc \\ Gc \\ Bc \\ Cc \end{pmatrix} = \quad \text{Equation 4}$$

$$\begin{pmatrix} n00 & n01 & n02 \\ n10 & n11 & n12 \\ n20 & n21 & n22 \end{pmatrix} \cdot \begin{pmatrix} Rw \\ Gw \\ Bw \end{pmatrix} + \begin{pmatrix} n03 & n04 \\ n13 & n14 \\ n23 & n24 \end{pmatrix} \cdot \begin{pmatrix} Cw \\ Ww \end{pmatrix}$$

Equation 4 can now be solved for the remaining variables, producing the following:

$$\begin{pmatrix} Rw \\ Gw \\ Bw \end{pmatrix} = \begin{pmatrix} n00 & n01 & n02 \\ n10 & n11 & n12 \\ n20 & n21 & n22 \end{pmatrix}^{-1} \cdot \quad \text{Equation 5}$$

$$\left[ \begin{pmatrix} m00 & m01 & m02 & m03 \\ m10 & m11 & m12 & m13 \\ m20 & m21 & m22 & m23 \end{pmatrix} \cdot \begin{pmatrix} Rc \\ Gc \\ Bc \\ Cc \end{pmatrix} - \begin{pmatrix} n03 & n04 \\ n13 & n14 \\ n23 & n24 \end{pmatrix} \cdot \begin{pmatrix} Cw \\ Ww \end{pmatrix} \right]$$

Equation 5 can be simplified to the following:

$$\begin{pmatrix} Rw \\ Gw \\ Bw \end{pmatrix} = \begin{pmatrix} a00 & a01 & b02 \\ a10 & a11 & b12 \\ a20 & a22 & b23 \end{pmatrix} \cdot \begin{pmatrix} Cw \\ Ww \\ 1 \end{pmatrix} \quad \text{Equation 6}$$

where the "a" coefficients are calculated using Equation 2 (the 5×3 conversion matrix), which can be pre-calculated once in advance. The "b" coefficients are calculated using both matrices and the input [Rc,Gc,Bc,Cc] values, which change on every input pixel. Note that careful selection of the primary colors in the backlight and the overlying LCD display can greatly reduce the complexity of these calculations. Now the remaining [Rw,Gw,Bw] values can be calculated.

The resulting color may still be out-of-gamut in the RGBCW color space. Out-of-gamut colors can be resolved using any one or more of several techniques. Some colors may be brought back into gamut by using the metamer selection techniques as described in U.S. patent application Ser. No. 11/278,675, entitled "Systems and Methods for Implementing Improved Gamut Mapping Algorithms." Depending on the shapes of the gamut representing the backlight array primary colors and the gamut of the display, there may still be some colors that can never fit into the final gamut. These colors must be clamped or scaled using techniques such as those disclosed in the '341, '352 and '344 applications and the '219 patent incorporated by reference above, or using other gamut clamping techniques from the literature.

The backlight control methods and techniques discussed herein may also be implemented in display systems in which the display panel has fewer saturated primary colors than saturated primaries of the backlight, or in which the display panel does not share primary colors with the backlight. In these case, some other combination of GMA algorithms may be preferred over using the two stage GMA functions illustrated in FIG. 2A. For example, GMA function 240 may do its conversion directly from the RGB input color image data values produced by input gamma LUT 205. The GMA function may use algorithms based on techniques disclosed in several ones of the above-referenced patent applications, such as those disclosed in the '341, '352 and '344 applications and the '219 patent incorporated by reference above, or based on other gamut mapping algorithms available in the literature.

Handling Out-of-Gamut Colors with Expanded Peak Function

When Peak Function 210 uses an algorithm whose output values for a given light emitter are local peak values of the input image data, (e.g., computed in an area bounded by the neighboring light emitters of the same color) setting the light emitters to these local peak values may cause bright (relative to the local peak) saturated image colors to be "out-of-gamut" (OOG). This, in turn, could require the backlight light emitters to be set at a higher brightness to allow these bright image colors to be reached.

Figure 2B:
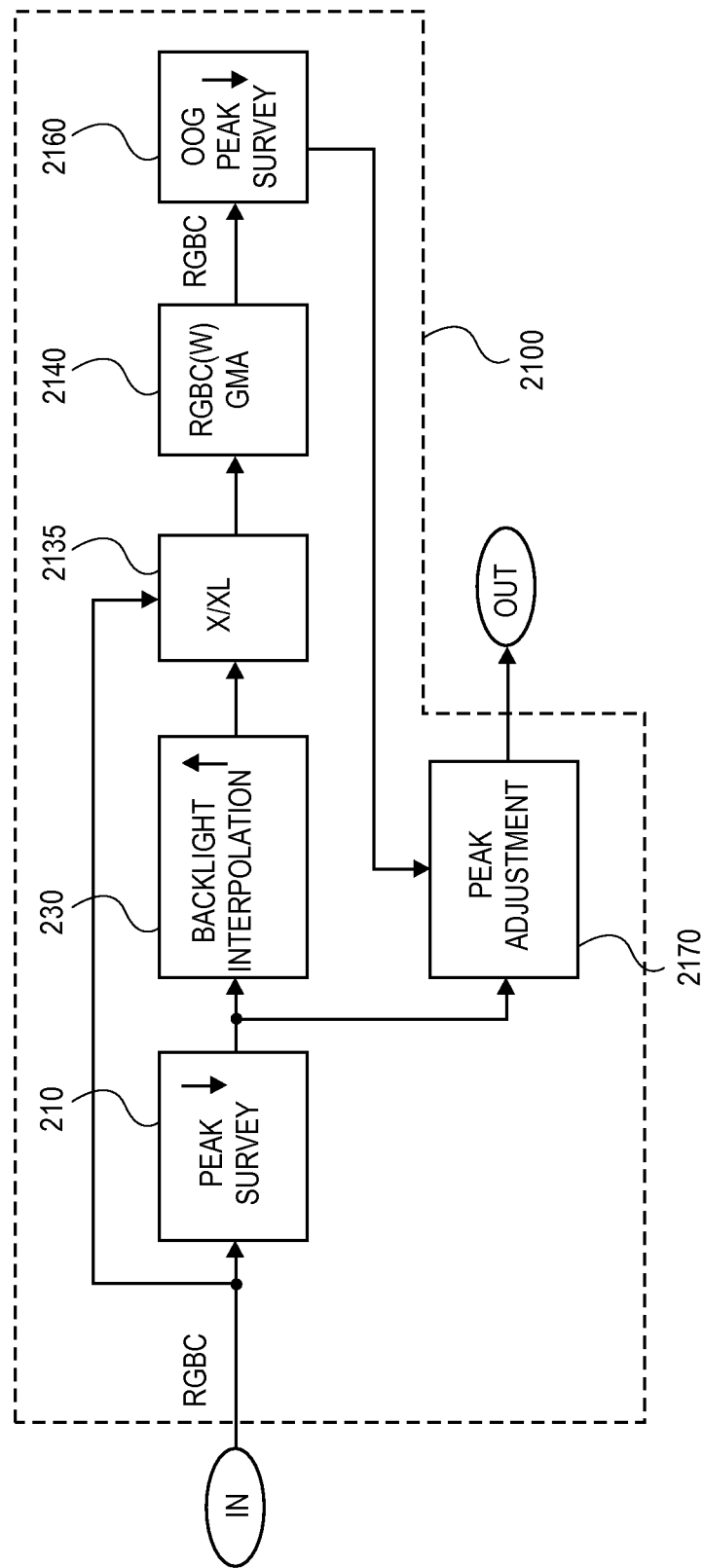
FIG. 2B is a block diagram of an example of a peak down sampling function block that may be used in the embodiment illustrated in FIG. 2A.

The Peak Function may be designed to account for setting light emitter values that are different from those found from a simple local peak function, and that accommodate what could otherwise be out-of-gamut image colors. The block diagram in FIG. 2B illustrates expanded Peak Function 2100, which could be implemented to substitute for Peak Function 210 of FIG. 2A. Peak Function 2100 will be described in terms of a display system having RGBCW primary colors and a backlight array having RGBC colored light emitters, but it is understood that the operation of Peak Function 2100 may be modified to accommodate other multi-primary display systems having a different set of N primary colors.

Peak Survey function 210, which operates the same as Peak Function 210 of FIG. 2A, surveys the linear input image RGBC values of each pixel to find the peak value for a light emitter within each of the light emitter Point Spread Function areas. To determine if these light emitter values will cause some of the input image colors to be out-of-gamut, a gamut mapping function is performed with the output light emitter values produced by Peak Survey 2110 to identify and accommodate input color values that would be out-of-gamut with light emitter settings determined using a local peak function.

With continued reference to FIG. 2B, the light emitter values output from Peak Survey 2110 are input to Backlight Interpolation function 2130 to produce the $R_L G_L B_L CL$ values. The normalized input image RGBC values and the $R_L G_L B_L CL$ values produced in box 2135 are input to gamut mapping function RGBC(W) GMA function 2140. However, the output W values that are otherwise generated in the standard RGBCW GMA function are not needed in this case, since only the RGBC values from RGBC(W) GMA function 2140 are subject to being out-of-gamut. The output RGBC values from RGBC(W) GMA function 2140 are then surveyed by the OOG Peak Survey 2160 to find the maximum out-of-gamut value within each light emitter's Point Spread Function area. The maximum out-of-gamut value is multiplied, possibly with a suitable scaling factor, with the original light emitter values produced by Peak Survey 2110, in Peak Adjustment function 2170, to increase the values of the light emitters such that fewer out-of-gamut colors occur.

Operation of the Backlight to Improve Quality of Displayed Images

In one embodiment of the operation of the backlight according to the techniques described above, the chromaticity of the backlighting of the display panel is dynamically controlled as a function of one or more characteristics of the colors in the image to be displayed on the panel.

Adjusting Light from Backlight to Image Color Temperature

One such characteristic of the colors in an image is referred to as the color temperature of the image, which may be defined as an average image color and luminance. Using the backlight control techniques described above, the backlight array of the display may be controlled to emit light as a function of the color temperature of the image being displayed. For example, an image showing a sunset may include high numbers of red and blue colors, but a low number of green colors. In contrast, an image showing a moonlit scene may be predominantly silvery white in color, having predominantly blue colors, but with few or no other colors. Using the backlight control techniques described above, the color temperature of the image may be determined by the display controller, which in turn may control the color temperature of the backlight array so that each scene may be rendered using its respective average color and luminance. Dynamically rendering an image in this manner will also allow the limited dynamic range and quantization of the display panel to be used to its fullest extent within the average luminance and color of the image, which in turn reduces quantization error. Note that the aforementioned examples of images may occur as part of a sequence of images, or scenes, that are to be rapidly displayed, such as those that occur in the frames of a video or movie. The display systems described above that are implemented with the backlight control techniques described herein may control the backlight color temperature from frame to frame, as the image temperature changes from scene to scene.

In addition, when the backlight is an array of multicolor light emitters having a lower resolution than the resolution of the display panel, such as an LED display, color temperature adjustments may be made across different regions of the panel, allowing specific parts of an image to be illuminated by different color temperatures from the backlight array, and thus providing for high simultaneous dynamic range in both luminance and chrominance within a single scene.

Controlling Light from Backlight to Alter the W Display Primary

Related to, but distinct from, using the color temperature of an image to control the light emitting from the backlight is to use the backlight control techniques described above to cause the backlight array to emit light as a function of the predominant color in an image, in order to produce a displayed image having higher luminance or higher color purity than would otherwise be achieved using a uniform white backlight for the subpixel repeating group used by the display panel.

First, a specific example will describe the problem. An image showing a scene in a photo-development dark room is typically lit only in red. With a conventional white backlight, only the red subpixels in the subpixel repeating group of the display panel would be called upon by the subpixel rendering (SPR) operation to render the luminance information of the scene. In a standard RGB stripe display, only one of the three subpixels in the RGB subpixel repeating group will provide the luminance information for the image. Similarly, with reference to RGBW subpixel repeating group 620 of FIG. 6, only one in three subpixels will provide the luminance information for the image, and when a display panel utilizes RGBW subpixel repeating group 320 of FIG. 3, only one in four subpixels will provide the luminance information. In multi-primary displays such as those using the subpixel repeating groups shown in FIG. 7, 9, or 24, the luminance information in the red image would only use one in six subpixels in subpixel repeating group 701 (FIG. 7), one of six subpixel in subpixel repeat group 2402 (FIG. 24), and only one of eight subpixels in subpixel repeating group 902 (FIG. 9).

In a display system such as display system 100 of FIG. 1A and display system 200 of FIG. 2A that implements the backlight control techniques discussed above, the light emitted from the backlight array may be controlled to be pure red light, allowing the normally white (clear) subpixels 304 of an RGBW display layout 320 (FIG. 3) to contribute to the scene rendering, for a total of four of the eight subpixels (or two out of four) providing the luminance information for the predominantly red dark room image. A similar improvement is achieved with multiprimary subpixel repeating group 902 of FIG. 9, which, without the use of the backlight control techniques discussed herein, as noted above, provides for only one of eight subpixels in subpixel repeating group 902 to provide the luminance information for a predominantly red image. With the use of the backlight control techniques discussed herein, pure red images would also use the more numerous white (clear) subpixels 904, adding four subpixels in addition to red subpixel 906, for a total of five subpixels out of eight in a display panel utilizing subpixel repeating group 902. Moreover, the increased utilization of the clear subpixels for highly saturated colors increases the brightness range of those colors. In addition, the red color would be truly red, since there would be no color bleed from the other colors, thus increasing the color purity and gamut of the display.

Figure 13:
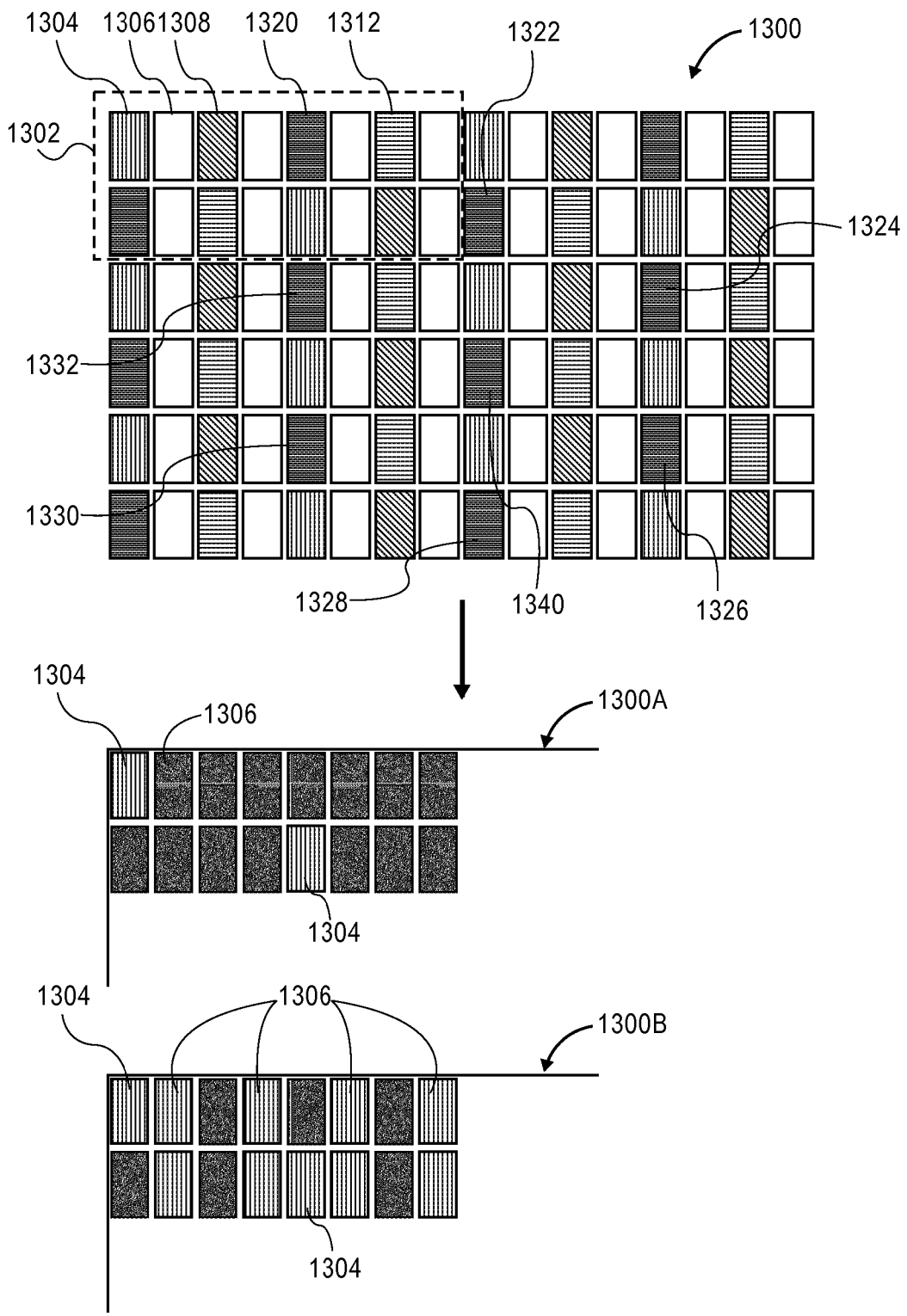
FIG. 13 shows an exemplary display panel having a multi-primary subpixel repeating group with a white (clear) subpixel and illustrating how the white subpixel is used as a primary color that is determined by the backlight control techniques illustrated and described herein.

FIG. 13 further illustrates the use of a backlight-controlled primary color in multi-primary display panel 1300A substantially comprising subpixel repeating group 1302. Subpixel repeating group 1302, which is a variation of subpixel repeating group 902 of FIG. 9, substantially comprises red 1304, green 1308, cyan 1320 and blue 1312 subpixels with majority white subpixels 1306 interspersed. The minority saturated subpixels are each placed on a hexagonal grid. See, for example, cyan subpixels 1322, 1324, 1326, 1328, 1330 and 1332 surrounding cyan subpixel 1340.

In US Published Patent Application 2005/0225575, entitled "Novel Subpixel Layouts and Arrangements for High Brightness Displays," various subpixel repeating groups including white subpixels are disclosed. The '575 application notes that the backlight color temperature may be adjusted to have more magenta (i.e., red and blue) energy than that for the typical RGB stripe display to give a balanced white. The backlight control techniques discussed herein, however, may actually control the color of the light emitters in the backlight so as to provide additional primary color subpixels. In the red image example described above, only one (the red) of the eight subpixels provides the luminance information for a predominantly red image when display panel 1300A is lit by a conventional white backlight. The other pixels, including the majority white 1306 subpixels are shown in black, indicating that they are "off."

With continued reference to FIG. 13, display panel 1300B illustrates how the backlight control methods and techniques discussed above affect the display of an exemplary predominantly red image by facilitating the use of a white (clear) subpixel in a display having a multi-primary subpixel repeating group to function as an instance of a primary color, referred to herein as backlight-controlled (BC) primary color. Pure red images are displayed using the more numerous white (clear) subpixels 1306, adding four subpixels in addition to red subpixel 1304, for a total of five subpixels out of eight in display panel 1300B utilizing subpixel repeating group 1302. The majority white subpixels 1306 in panel 1300B now transmit the red color (as indicated by their vertical hatching) from the underlying light emitter(s), as determined using peak function 110 or 1100 in FIGS. 1A, 1B, or peak function 210 or 2100 in FIG. 2A or 2B, respectively, and backlight interpolation function 130 (FIG. 1A) or 230 (FIG. 2A), and from the remaining display functions (i.e., the GMA, SPR and output gamma functions) in the data path of the display.

Figure 24:
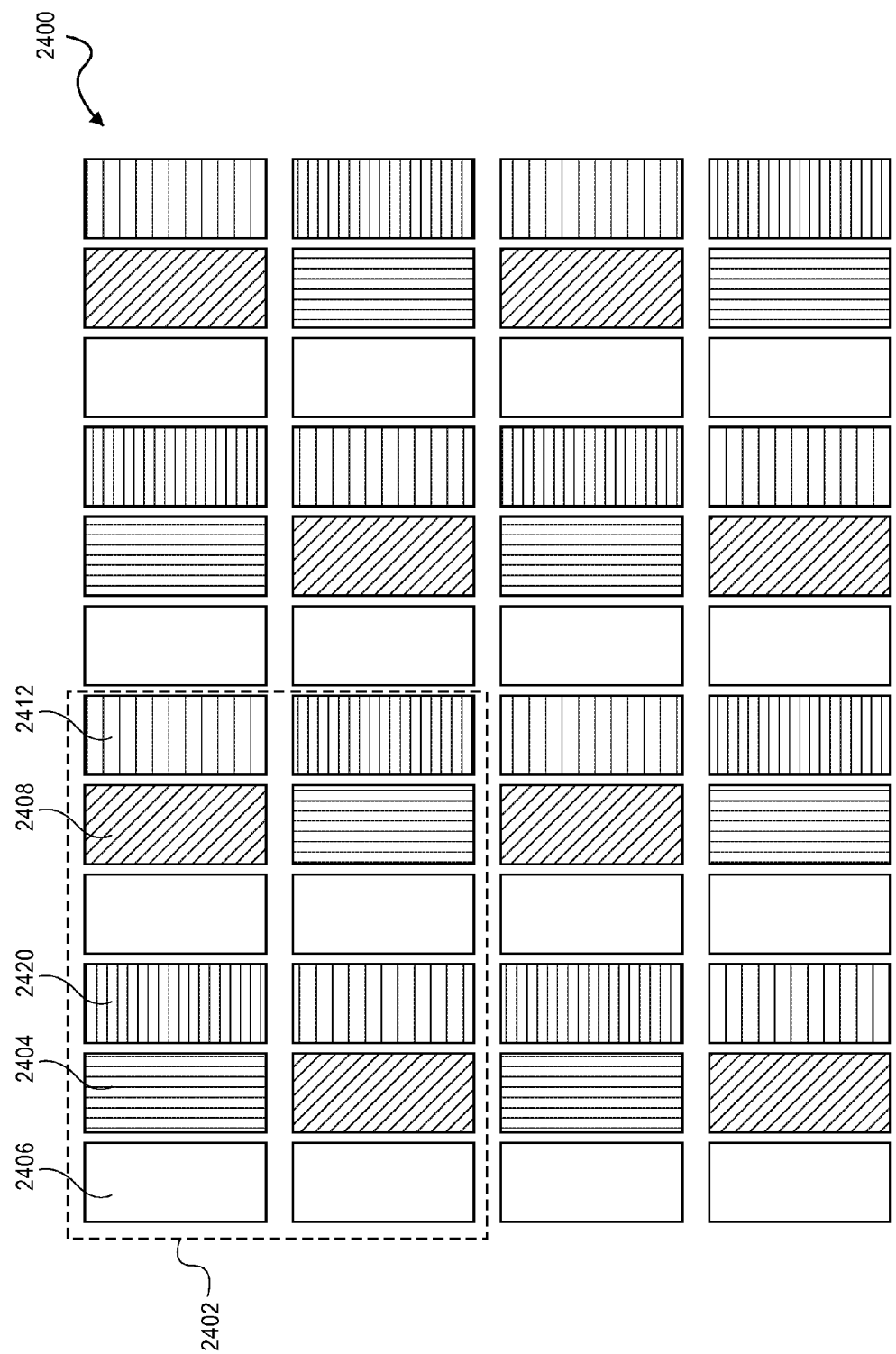
FIG. 24 shows a portion of a display panel that includes a twelve subpixel repeating group using rectangular subpixels in five colors.

The arrangement of subpixels 2400 of FIG. 24 shares the property found in FIG. 9, of having a white (clear) subpixels 2406 on a square grid and four saturated primaries, red 2404, green 2408, blue 2412, and cyan (or emerald green) 2420. As with other layouts disclosed herein, this arrangement may use the commercially commonly available one-to-three (1:3) aspect ratio subpixel structure usually associated with the conventional RGB Stripe subpixel arrangement well known in the art. Of course, other aspect ratios are possible with this subpixel repeating group. It also may be able to use the "diamond" (and other shaped filters) subpixel rendering filters disclosed in the '612, '724 and '563 applications. It also may also use the metamer filtering techniques described in the Metamer Filtering application Controlling Light from the Backlight Array to Alter Other Primary Colors of the Display The backlight control techniques described above may also be used to affect how other ones of the primary colors of the display, in addition to, or in place of, the white subpixel, participate in increasing the subpixel rendered image quality. For example, certain ones of the colored light emitters in the backlight array that are disposed behind certain ones of the colored subpixels of a particular subpixel repeating group in a region of the display panel may be turned off to affect the color ultimately produced by the subpixel repeating group in that region Consider, for example, a multi-primary display system having a display panel with subpixel repeating group 701 of FIG. 7, which has six primary colors. If a bright saturated yellow region of an image is to be displayed using a conventional uncontrolled backlight, only three of the six subpixels, the red 706, green 708, and yellow 711 subpixels would be turned on to produce the yellow image region. When a backlight array controlled according to the techniques and methods discussed herein is used, the blue light emitters disposed behind the yellow image region are turned off. This would allow the addition of two more of the six subpixels to be turned on: the magenta subpixel 709, which passes both red and blue light, and wide passband cyan subpixel 707, which passes both blue and green portions of the backlight spectrum, for a total of five out of six subpixels. Turning off the blue light emitters in the yellow image region effectively causes additional reconstruction points to be added for the subpixel rendering of the highly saturated color.

In effect, the backlight controller dims the light emitter of a given color so that the overlying display panel subpixel of that same color may be set to maximum transmission for the highest pixel value in the area of the Point Spread Function (PSF) of the light emitter. This allows surrounding subpixels of that same color that may be of lower brightness to be adjusted with more grey levels available on the display panel, in turn decreasing the quantization error Dimming certain ones of the light emitters in an image region also may increase the color gamut slightly because these dimmed light emitters will not be producing light that may potentially leak through nearby color filters, and may also increase the contrast of the displayed image because these dimmed light emitters will not be producing light that may potentially leak through the same filtered subpixel in the off state. Dimming the light emitters in the backlight to achieve the improved image quality also reduces power drain and extends battery life, a substantial benefit for battery powered devices.

The ability to turn off selected ones of the light emitters in the backlight array in order to improve the display of highly saturated colors may be used in conjunction with a multi-primary subpixel repeating group having a white (clear) subpixel, in which the backlight control is used to enable the white subpixel to become a backlight-controlled primary color. In the example of the predominantly red darkroom image described above, the example presumed that the entire image was predominantly red. Consider an image (e.g., an imagined movie scene) in which the illumination is pure red in a restricted region of the image, such as in a photographic darkroom viewed through an open door, or a ship's bridge under red emergency battle lighting viewed through a window, where the illumination in remainder of the image may be considerably brighter, and the colors in the remainder of the image are consequently less saturated. When this type of image is displayed on a multi-primary display using a conventional backlight, only the red subpixels would be available to reconstruct the red illuminated image region. This reduces the Modulation Transfer Function Limit (MTFL) to be the Nyquist Limit of the red subpixel which, in turn, may severely limit image resolution in this image region.

Several of the above-referenced patent applications discuss allowing cross-luminance modulation of the other colored subpixels to solve this image resolution problem. That solution could cause some desaturation in areas of high spatial frequency detail. Further, for very high brightness, highly saturated color image regions such as in the imagined movie scene, a bright, highly saturated color either must be clipped, clamped, or compressed to black, or must be clipped, clamped, or compressed to luminance, in order to darken or desaturate all of the out-of-gamut colors. Each of these options is less than ideal since they may lead to problems caused by simultaneous luminance contrast of darker saturated color regions compared to a brighter desaturated image region.

The ability to individually control the light emitters in different image regions permits the backlight or display controller to turn off all but the desired light emitters in the bright saturated image region while adjusting the light emitters in the other image regions as needed, thereby permitting the white (clear) subpixels join with the subpixels of the given bright saturated color to keep both the resolution and the brightness high without desaturating or clamping the colors of the image. The white subpixel allows more of the saturated color to pass through the LCD increasing the overall brightness and color gamut hull volume Resolution and Colors of Light Emitters in the Backlight Array As noted above, in some embodiments of the display systems described herein, it may be advantageous to require that the multi-primary color filters of the display panel match, or map, on a one-to-one basis to light emitters in the backlight array. However, this is not a requirement in all display system embodiments encompassed by the scope of the appended claims. That is to say, the light emitters for N saturated primary colors in the backlight need not be mapped to N saturated primary colors in the color filters of the display panel.

In fact, the controllable backlight array may include light emitters in any N colors, including those colors that are not typically found in backlight arrays, such as deep-red, cyan (emerald), and violet. For example, in display systems having a backlight array that is itself a color display having a lower resolution than the display panel the backlight is illuminating, it may be desirable to use light emitters in the backlight emitting colored light in more colors than, or different colors from, the primary colors that occur in the display panel illuminated by the backlight. For example, a "green" light emitter may have a peak wavelength of 530 nm, while a "cyan" light emitter may have a peak at 505 nm. It may be possible to pass both of these wavelengths through a single color filter that spans both wavelengths. When a saturated, green to red color is needed in an image region, the green light emitter disposed in the backlight array behind that image region is turned on; when a saturated cyan to blue color is needed in the image region, the cyan light emitter is turned on. When a white color is needed in an image region, one or both of the cyan and green light emitters may be turned on. Using the controlled backlight array in this manner permits the display panel to be configured with a subpixel repeating group having fewer different primary colors.

Other ranges of colors may be treated similarly. For example, in the blue region, the eye is most sensitive to 450 nm. This is good for high efficiency but light emitters in the deep violet range may also be used. The deeper violet light emitter near 400 nm has low visual efficiency, but provides for a greater color gamut in the line-of-purples where the human eye has greater color differentiation ability. When displaying an image region with deep violent colors, the 450 nm blue light emitter may be turned off and the 400 nm deeper violet light emitter may be turned on in that image region.

In the range of red colors, the human eye is less and less sensitive to the light as the wavelength increases. To produce an image region having a reasonably deep red with reasonable visual efficiency using the controlled backlight array, a 610 nm light emitter may be used. However, the 610 nm light emitter would not necessarily improve deeper red color perception out to 700 nm. To improve color perception in this red range, the controlled backlight array may include a light emitter in the 700 nm range. This longer wavelength light emitter may be turned on when required, perhaps when along the deep line-of-purples, in concert with the deeper violet light emitter described above, while turning off the 610 nm light emitter. When the image region requires less saturated colors, the less saturated light emitters at 610 nm and 450 nm may be used to increase the backlight efficiency.

The choice of colors for the light emitters included in the backlight array is not necessarily determined by the primary colors of the subpixel repeating group comprising the display panel. Nor do the primary colors of the subpixel repeating group comprising the display panel determine the choice of colors for the light emitters included in the backlight array. Those of skill in the art will appreciate that the flexibility permitted by the backlight control techniques described above allow for configuring the colors and arrangement of the light emitters in the backlight array to accommodate display systems having display panels of any one of the subpixel repeating groups illustrated in the Figures herein, or those subpixel repeating groups described in the above-referenced patent applications, as well as the conventional RGB stripe subpixel repeating group. Those of skill in the art will further appreciate that the configuration of the colors and arrangement of the light emitters in the backlight array may be designed to complement or match a particular subpixel repeating group. Various examples described herein show how design choices may be made.

A Display System Embodiment Having a Single White (Clear) Primary with a Controlled Backlight Array The above discussion describes various choices that can be made for the colors of the light emitters in display systems having a backlight array that is itself a color display having a lower resolution than the display panel the backlight array is illuminating. However, in some display system embodiments, the resolution of the backlight array may be high enough so that it is unlikely that one would need to show both green to red colors and cyan to blue colors in the same small image area. That is, the backlight array of light emitters is of high enough resolution that it is not likely or perhaps even possible to perceive, due to the limits of the human eye, a color juxtaposition that requires higher color resolution than the resolution of the backlight display. In this particular case of providing a wider color gamut by choosing certain light emitters for the backlight array, it may be possible to provide a display panel that has only one color subpixel; that is, the display panel has as its "subpixel repeating group" a pure transparent, unfiltered white (clear) subpixel. In that case, an array of only transparent subpixels would then provide all of the high resolution luminance modulation for the displayed image while the backlight array (display) of N primary color light emitters provides all of the lower resolution color.

Embodiment of Liquid Crystal Display System

Figure 10:
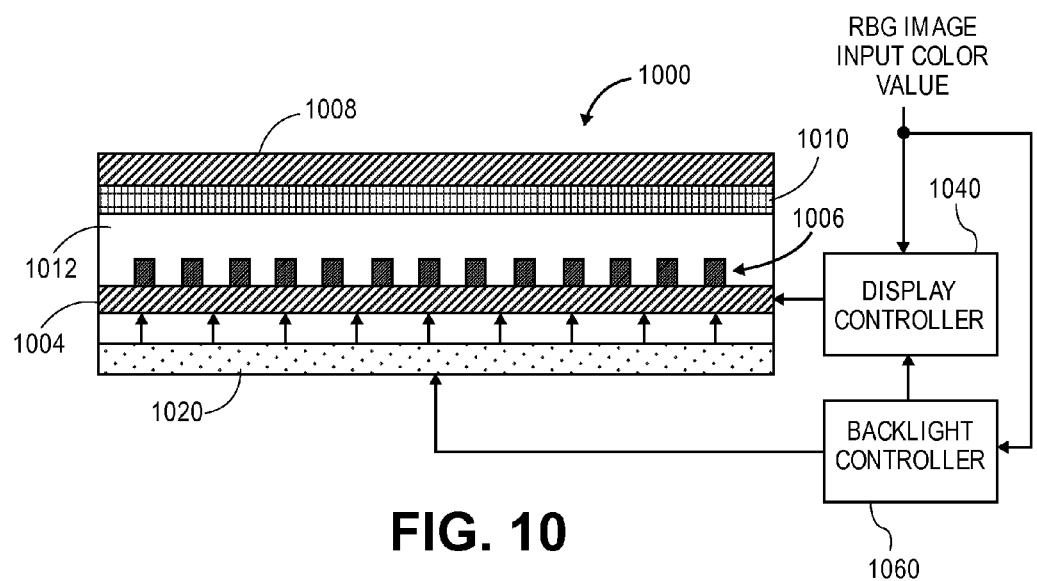
FIG. 10 is a block diagram of a liquid crystal display system in which the backlight control techniques and methods disclosed herein may be implemented.

FIG. 10 is a simplified (and not to scale) block diagram of a liquid crystal display (LCD) system 1000 in which any one of the embodiments disclosed herein may be implemented. LCD 1000 includes liquid crystal material 1012 disposed between glass substrates 1004 and 1008. Substrate 1004 includes TFT array 1006 for addressing the individual pixel elements of LCD 1000. Substrate 1008 includes color filter 1010 on which any one of the subpixel repeating groups illustrated in the figures herein, and in the various ones of the co-owned patent applications, may be disposed. LCD 1000 also includes backlight 1020 which includes an array of light emitters as illustrated in FIGS. 4 and 5, including variations as described herein in the discussion accompanying those figures. Display controller 1040 processes the RGB image input color values according to the functions described in FIG. 1A or 2A. The RGB input image values are also input to backlight controller 1060 for use in setting the values of the light emitters in backlight 1020, according to the operation of the Peak Functions described in the various embodiments of FIGS. 1A, 1B, 2A and 2B. Backlight controller 1060 communicates with display controller 1040 in order to provide the values of the light emitters for use by Backlight Interpolation function 130 or 230 in order to compute the low resolution image $R_L G_L B_L$.

Alternative Out-of-Gamut Processing on Low Resolution Backlit Display Systems

With any display system comprising a low resolution, colored backlighting as described above in all of its variants (e.g. LED backlight, a 2-LCD configuration, or the like), there are opportunities to process image data in novel fashions that leverage the unique combination of such a system.

For one example, as noted above, after some process of adjusting the colored backlight—for example, by adjusting the LED array values—there still might be colors that are out of gamut. This might happen, for example, at very high brightness when colors change hue within the point spread function of the LEDs (or other low resolution backlighting systems).

It may be possible to process the image data—to include possibly both the backlight and the LCD subsystems—in a temporal or spatial-temporal fashion to bring the colors that are out of gamut back into a target gamut space. Such a temporal/spatial-temporal processing may either take place on a global (e.g. on the entire image rendered upon the display) or local (e.g. within a subset region of the image rendered upon the screen). As such, it may be possible to modulate the low resolution backlight over time at only a certain time and within a certain region where such out of gamut conditions might exist within an image.

For example, one embodiment might proceed as follows: for any region (including the entire image) where there exists an out of gamut condition in, for example, a first color (e.g. red), subtract the opposite colors from the first color (in the example, cyan or green and blue) color from the peak value of the backlight color until such out of gamut color is back in gamut.

It is possible to group colors either by the primaries of the backlight or, alternatively, by their peak OOG conditions without regard to the backlight primaries. In the second alternative, color fields would not necessarily be pure colors. One example of such processing is now given to illustrate one embodiment and it will be appreciated that other embodiments and variants thereof are contemplated under the scope of the present invention.

Assume an RGB LED backlight with a RGBW LCD layout. The RGBW LCD subpixel repeating group may be any such group imagined, including ones disclosed herein and any others (e.g. RGBW quad). For this embodiment, it suffices only that there be a white or clear subpixel or similar wide bandpass filtered subpixel used within the subpixel layout of the LCD. The RGB LED backlight may be arrayed in any suitable fashion—e.g. in a square, displaced or some other arrangement. In addition, it suffices that that the backlight meets some assumptions for its design. For example, one such assumption might be that, at any given point on the display, it is possible to illuminate that point with a certain level of white (or alternatively, any given color) light illumination, according to the point spread function of the individual LEDs and the geometric arrangement of the LEDs upon the backlight display. It will be appreciated that the techniques described herein for OOG methods and systems as described in reference with RGB backlight with RGBW LCD may be suitably generalized to N-primary colored backlight and M-colored multiprimary LCD displays—where N and M may or may not be equal to each other and where even if N=M, then colored primaries are different in the backlight and the LCD.

In this example, three fields (corresponding to the virtual primaries P1, P2, P3, as discussed below) may be used for those LEDs that might be out of gamut: $P_1$, $P_2$ and $P_3$. The values of the LEDs in each field may be found by a survey of the incoming RGB data (or other suitable data format) in reference to each LEDs point spread function. It should be noted that the final values of the LED brightness may also be adjusted for field light integration. Thus, the total amount of light over the three fields sums substantially to the total desired, and the average equal substantially the Max desired. Stated otherwise:

Equation 8

| $P_1$ field | $P_2$ field | $P_3$ field | Sum |
|---|---|---|---|
| ($R_1$ + | $R_2$ + | $R_3$)/3 = | Max($R_{in}$) |
| ($G_1$ + | $G_2$ + | $G_3$)/3 = | Max($G_{in}$) |
| ($B_1$ + | $B_2$ + | $B_3$)/3 = | Max($B_{in}$) |

If a given pure color is to be created using only one field, and it is desired to be proportionally as bright as the color made with three fields, then that single field may be three times as bright. If the LEDs are flashed, the heat build-up is approximately proportional to the brightness of each flash and the flash rate, as is the power and the brightness. Thus, flashing the LED at three times the brightness but one third the rate provides approximately the same brightness but one third the rate provides the same brightness and power requirements.

It will be appreciated by those skilled in the art that the prior art Field Sequential Color (FSC) system may be used, in which the fields are pure color primaries defined by the colors of the LED primaries. An improvement may be to set the maximum brightness of a given color LED in the backlight to the brightest value required by the image data to be displayed on the LCD and adjust the LCD value by $X/X_L$ to allow all of this light to pass through the LCD Dynamic Virtual Primaries Another improvement however, may be to use "virtual primaries" that may cover less than the full color gamut of the backlight within a given region of the LCD display in order to reduce the visibility of FSC artifacts known to occur with prior art FSC systems.

Figure 16:
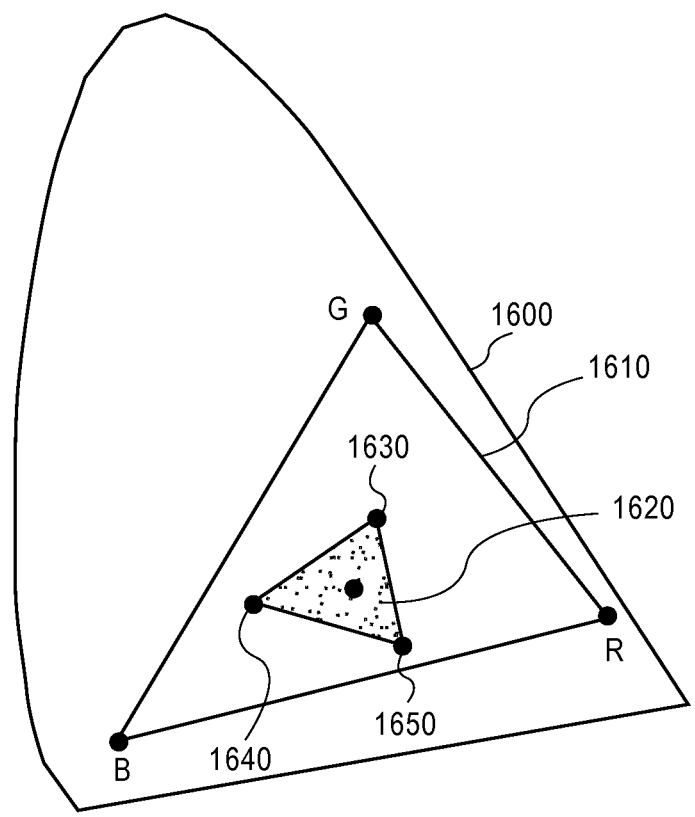
FIG. 16 is a CIE 1931 color chart showing a backlight LED gamut and an individual image gamut map smaller than the backlight LED gamut.

FIG. 16 shows a color gamut map 1600 (e.g. CIE '31) that bounds one possible original input gamut map (1610)—in this example, a RGB gamut. This original gamut may be defined by the color points R, G and B of the constituent RGB LEDs. Within RGB gamut 1610, a new gamut 1620 may be defined and/or created that may be a subset of the input gamut map 1610. This new gamut 1620 is bounded by "virtual primaries" (e.g. 1630, 1640 and 1650)—wherein the term "virtual primaries" describes the fact that the primary points 1630, 1640 and 1650 are not necessarily the exact physical primaries defined by the LEDs (or other suitable light emitters, e.g. OLED) themselves. Of course, some or all of the virtual primaries optionally could be some or all of the primary points for some period of time. Instead, for example, each virtual primary point could be created by a mixture of illumination values of the R, G and B LEDs (or any set of colored light emitters in the backlight). Each of these virtual primary points exists for some unique space and time coordinates. For example, virtual primary point 1630 could exist for one frame of image data in time and may exist only for a limited number of subpixels within spatial portion of the display. To continue the example, it may be possible for the display system to operate over three fields with virtual primaries 1630, 1640 and 1650 illuminating all or some portion of the display image.

Alternatively, the virtual primary could exist over the entire image frame or any spatial region in between the entire image frame or at one or a few subpixels. Such granularity of space partitioning or regions may be possible because the backlight may be comprised of a low resolution array of colored LEDs. Additionally, virtual primaries may exist in time for an indefinite period of time, several or one frames, or even a portion of a frame—all depending upon the operating criteria of the system.

As the present system may create virtual primaries for a wide variety of space and time conditions, it is worth mentioning some degenerate cases that are possible given the flexibility of the present system. One degenerate case of the present system might be to assign the virtual primaries to be precisely the actual (e.g. R, G and B LEDs or any other set of actual light emitters) and have each such LED illumination lasting for a frame and over the entire image. In such a case, the display system could operate in a conventional "field sequential" fashion. Another degenerate case would be to assign only one virtual primary point—white—by illuminating all three LEDs simultaneously over all fields. In such a case, the display system could operated in a manner described in the '737 publication noted above. These degenerate cases could be operated for any length of time desired by the system or the user. However, given the dynamic nature of the present system, maximum flexibility is allowed the system and any assignment of virtual primaries may be selected to optimize any number of operating criteria—as discussed further below.

It will be appreciated that any number (i.e. other than three) virtual primaries may be selected and that the time slice in which they illuminate any portion of the display is possible and possibly desirable, depending on the operating criteria.

Selection and Choice of Virtual Primaries

Of the possible operating criteria which may be factored into the selection of virtual primaries, one listing might include: reducing flicker, reducing color breakup, maximizing power savings, increasing dynamic range, and reducing quantization error. Regardless of the criteria sought to optimize, one embodiment might involve finding a suitable (and possibly the smallest, in one embodiment) chromaticity triangle (or region other than triangular for more than three, or less than three, virtual primaries) that contains substantially all of the color values within the point spread function of a given LED or cluster of LEDs; identifying a new set of virtual primaries and then generating FSC color values of each of these virtual primaries. This has the effect of creating a new GMA for each set of virtual primaries, possibly on the fly. Of course, these steps may be re-ordered in a fashion. In another embodiment, the virtual primaries could be selected—and on the basis of that selection—the chromaticity area may be found. The discussion below will described various embodiments of the present system that might be useful in helping to optimize the systems performance under the set of operating criteria above.

For example, the following description is one embodiment of the present system that may have as a goal to minimize flicker. Merely to aid in the exposition of the system, it will be assumed that the system is seeking to render a particular subset or area of an input image upon the display. This area could be as large as the entire image frame itself or as small as a single subpixel within the point spread function of a few backlight LEDs—or any area or subset of the image in between the entire image frame and a subpixel thereof. The choice of the image subset may be selected by the user or the system itself.

To achieve this goal of reducing flicker, the system could seek the values for the LEDs in the image subset to have substantially the minimum luminance modulation—as the system operates as a dynamic FSC system. Flicker primarily occurs during the rendering of an image over a number of fields when a low luminance field of color (i.e. blue) is preceded or followed by a field of high luminance color (e.g. green). Many previous attempts to reduce flicker in FSC, projectors having color wheels and like have been well documented in the literature. The present system provides a different approach to reducing flicker.

Figure 17:
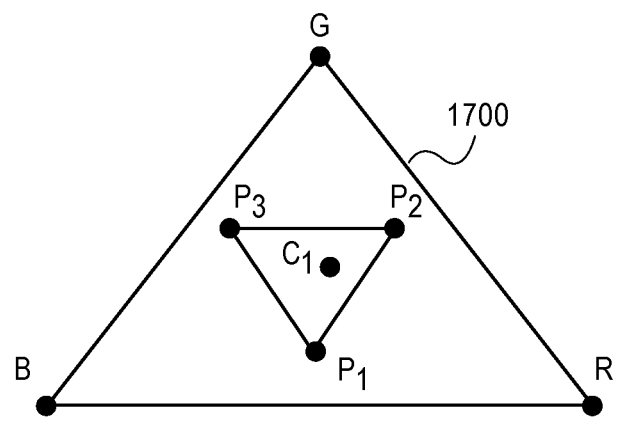
FIG. 17 shows the backlight LED gamut of FIG. 16 with three virtual primaries and a given color within the virtual primary gamut.

Shown in FIG. 17, simplified for explanatory purposes only, an equilateral triangle 1700 is the original input color gamut (e.g. RGB in our example) and three virtual primaries, $P_1$, $P_2$ and $P_3$, are shown. It will be appreciated that the particular number of primaries of the input gamut and number of virtual primaries might change with the actual number of backlight and LCD primaries and suitable changes to the present discussion could be effected to accommodate such different systems.

In one embodiment of the present system, the system may comprise: a spatial light modulator for displaying an output color image formed from an input signal comprising a set of color input values; the spatial light modulator substantially comprising a set of individually controllable transmissive elements; a plurality of individually addressable colored light emitters disposed as a backlight to provide light for forming a color image on the spatial light modulator; each light emitter producing light in one of a plurality of primary colors; for a plurality of regions, said regions comprising a set of point spread functions of a set of said light emitter, a first mapping operation for selecting a set of virtual primaries that bound each color input value within each said region, said virtual primaries comprising a plurality of intensities of said plurality of said light emitters within said set of point spread functions; field sequential control circuitry for controlling the duration and illumination of said virtual primaries over a set of fields comprising an intermediate color signal formed by said light emitters within each said region to produce an intermediate color image onto said spatial light modulator; and circuitry for controlling said set of transmissive elements within each said region to modulate said intermediate color image to produce said output color image. Each of these elements and subsystems will now be described with great detail below.

Finding Virtual Primaries

For any given color, $C_1$, inside the virtual primary gamut, there is a value $\chi_1 P_1$, $\chi_2 P_2$ and $\chi_3 P_3$ that substantially equals the input RGB value in appearance to the human vision system. As each virtual primary may be decomposed into the original primary values, we have:

$$\chi_1(R_1,G_1,B_1)+\chi_2(R_2,G_2,B_2)+\chi_3(R_3,G_3,B_3)=RGB \text{ value for } C_1 \quad \text{Equation 10}$$

Restated as a matrix:

$$\begin{pmatrix} R \\ G \\ B \end{pmatrix} = \begin{pmatrix} R1 & R2 & R3 \\ G1 & G2 & G3 \\ B1 & B2 & B3 \end{pmatrix} \cdot \begin{pmatrix} x1 \\ x2 \\ x3 \end{pmatrix}$$

Then inverted to find the values:

$$\begin{pmatrix} x1 \\ x2 \\ x3 \end{pmatrix} = \begin{pmatrix} R1 & R2 & R3 \\ G1 & G2 & G3 \\ B1 & B2 & B3 \end{pmatrix}^{-1} \cdot \begin{pmatrix} R \\ G \\ B \end{pmatrix}$$

Expanded:

$$\begin{pmatrix} x1 \\ x2 \\ x3 \end{pmatrix} = \frac{\begin{pmatrix} R \cdot G2 \cdot B3 - R \cdot G3 \cdot B2 - G \cdot R2 \cdot B3 + G \cdot R3 \cdot B2 + \\ B \cdot R2 \cdot G3 - B \cdot R3 \cdot G2 - R \cdot G1 \cdot B3 + R \cdot B1 \cdot G3 + \\ G \cdot R1 \cdot B3 - G \cdot R3 \cdot B1 - B \cdot R1 \cdot G3 + B \cdot R3 \cdot G1 \\ R \cdot G1 \cdot B2 - R \cdot B1 \cdot G2 - G \cdot R1 \cdot B2 + G \cdot R2 \cdot B1 + \\ B \cdot R1 \cdot G2 - B \cdot R2 \cdot G1 \end{pmatrix}}{\begin{pmatrix} R1 \cdot G2 \cdot B3 - R1 \cdot B2 \cdot G3 - R2 \cdot G1 \cdot B3 + \\ R2 \cdot B1 \cdot G3 + R3 \cdot G1 \cdot B2 - R3 \cdot B1 \cdot G2 \end{pmatrix}}$$

Figure 18:
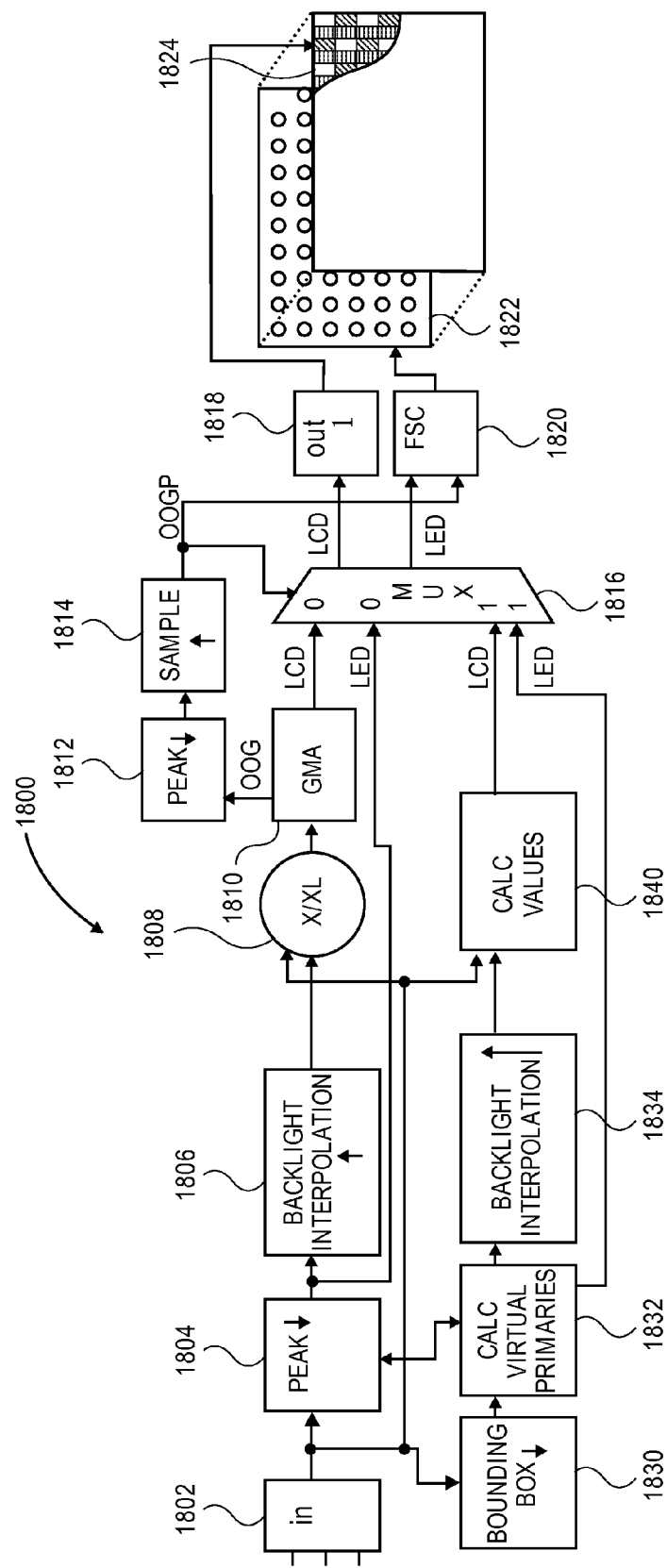
FIG. 18 is a block diagram of a hybrid system with both spatial and virtual primary means of adjusting the LED backlight and LCD values.

From Equation 10, it is possible to find expressions for $\chi_1$, $\chi_2$, and $\chi_3$. Of course, there are many ways in which these values may be determined—including straight-forward matrix algebra manipulations as shown above. It will now be presented merely one possible embodiment for determining virtual primaries and a system (1800) utilizing it, as shown in FIG. 18.

System 1800 inputs image data into input gamma unit 1802. From there, image data may precede along either one or multiple data paths FIG. 18 depicts a system with two data paths. In a first path, image data may proceed somewhat as described above—along peak unit 1804, interpolation unit 1806, X/XL unit 1808, GMA 1810, OOG peak unit 1812 to a up-sample unit 1814. From there, depending on the signal OOGP supplied to Mux 1816, one of two data paths could be selected to drive backlight 1822 and LCD 1824 via output gamma unit 1818 and a Field Sequential Color control unit 1820. OOGP is a signal that indicates whether or not there were any OOG color values in the point spread function of an LED. If there were no such OOG color values, then the first data path is selected by Mux 1816. If there are, however, some OOG color values, the second data path is selected, employing some technique to prevent the colors from going out of gamut. One such technique is the use of these virtual primaries.

Figure 22:
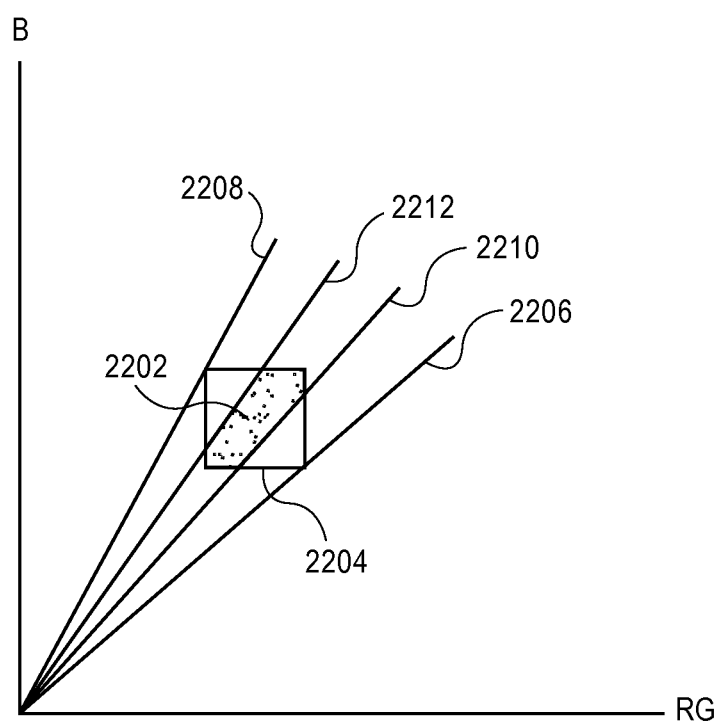
FIG. 22 is a diagram showing two embodiments of the bounding box module of FIG. 21A

A first step in calculating the virtual primaries could be to identify all of the input sample colors that will lie inside the point spread function of a single LED or cluster of LEDs if, for example, the LED colors are not coincident. The second data path could accomplish this by inputting data from input gamma unit 1802 to a bounding box unit 1830. Bounding box unit 1830 could find the these values and calculate a maximum and minimum value on each axis, for example max(R), min(R), max(B), min(B), max(G), min (G), etc. These limits describe a bounding box that encloses all the colors inside the point spread function for a single LED. FIG. 22 shows a diagram of this process. Points 2202 represent all the input pixels that lie within the point spread function of a single LED. The box 2204 shows two of the axes of the bounding box that result.

Next a formula for three planes may be found that enclose all the colors inside the bounding box. These planes may be created by anchoring them at the origin at one point, at a corner of the bounding box at a second point, and passing through the origin at 45 degrees to two of the axes. It may be visualized by considering each of the color planes for RG, GB and BR rotating towards the opposite axis (RG plane to B axis, GB to R and BR to G) until they just touch one corner of the bounding box. Line 2206 shows a representation of the RG plane, viewed on edge, rotated towards the blue axis until it touches the closest corner of bounding box 2204.

Equation 11

$$\left|\begin{pmatrix} r & g & b & 1 \\ 0 & 0 & 0 & 1 \\ 0 & 1 & -1 & 1 \\ \min(R) & \max(G) & \max(B) & 1 \end{pmatrix}\right| = 0$$

Determinant formula of a plane passing through the origin, a point on a 45 degree line on the GB plane, and an outer corner of the bounding box.

$$\left|\begin{pmatrix} r & g & b & 1 \\ 0 & 0 & 0 & 1 \\ -1 & 0 & 1 & 1 \\ \max(R) & \min(G) & \max(B) & 1 \end{pmatrix}\right| = 0$$

Determinant formula of a plane passing through the origin, a point on a 45 degree line on the BR plane, and an outer corner of the bounding box.

$$\left|\begin{pmatrix} r & g & b & 1 \\ 0 & 0 & 0 & 1 \\ 1 & -1 & 0 & 1 \\ \max(R) & \max(G) & \min(B) & 1 \end{pmatrix}\right| = 0$$

Determinant formula of a plane passing through the origin, a point on a 45 degree line on the RG plane, and an outer corner of the bounding box.

Each of these formulas in Equation 11 above describes a plane in color space that looks like a line in CIE xy space. If calculated as above, the lines in CIE xy space will be substantially parallel to the chromaticity triangle of the input data when close to the edges. This may be desirable if the bounding box lies near one of the input primaries. If the opposite corner of the bounding box is used to define the three planes, the resulting triangle appears rotated about 60 degrees to the triangle calculated by the method above. Line 2208 shows a representation of rotating the RG plane to the opposite corner of bounding box 2204. This orientation may produce better results when the bounding box is closer to the center of the chromaticity triangle. To calculate the planes this way, it may be possible to use the following formula:

Equations 12

$$\left|\begin{pmatrix} r & g & b & 1 \\ 0 & 0 & 0 & 1 \\ 0 & 1 & -1 & 1 \\ \max(R) & \min(G) & \min(B) & 1 \end{pmatrix}\right| = 0$$

Determinant formula of a plane passing through the origin, a point on a 45 degree line on the GB plane, and an inner corner of the bounding box.

$$\left|\begin{pmatrix} r & g & b & 1 \\ 0 & 0 & 0 & 1 \\ -1 & 0 & 1 & 1 \\ \min(R) & \max(G) & \min(B) & 1 \end{pmatrix}\right| = 0$$

Determinant formula of a plane passing through the origin, a point on a 45 degree line on the BR plane, and an inner corner of the bounding box.

$$\left|\begin{pmatrix} r & g & b & 1 \\ 0 & 0 & 0 & 1 \\ 1 & -1 & 0 & 1 \\ \min(R) & \min(G) & \max(B) & 1 \end{pmatrix}\right| = 0$$

Determinant formula of a plane passing through the origin, a point on a 45 degree line on the RG plane, and an inner corner of the bounding box.

Alternatively, the bounding box unit could perform the above plane intersection calculations by surveying all of the input sample colors that will lie inside the point spread function of a single LED. The angle to every input color in the point spread function may be calculated. The minimum (or alternatively, maximum) of these angles is used instead of the angle to the corner of the bounding box. Lines 2210 and 2212 show how surveying all the points 2202 may result in a better fit to the input colors 2202 than using the bounding box 2204 This in turn may select a smaller triangle and virtual primaries that are closer together than a bounding box because a bounding box may enclose a larger volume of the gamut than is necessary. Virtual primaries that are closer together may result in lower power consumption and decreased flicker in the display—for example, two other operating characteristics for which the system could be optimized.

It may be desirable in some circumstances to increase the spread of the virtual primaries beyond even the locations chosen by the bounding box algorithm. This may be accomplished by decreasing (or increasing) the angles after calculating them using the bounding box or survey method.

However the three planes are chosen, the three lines in CIE xy space describe a triangle (or other suitable enclosed region) and the intersection points of the lines are three colors. These three colors can be used as virtual primaries that can display any color that lies inside the triangle and thus inside the bounding box. These intersection points can be found many different ways, one way is by converting the lines to CIE xy space and using line intersection formula. This may require conversion to floating point so a method that leaves the planes in the linear RGB co-ordinate space may be desired. One such method that may not require floating point is to intersect each pair of the above three equations with a fourth plane that is perpendicular to the line of grays:

$$\left|\begin{pmatrix} r & g & b & 1 \\ 1 & 0 & 0 & 1 \\ 0 & 1 & 0 & 1 \\ 0 & 0 & 1 & 1 \end{pmatrix}\right| = 0 \quad \text{Equation 13}$$

The intersection of two of the rotated planes above may describe a line radiating from the origin. Every point on the line may have substantially the same chromaticity. Any line that comes out of the origin through the color cube should intersect the perpendicular plane of Equation 13 without integer overflow or divide by zero problems. The resulting point should be one of the virtual primaries. It may be advisable to scale all resulting virtual primaries until they touch the edge of the gamut. This allows that the LEDs may be bright enough to illuminate pixels between areas calculated with normal FSC colors and areas calculated with virtual primaries. Alternatively, it may be desirable to scale the virtual primary colors down to the same luminosity as the brightest color in the bounding box to reduce power consumption in the LED backlight and decrease the quantization error imposed on the overlying LCD.

In another embodiment, the component colors of the virtual primaries may be limited to the maximum duty cycle of each LED. For example, the red LED can be "on" fully in the first field of a frame and "off" in the following two. Alternatively, the red LED can be on one third in all three fields of a frame. In both these examples, the total power to the red LED is the same over time. This limit can be enforced by summing the red across all the virtual primaries and scaling it down until the total matches the duty cycle of the red LED. The same calculation may be done with green, blue and any other LED primaries in the backlight. The result of these calculations are three colors—$P_1$, $P_2$ and $P_3$—that describe a set of primary colors that in combination can produce any of the colors in the bounding box. This step may be accomplished by the "Calc virtual primaries" module 1832. These primaries may be later loaded into the LED sequentially.

The point spread function of the LEDs may be used to interpolate the color of the virtual primaries in the LED backlight into an image with the same resolution as the input sample points. This may be accomplished by the "BackLight Interpolation" module 1834.

These results may be combined with the original RGB colors in "Calc. $\chi$ Values" 1840 to produce values to be run through output gamma module 1818 to convert them to the output quantization values available on the display. The $\chi$ output values may be put in the LCD display 1824 while the virtual primaries are displayed sequentially in the LED backlight by the FSC module 1820.

For displays systems that have the general form as the block diagram 1800 that have point spread functions of the LEDs that overlap each other, it is possible that there will be an overlap between steady backlight LED point spread functions and dynamic virtual primary LED point spread functions. In these cases, the resulting backlight illumination may be a mixture of steady and field sequential color illumination. Each field may have a different color and brightness, but not necessarily spread out enough to contain all of the colors using $\chi$ values. This may mean that the $\chi$ values may not be able to reconstruct all of the colors in this overlapping point spread function. In these cases, it may be possible to find X/XL and GMA values for each field that are in gamut, especially for those pixels that are either darker than the average of the surrounding pixels or those that are nearer to the LEDs that are steady and thus may exhibit lower spread caused by contribution from the overlapping field sequentially modulated virtual primary driving LEDs.

Using the X/XL and GMA derived value for each field may have the advantage of reducing the potential visibility of color break-up and/or flicker. Some colors may be in gamut, that is, they may be OOG for one or more of the fields when using the X/XL and GMA derived values and yet also be OOG for the value system. In such cases, the average value of the illumination of the several virtual primary fields may be useful in calculating and X/XL and GMA derived value that will reconstruct the desired color. Stated another way, the sum of the overlapping steady state and dynamic virtual primary fields over time may be used as if it was a steady state illumination to calculate the X/XL and GMA value for overlying pixels.

The above two methods of using the X/XL and GMA values instead of $\chi$ values may also be used in the areas that are illuminated by only the virtual primaries controlled LEDs. This allows a display system to use only virtual primaries, eliminating overlap between virtual primary and steady, peak function 1804, derived LED point spread areas. In such a system, it may be advantageous to attempt to reconstruct the desired color in the following order, X/XL and GMA derived values for each virtual primary field to reduce the potential for color break-up and flicker, followed by either the X/XL and GMA derived values for the average color (sum) of the virtual primary fields or the $\chi$ derived values for each virtual primary field.

Another method or mode of operation is to use "interim virtual primaries". Interim virtual primaries are a color set formed by the X/XL and GMA that bound the desired color. This color set may then be passed to the Calc $\chi$ Values block. The final values for the LCD may then be found by multiplying the X/XL and $\chi$ values together. This method or mode of operation may reduce the potential visibility of color break-up and flicker.

Yet another method or mode of operation is to concentrate the brightness of the steady backlight into one of four time slots to effectively become a fourth field of a virtual primary field sequential color system. With four virtual primaries, there may exist the possibility of metamers for desired colors and thus of metamer selection. One possible metamer may be to minimize the virtual primary this is furthest from the desired color. If this minimum is zero, then the color may effectively be reconstructed by only three virtual primaries and may be calculated using the three virtual primary $\chi$ value calculation method described above.

It will be appreciated that this system is one of many possible systems to handle OOG conditions. Other variations of this system are possible and contemplated in the present application. For example, SPR could be implemented/combined in this system as similar to the above. Additionally, many blocks (e.g. GMA, X/XL) are repeated in FIG. 18; but other embodiments could reuse the same hardware to avoid duplication. Other methodologies of handling OOG conditions are possible as well.

Figure 23:
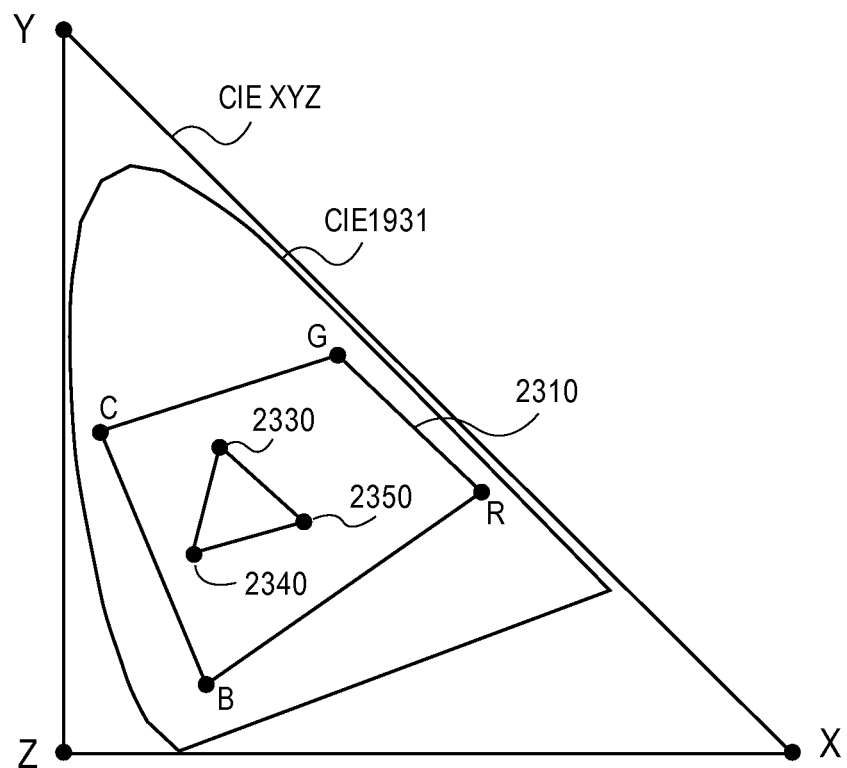
FIG. 23 is a CIE 1931 color chart with superimposed XYZ primaries showing a multiprimary backlight LED gamut and an individual image gamut map smaller than the multiprimary backlight LED gamut.

It will be similarly appreciated that other systems might employ different number of multiprimary backlights—e.g. R, G, B, C LEDs (where C is cyan). The techniques of the above methods could be extended similarly to calculate other chromaticity areas as is needed (e.g. quadrilaterals, triangles or other regions). In FIG. 23, the gamut of allowable colors is expanded using a fourth color LED light emitter. This additional emitter may be substantially cyan colored as discussed earlier. Any set of virtual primaries 2330, 2340, 2350 may be created, for merely one example, with any allowable metameric combination of the color LED emitters. Since the color space that the virtual primaries may take is larger than the traditional RGB primaries, one may use any suitable primaries that will enclose the larger multiprimary color gamut. In another embodiment, this set of primaries may be imaginary. That is to say, that they may be mathematically useful, but physically unrealizable. One such set of primaries is the CIE XYZ primaries. Since any realizable virtual primary may be described as a linear combination of XYZ primaries, the RGB notation in the above calculations may be replaced with XYZ notation with suitable transforms between the color spaces, as is known in the art.

In an embodiment employing FSC techniques, it may be desirable to reduce FSC artifacts, such as color break-up and flicker. One approach may be to have the chromaticity areas not tightly bound to the distribution of colors found within each LED point spread function. Tight binding may give rise to greater disparity in $\chi$ values—possibly causing a greater chance of visible flickering.

Instead, it is possible to select virtual primaries that create a virtual gamut proportionally larger than the distributions of colors found in each LED point spread function. One method may be to move the primaries by some fixed distance or proportional distance toward the original RGB (or RGBC) primaries. Another method may be to find the centroid of the virtual primaries, then move the virtual primaries away from the centroid by some factor of the original distance. Another method may be to find the average value of the colors found in the image within the point spread function. The virtual primaries may be moved away by some factor of the original distance, or they may be moved by some function wherein they are proportionally moved further away when they are originally closer. A further refinement my be to weight brighter colors more than dark colors, as bright colors that have large interfield $\chi$ value modulation will be more likely to cause visible flicker.

As a solid color spanning an entire region of several LED point spread functions has zero distribution, the virtual primaries collapse to the same value. The desirability of using less primaries when possible may be accomplished by setting two or even three of the primaries to the same values. Additional logic may then combine the primaries and their $\chi$ values should remain the same. This combining of primaries where possible increases the temporal frequencies, and thereby reduces artifacts. The smaller the spread of (or distribution of) the desired pixel colors, the more likely this collapsing of virtual primaries.

Another embodiment may be to calculate the $\chi$ value error that is likely to occur as the slow responding liquid crystal display from one state to another to achieve the desired FSC modulation and adjust the virtual primaries to compensate. In such a case, the bright primaries may be made brighter and the dark primaries may be made darker.

Other FSC Techniques

Figure 19A:
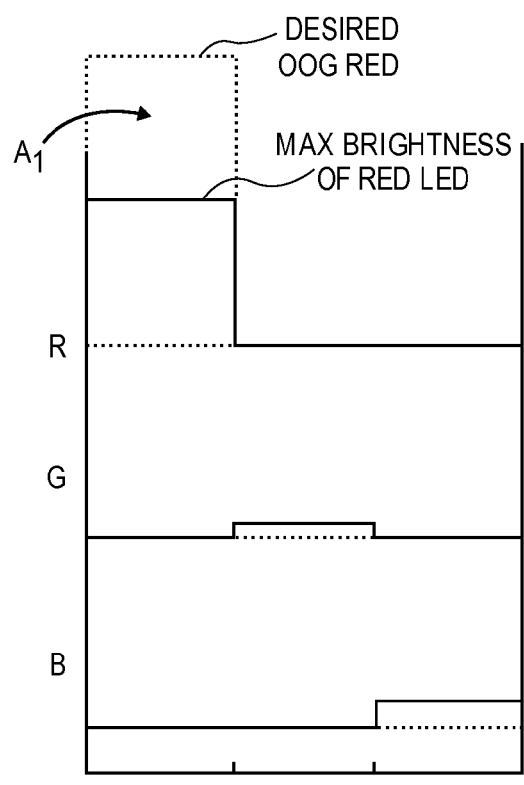
FIGS. 19A and 19B are diagrammatical representations of the two methods of reconstructing a given color by the system shown in FIG. 18
Figure 19B:
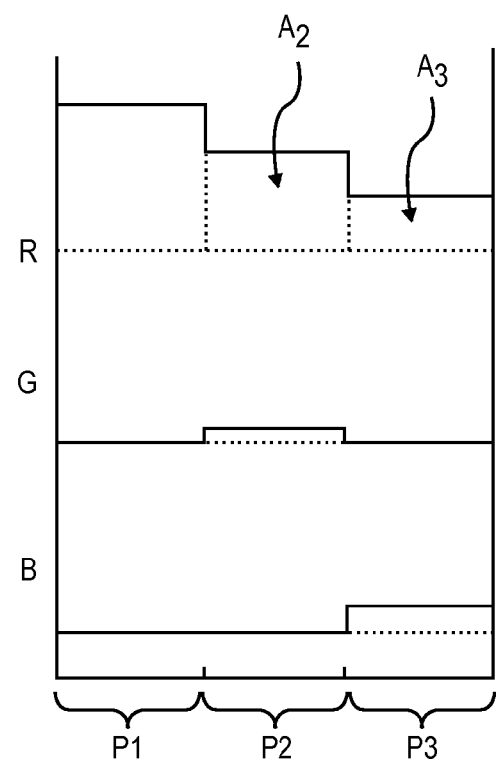

It is possible for a FSC backlight system to employ Pulse Width Modulation (PWM) scheme to drive the backlights comprising, for example, LEDs. FIGS. 19A and 19B shows one embodiment of a single Pulse Width Modulation (PWM) cycle for a FSC system to handle OOG conditions. In the example of FIG. 19A, suppose it is desired to exhibit a substantially red color which is slightly desaturated—so the green and blue LEDs are on slightly. Further in this example, suppose the red color to be exhibited is OOG (e.g. by about 2X in this example, as depicted as area A1 in FIG. 19A). The red LED cannot come on bright enough to display it. FIG. 19B shows the virtual primary system at work—instead of displaying R G and B in the three time slots of the PWM cycle, it is displaying primaries P1 (Red), P2 (red-orange) and P3 (dark magenta). It should be noted that the additional areas—A2 and A3—approximately equal the amount of OOG red area A1. So, the red curve in FIG. 19B now includes all the energy of the red input value of FIG. 19A and the color is no longer OOG.

In yet another embodiment, FIG. 20A shows a FSC waveform that produces substantially a white area in an LED backlight with the red, green and blue LEDs coming on sequentially to the roughly same amount. FIG. 20B shows how the same white value can be produced by turning the LED's on at one third the brightness for three times as long in each cycle. This is as if the three virtual primaries P1, P2 and P3 were all set to the same shade of grey. It is quite common for images to be black and white, grey scaled or to have large areas that have no color. It would be advantageous to detect these areas and use monochrome virtual primaries like FIG. 20B because this waveform would have no visible flicker while the waveform of FIG. 20A may have visible flicker. It may not be desirable, however, to generate the waveforms of FIG. 20B. Instead the waveform of FIG. 20C may be used, with the LEDs on proportional to the PWM scheme to produce the desired average brightness in a single FSC cycle. FIG. 20C may tend to have substantially reduced flicker because the flicker frequency is three times that of FIG. 20A and is beyond the range that the human visual system can detect it.

Dynamic Virtual Primary System Having Unfiltered LCD Display

Figure 21A:
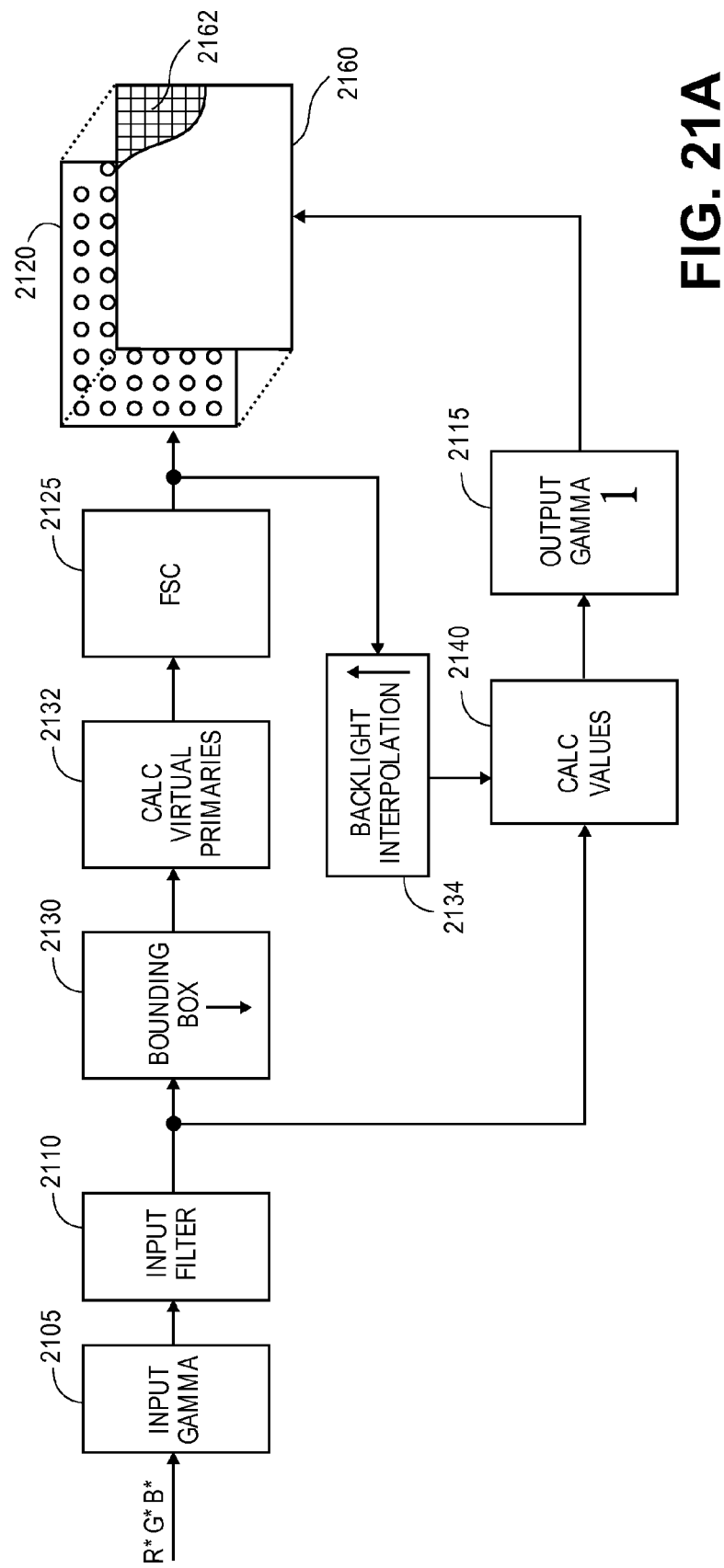
FIG. 21A is a block diagram of a virtual primary field sequential color system.

Another embodiment of the present invention is shown in FIG. 21A, in which there are no color filters in the pixel pattern 2162 in the overlying LCD 2160. This system operates with only "virtual primary field sequential color", as described above. In operation, the R*G*B* perceptually encoded data is linearized by the "Input Gamma" module 2105. An optional Input Filter 2110 may remove noise from the image. The "Bounding Box" module 2130 determines the color gamut map of the colors to be displayed in the point spread function of each of the LEDs. This data is used to calculate the virtual primaries in the "Calc Virtual Primaries" module 2132. These virtual primaries are displayed on the LED backlight array 2120 by the "FSC" module 2125. The "BackLight Interpolation" module 2134 determines the actual color available behind each pixel (i.e. unfiltered subpixel) of the LED 2160 by suitable interpolation and the known point spread function of the LEDs. These values are combined with the RGB image data to calculate the $\chi$ values by the "Calculate $\chi$ Values" module 2140. The $\chi$ values are gamma quantized by the "Output Gamma" module 2115 to those levels available on the LCD 2160.

Figure 21B:
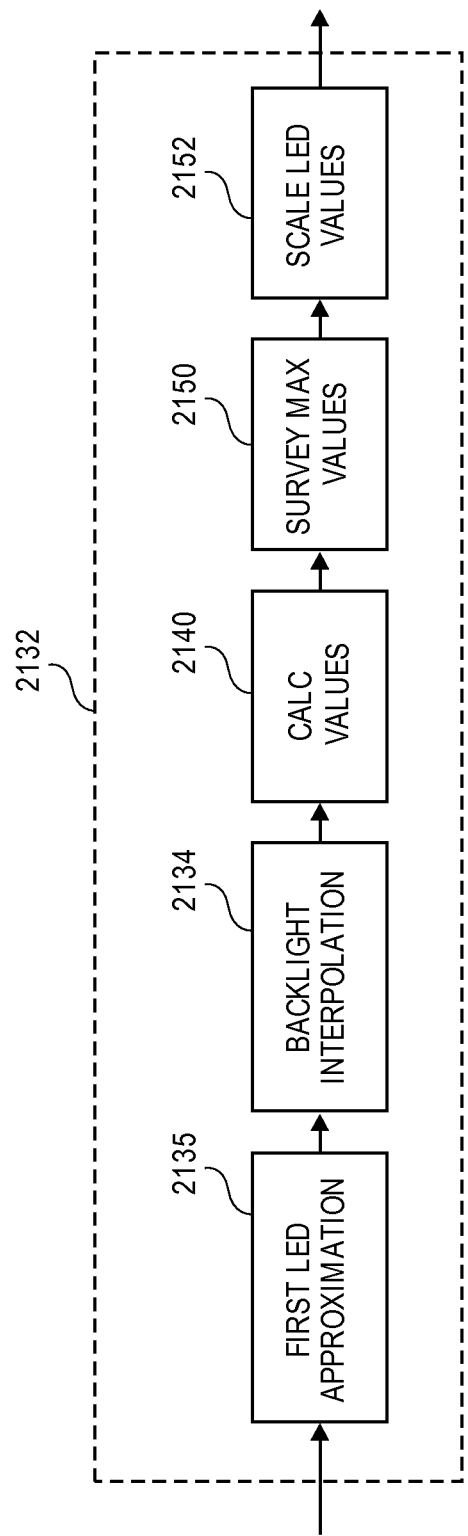
FIG. 21B is an alternative embodiment of the Calc Virtual Primaries module of FIG. 21A

With continued reference to FIGS. 21A and 21B, some example algorithms are described for the each module. The following discussion assumes some simplifying features of the backlight to simplify the description. For example, the LED backlight 2120 may be constructed to have triplets of red, green and blue LEDs in a rectangular layout with each triplet close enough together to be considered located at a single point. Each LED is assumed to have a rectangular point spread function. For the purpose of merely exposition of a single embodiment, it is assumed that the embodiment is constructed such that 8 LCD pixels are between each LED and that there is an "extra" row of LED's at the edge of the LCD matrix. It will be appreciated that these assumptions will vary for other systems constructed that fall within the scope of the present application.

Noise in the input image, such as speckle, can cause the following steps to decrease the dynamic range of the display or increase the power consumption in the LED backlight. For this reason it may be advantageous to add an optional Input Filter 2110 after Input Gamma module 2105 to remove this noise. Many image noise reduction filters are described in the literature. One embodiment may be to filter the chromatic components in a suitable color space such as YCrCb or CIELAB. This will tend to reduce chromatic noise. Real images often contain information that is not perceptible to the Human Vision System. Such information may cause the virtual primaries to be further apart than strictly needed if that information is found in high spatio-chromatic frequencies. Such chromatic noise is often found in the low light (dark) areas of an image. Filtering out such chromatic noise may allow a tighter, smaller virtual primary gamut with less variation in $\chi$ values, reducing the potential for visible artifacts.

Because Equations 11 and 13 above have many zeros and ones in the matrices, the formula for the intersections of these planes can be greatly simplified. Calculating the actual angle between one of the color planes and an input color point may be computationally difficult, but there are other metrics that are easier to calculate and sort in the same order as angles. The following three equations take an input color (r,g,b) and calculate one such metric:

$rangle = 2*r*MAXCOL/(2*r+g+b)$ $gangle = 2*g*MAXCOL/(r+2*g+b)$ $bangle = 2*b*MAXCOL/(r+g+2*b)$ Where MAXCOL is the maximum integer value of an input color after input gamma conversion in Module 2105. These formulas are simple enough that they may make surveying all the input points inside the point spread function of an LED practical. In Bounding Box module 2130, all the input pixels within the point spread function of an LED are converted to pseudo-angles like this and the minimum (or the maximum) of the pseudo-angle to each axis may be found. With 8 LCD pixels between each LED 2*8*2*8 or 256 input pixels may be surveyed to find the minimum angles for one backlight LED. Substantial savings in computation may be possible by storing intermediate results in line buffers or frame buffers.

Once the minimum angles are found, these may be used in Calc Virtual Primaries module 2132. As described above, the intersection of two of the planes in Equations 11 with the diagonal plane of Equation 13 may result in one of the virtual primaries. When the plane intersection formula are expanded out into algebraic notation, a relatively simple calculation results. Below is the calculation for the virtual primary that is substantially close to the green axis:

$$Rp1 = MAXCOL*rmin/(2*MAXCOL-rmin)$$

$$Gp1 = MAXCOL*gmin/(2*MAXCOL-gmin)$$

$$Bp1 = MAXCOL*(4*MAXCOL^2-4*MAXCOL*gmin-4*rmin*MAXCOL+3*gmin*rmin)*(rmin*gmin-2*rmin*MAXCOL-2*MAXCOL*gmin+4*MAXCOL^2)$$

Where rmin, gmin and bmin are the minimum values from surveying the surrounding input color values with the pseudo-angle formula above. The result of this is the RGB co-ordinate of the virtual primary P1. A similar equation calculates the RGB co-ordinates of virtual primary P2:

$$Rp2 = MAXCOL*(4*MAXCOL^2-4*MAXCOL*bmin-4*MAXCOL*gmin+3*gmin*bmin)/(4*MAXCOL^2-2*MAXCOL*bmin-2*MAXCOL*gmin+gmin*bmin)$$

$$Gp2 = MAXCOL*gmin/(2*MAXCOL-gmin)$$

$$Bp2 = MAXCOL*bmin/(2*MAXCOL-bmin)$$

And third, another set of similar equations calculates the RGB co-ordinates of virtual primary P3:

$$Rp3 = MAXCOL*rmin/(2*MAXCOL-rmin)$$

$$Gp3 = MAXCOL*(4*MAXCOL^2-4*MAXCOL*bmin-4*MAXCOL*rmin+3*rmin*bmin)/(4*MAXCOL^2-2*MAXCOL*bmin-2*MAXCOL*rmin+rmin*bmin)$$

$$Bp3 = MAXCOL*bmin/(2*MAXCOL-bmin)$$

As described above, these virtual primaries may be scaled until they touch the edge of the gamut for a maximum brightness display. Alternatively, they can be scaled to the maximum brightness of the input colors inside the point spread function of the LED. If Bounding Box down-sample module 2130 calculated the maximum brightness while surveying the minimum angles and stored it in variable Lmax, the equations for doing the scaling might take the form:

$$Rp1 = Rp1*Lmax/\max(Rp1,Gp1,Bp1)$$

$$Gp1 = Gp1*Lmax/\max(Rp1,Gp1,Bp1)$$

$$Bp1 = Bp1*Lmax/\max(Rp1,Gp1,Bp1)$$

$$Rp2 = Rp2*Lmax/\max(Rp2,Gp2,Bp2)$$

$$Gp2 = Gp2*Lmax/\max(Rp2,Gp2,Bp2)$$

$$Bp2 = Bp2*Lmax/\max(Rp2,Gp2,Bp2)$$

$$Rp3 = Rp3*Lmax/\max(Rp3,Gp3,Bp3)$$

$$Gp3 = Gp3*Lmax/\max(Rp3,Gp3,Bp3)$$

$$Bp3 = Bp3*Lmax/\max(Rp3,Gp3,Bp3)$$

Also as described above, it may be desirable to limit the total power of each LED. In this example with three virtual primaries, limiting the sum of the red in all three to the maximum color value allowed may result in a duty cycle of ⅓. The same is true for green and blue LEDs. This calculation may not be needed if the sum of the red values in all three virtual primaries is already less than MAXCO. Thus the pseudo-code may take the following form:

```
Div = math.max(Rp1+Rp2+Rp3,Gp1+Gp2+Gp3,Bp1+Bp2+Bp3)
if Div > MAXCOL then
    Rp1 = Rp1*MAXCOL/Div
    Gp1 = Gp1*MAXCOL/Div
    Bp1 = Bp1*MAXCOL/Div
    Rp2 = Rp2*MAXCOL/Div
    Gp2 = Gp2*MAXCOL/Div
    Bp2 = Bp2*MAXCOL/Div
    Rp3 = Rp3*MAXCOL/Div
    Gp3 = Gp3*MAXCOL/Div
    Bp3 = Bp3*MAXCOL/Div
end
```

When an area of the display is substantially monochrome, the virtual primaries may lie close together on a chromaticity diagram and may have substantially identical values. The calculations above may result in the three virtual primaries having values near ⅓ their maximum in each field, but adding up to 100% in a whole frame. However, when an area of the image has high chromatic spatial frequencies, the virtual primaries may be very far apart. In that case, the equations above may allow each virtual primary to have most of its power in one field, since in this case it will be off or low power in the other fields of the same frame.

The power reduction calculations above may work well when the pixels inside the point spread function of an LED are substantially monochrome, but may not find the lowest power in areas with high chromatic spatial frequencies. Another embodiment to decrease the power in the LED backbuffer might be to survey the largest χ values inside the point spread function of each LED. This maximum χ value can then be used to scale the LEDs down to the lowest possible values. However, the χ values may not be calculated until later in Calc χ Values module 2140. One embodiment may be to have a duplicate Backlight Module 2134 and duplicate Calculate χ Values module 2140 inside Calc Virtual Primaries module 2132. This is shown in FIG. 21B. First LED Approximation module 2135 would perform the calculations described above for Calc Virtual Primaries Module 2132. The duplicate modules 2134 and 2140 would calculate a first approximation of the χ values. Then these χ values may be analyzed by Survey Max χ Values to find the largest value in the point spread function of each LED. Then the final value of each LED may be calculated by Scale LED Values module 2152. These last two steps could be implemented using the following pseudo-code:

```
for j=0,15 do          survey the max xhi value in the point spread function (PSF)
    for i=0,15 do      loop for all pixels in PSF
        local xhi=spr.fetch("LCD",x*8+i-8,y*8+j-8,xbuf)    fetch the xhi value
            maxhi=math.max(maxhi,xhi)                      find the maximum one
    end pixels in PSF
end lines in PSF
local r,g,b=spr.fetch(ledbuf,x,y)                read in LED buffer values
maxhi=math.max(MAXCOL,maxhi+floor)               prevent zero valued determinants D
r=r*maxhi/MAXCOL                 Scale LED Values
g=g*maxhi/MAXCOL
b=b*maxhi/MAXCOL
spr.store(ledbuf,x,y,r,g,b)                      store them back in LED buffer
```

This algorithm may be repeated for each LED triplet in each of the three fields. This second approximation of the LED values may have substantially reduced values and reduced power consumption.

The embodiment above produces the calculation of the virtual primaries for a single LED in all three fields of a frame. In FIG. 21A these LED values above are passed to FSC module 2125, which may include a small LED frame buffer for storing them.

Backlight Interpolation module 2134 may use the values from the LED frame buffer to calculate the effective backlight color under each pixel 2162 in LCD matrix 2160. It may be possible to do this calculation on the fly as pixels are displayed, or it may be desirable to pre-calculate all the effective backlight colors and store them in another frame buffer. If so, three frame buffers may be used to store the effective backlight colors for all three fields of a single frame. Each location in each of these buffers may be calculated from at most 4 surrounding LEDs in this example configuration. The equations below may use a point-spread function stored in a look-up table named spread. In this example, the values in this table are eight 12 bit integers with 4096 being the encoding for the brightness directly over the LED. The following equations calculates one effective backlight color (rs,gs,bs) for one location (x,y) in one field:

$xb=x/8$ $yb=y/8$—position of a nearby LED $xd=\mathrm{mod}(x,7)$ $yd=\mathrm{mod}(y,7)$—distance to a nearby LED center $Rp,Gp,Bp=\mathrm{fetch}(xb,yb)$—get upper left LED color $psf=spread[xd]*spread[yd]/4096$—look up point spread function $rs=Rp*psf$—sum upper left LED $gs=Gp*psf$ $bs=b*psf$ $Rp,Gp,Bp=\mathrm{fetch}(xb+1,yb)$—color of upper right LED $psf=spread[7-xd]*spread[yd]/4096$—PSF for this led and pixel $rs=rs+Rp*psf$—sum upper left LED $gs=gs+Gp*psf$ $bs=bs+Bp*psf$ $Rp,Gp,Bp=spr.\mathrm{fetch}(ledbuf,xb,yb+1)$—color of lower left LED $psf=spread[xd]*spread[7-yd]/4096$—PSF for this led and pixel $rs=rs+Rp*psf$—sum upper left LED $gs=gs+Gp*psf$ $bs=bs+Bp*psf$ $Rp,Gp,Bp=\mathrm{fetch}(xb+1,yb+1)$—color of lower right LED $psf=spread[7-xd]*spread[7-yd]/4096$—PSF for this led and pixel $rs=rs+Rp*psf$—sum upper left LED $gs=gs+Gp*psf$ $bs=bs+Bp*psf$ $rs=rs/4096$—sum was 12-bit precision $gs=gs/4096$—collapse them back to pixel precision $bs=bs/4096$ A calculation like the pseudo-code above may be performed for each pixel in each field of the frame. The resulting values may be used by the Calc χ Values module 2140. This module may use the expanded Equation 10 from above to calculate the χ values for each LCD pixel in all three fields. This equation involves a matrix inversion, however, and not every matrix can be inverted. So first the determinant of the matrix may be calculated and tested to make sure it is not zero. If it is not, then Equation 10 can be used almost exactly as is. In actual use, the pixel values are integers between 0 and the maximum possible value MAXCOL, so an additional factor of MAXCOL is required in each calculation. In the following pseudo-code, the values (R1,G1,B1) is the effective backlight color from the first field at a single location, (R2,G2,B2) and (R3,G2,B3) are the effective backlight colors from the second and third field of a frame. And (R,G,B) is the input color at that location in the display after Input Gamma module 2105.

```
D = R1*G2*B3-R1*B2*G3-R2*G1*B3+R2*B1*G3+R3*G1*B2-R3*B1*G2
if D!=0 then
    x1 = ((G2*B3-B2*G3)*R+(R3*B2-R2*B3)*G+
          (G3*R2-R3*G2)*B)*MAXCOL/D
```

-continued

```
    x2 = ((B1*G3-G1*B3)*R+(R1*B3-B1*R3)*G+
         (R3*G1-R1*G3)*B)*MAXCOL/D
    x3 = ((G1*B2-B1*G2)*R+(B1*R2-R1*B2)*G+
         (R1*G2-G1*R2)*B)*MAXCOL/D
end
```

These calculations may allow a region of the display that is substantially monochrome to display the same value in all three fields of a frame, reducing flicker. This may work with black and white images or areas of an image that are monochromatic in any color. For one examples of this, consider a ramp of red, or a picture taken under red light in a darkroom. Images that have some colored areas and others monochrome may tend to switch to this low-flicker mode inside monochrome areas that are sufficiently far away from colored areas (beyond the point spread function of the LEDs). The calculations above may be done for each input pixel value and passed on to Output Gamma module 2115 and then to LED matrix 2160, the $\chi 1$, $\chi 2$ and $\chi 3$ values each in their own field of the frame.

The system in FIG. 21A allows the backlight array 2120 to be individually controlled. In some embodiments, the LEDs, or other colored light sources, may not be individually spatially controlled, only its overall intensity. In such a case, the point spread function becomes a globally uniform function. The BackLight Interpolation function 2134 becomes redundant. Such a system still shows reduced field sequential color artifacts since most images to be displayed are likely to have a gamut map smaller than the full gamut range of the color primaries of the backlight array 2120. This embodiment may be useful in color projectors in which colored light from controllable sources such as LEDs or laser pumped frequency converters (non-linear optical devices) are intensity modulated in sequential fields.

In the discussion within this present application, a dynamic field sequential display device is described that may suffice if it comprises a backlight, wherein the backlight is capable of illuminating a plurality of colors and a plurality of intensities of said colors, wherein said colors and intensities of said colors may be independently reproducible across a set of regions forming the backlight; and if it further comprises control circuitry for dynamically selecting the color and intensity of the backlight at a given region. This selection may be further dependent upon the input color values at a given region. As may be appreciated, conventional field sequential display devices tend not to have independent controls over both the intensity and color of a region of the image at any given point in time and further such controls are not dependent upon the input color values at a point in time and to optimize for certain operating criteria.

Segmented Backlight

Having now discussed various embodiments for display systems having novel backlighting arrangements and methods for operating the same, it will now be described display systems having novel backlights, e.g. segmented, that extend the above described system and methods of operation. These novel backlights may also tend to lower the cost of the backlight for such novel displays as such systems may employ a reduced number of light elements to achieve substantially similar improvements in dynamic contrast and other benefits associated with the array version of such display systems.

In one embodiment, a display system comprises a backlight outputting light in accordance with a first control signal, said backlight comprising: a plurality of N+M light guides, wherein N light guides disposed in a first direction and M light guides disposed a second direction, said light guides overlapping and forming a N×M set of optically communicating intersections; a plurality of N+M individually addressable light emitter units, each of said N+M light emitter unit being associated with and optically connected to one of said N+M light guide respectively; each light emitter unit capable of producing broad spectrum light for in one of a plurality of colors; a spatial light modulator for displaying an output color image, said spatial light modulator receiving light from said backlight and modulating said light in accordance to a second control signal; and controller circuitry for providing said first signal and said second signal, said controller circuitry receiving input color image data and determining said first and said second control signals and outputting said first signal to said plurality of individually addressable light emitter units and outputting said second control signal to said spatial light modulator such that the combination of said light from said backlight and modulated by said spatial light modulator produces an output image based upon said input color image data.

Display System Comprising Multiple Segmented Backlight

Figure 25:
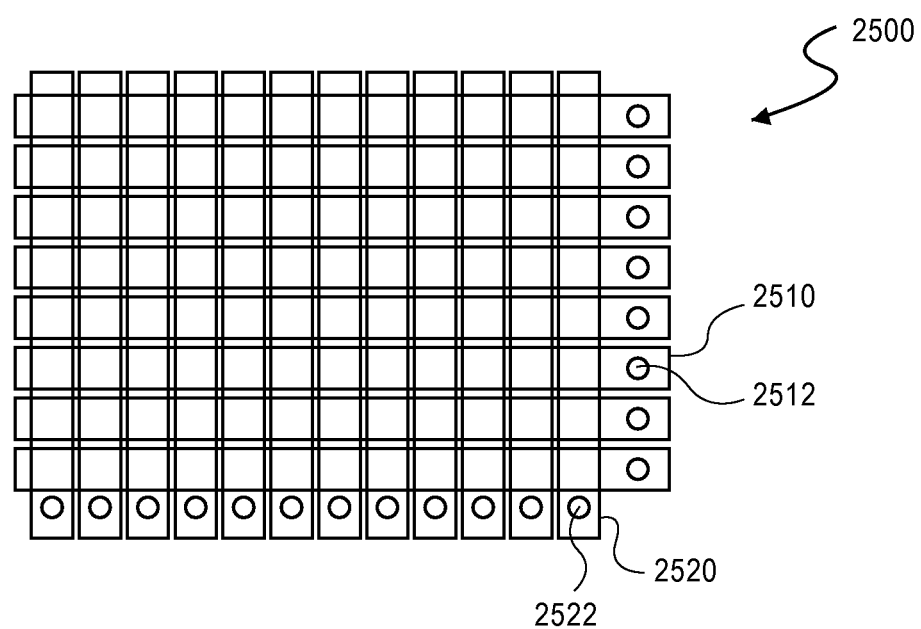
FIG. 25 depicts one embodiment of a novel segmented backlight for use in a display.

As discussed above, the backlight of many embodiments may comprise an array of emitters (e.g. backlight 120 of FIG. 1A) operated as a low resolution imaging device that is convolved with a higher resolution LCD overlying it. To achieve a given N×M backlight resolution, N×M number of emitters 122 (or cluster of emitters for color or added brightness) is needed in array-type configurations. In contrast, referring to FIG. 25 which shows one embodiment of the present invention, novel backlight 2500 may achieve approximately N×M resolution by using approximately N+M number of emitters 2512 & 2522. The manner in which this may be achieved and the methods by which this novel backlight 2500 may be operated will be explained below.

Figure 26:
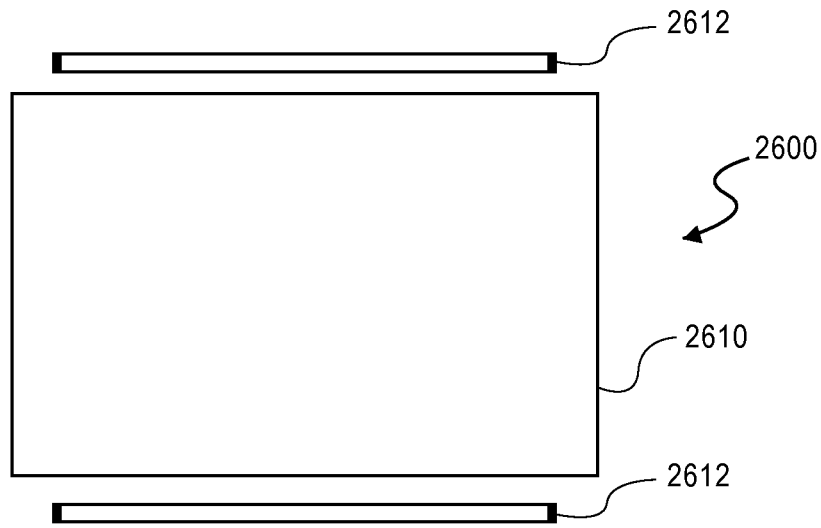
FIG. 26 depicts a conventional backlight comprising a light guide and two emitters.

Consider the prior art backlight 2600 shown in FIG. 26. It is comprised of a flat light guide 2610 and two light emitters 2612. The flat light guide 2610 includes features on at least one surface features to frustrate the total internal reflection, redirecting light toward an overlying spatial light modulator. The light emitters 2612 may be cold cathode fluorescent lamps (CCFL) as is commonly used in the art or other suitable light emitters such as Light Emitting Diodes (LED).

As taught in U.S. Pat. No. 5,717,422 to Fergason entitled "Variable Intensity High Contrast Passive Display" (and included herein by reference), the brightness of the light emitters 2612 may be controlled so as to dim the backlight 2600 in response to an image with less than full brightness while the overlying spatial light modulator, such as an LCD, is adjusted to allow more light to pass. The convolution of the reduced backlight 2600 brightness and increased transmittance of the spatial light modulator may maintain the desired image brightness while reducing light emitter 2612 power requirements and concomitantly increasing contrast of the spatial light modulator. However, if even a single pixel in the input image is at full brightness, the backlight emitter 2612 brightness must be also at full brightness if the image is to be reproduced with full fidelity.

Figure 27:
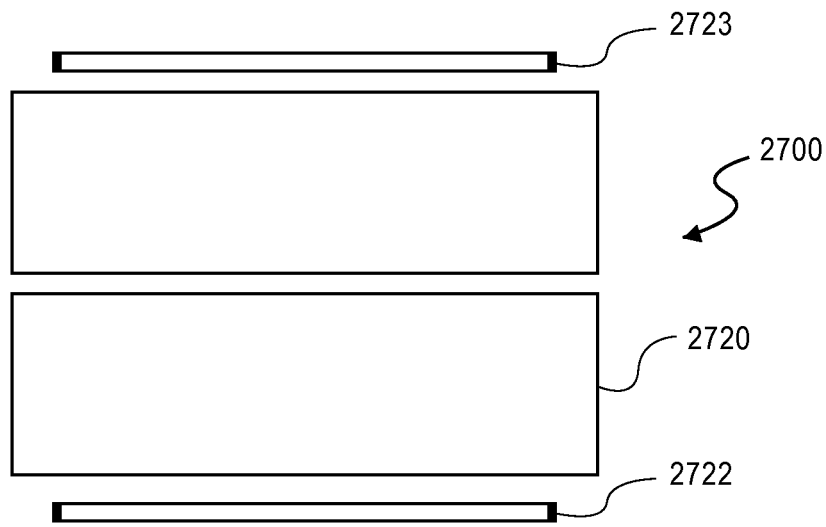
FIG. 27 depicts one embodiment of an improved backlight over the convention backlight of FIG. 26.

One embodiment of an improved backlight is depicted in FIG. 27. As may be noted, backlight 2700 is divided in two (or possibly more) optically separate light guides 2720 and 2721 that are coupled to light emitters 2722 and 2723 respectively. This may allow the light emitters 2722 and 2723 to have different brightness levels at a same time. Thus, if one pixel in half of the image is at full brightness, but the other half of the image is at a lower brightness, at least that half of the image may allow for a lower light emitter brightness. Statistically, this arrangement may allow for lower overall average light emitter brightness and power drain with potential concomitant image improvement.

Figure 28:
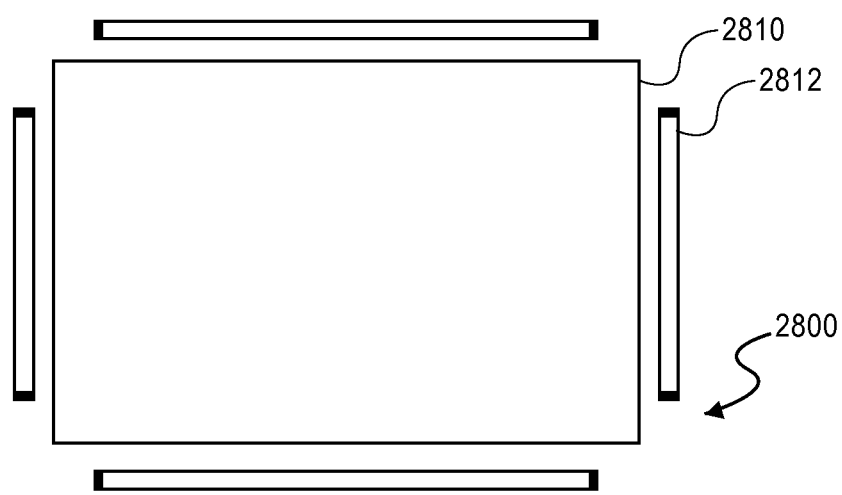
FIG. 28 depicts a conventional backlight comprising a light guide and four emitters.
Figure 29:
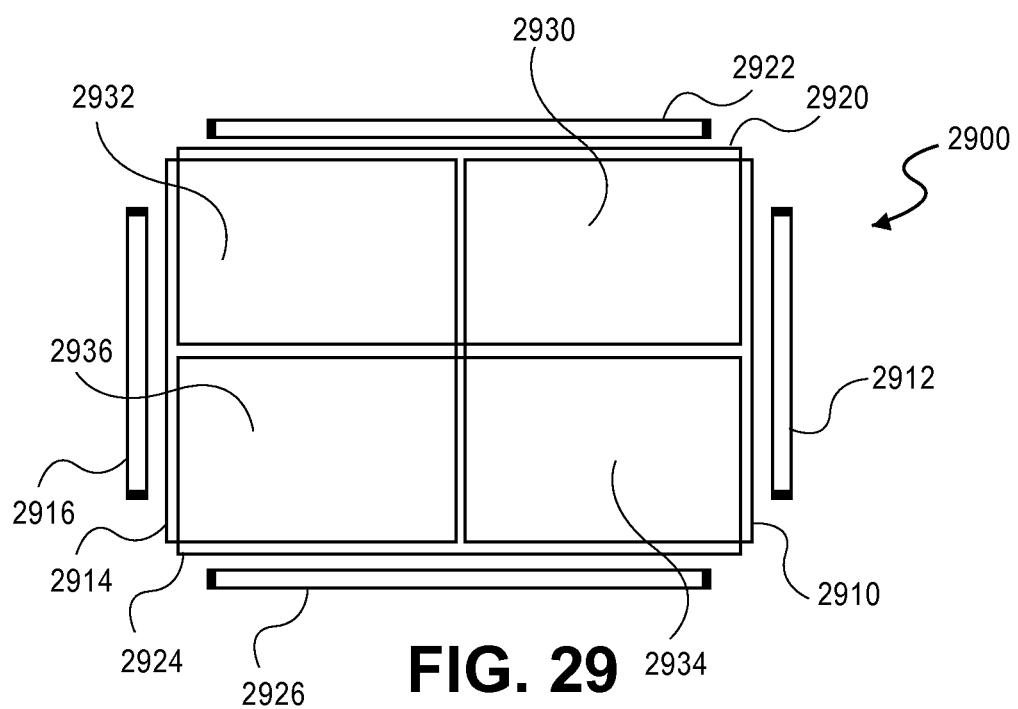
FIG. 29 depicts one embodiment of an improved backlight over the convention backlight of FIG. 28.

The process of segmenting the backlight may proceed further to increase the statistical improvement. FIG. 28 show a prior art backlight 2800 arrangement which is comprised of a flat light guide 2810 and four light emitters 2812. As before the light emitters 2812 may be CCFLs or LEDs. Novel backlight 2900 shown in FIG. 29 comprises four optically separate light guides 2910, 2914, 2920 & 2924. Light emitters 2912, 2916, 2922, & 2926 may then be exclusively coupled to light guides 2910, 2914, 2920 & 2924 respectively. For example, one pair of light guides 2920 & 2924 are divided along the horizontal axis, allowing for separation of the lower and upper half brightness level by independently controlled and exclusively coupled light emitters 2922 & 2926. Another pair of light guides 2910 & 2914 may lay either beneath or on top or pair 2922 & 2926. This pair of light guides 2910 & 2914 is divided along the vertical axis, allowing for separation of the right and left half brightness level by independently controlled exclusively coupled light emitters 2912 & 2916. This may allow all four of the light emitters 2912, 2916, 2922, & 2926 to have different brightness levels.

In operation, if one pixel in a quarter (e.g. in 2930) of the image were at full brightness, but the other three quarters of the image were at a lower brightness, at least that portion of the image may allow for a lower light emitter brightness. For example, suppose an image has a number of pixels on at full brightness in just one corner of the image, and the rest of the image is at a very low brightness. Assume that the full bright portion of the image occurs in the upper right corner. The upper light emitter 2922 and the right hand emitter 2912 would be turned on to full brightness while the lower light emitter 2926 and left hand emitter 2916 would be set at the very low brightness. The upper right hand quadrant 2930 would be illuminated at full brightness. The upper left hand 2932 and lower right hand 2934 quadrants would be illuminated at an intermediate brightness. The lower left hand quadrant 2936 would be illuminated at a very low brightness. Statistically, this arrangement may allow for lower overall average light emitter 2912, 2916, 2922, & 2926 brightness and power drain than the backlight 2800 in FIG. 28 with potential concomitant image improvement over the backlight 2700 in FIG. 27.

Likewise, the process of segmenting may proceed further to increase the statistical improvement of power and image quality. Shown in FIG. 30, a backlight 3000 may be formed from a matrix of overlapping light guides. In this example of the present invention, each quadrant is an independent matrix of light guides. Some number of the light guides 3020 with exclusively coupled light emitters 3022 could be primarily disposed in columns while some other number of the light guides 3010 with exclusively coupled light emitters 3012 could be primarily disposed in rows.

Figure 30:
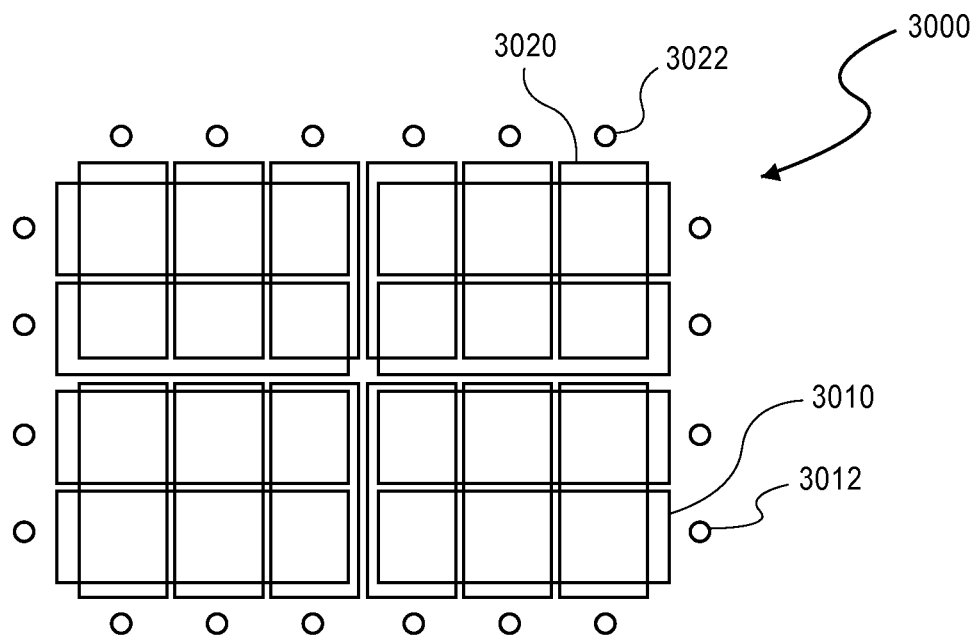
FIG. 30 depicts another embodiment of a novel segmented backlight for use in a display.

In this embodiment, to achieve approximately a N×M low resolution backlight, it is seen in FIG. 30 that this may be achieved by use of 2×(N+M) light guides and emitters—with two columns (e.g. at the right and left side of the backlight 3000) and two rows (e.g. at the top and bottom of backlight 3000) of emitters. In yet another embodiment, a similar N×M low resolution backlight is possible with the use of N+M light guides and emitters. This is achieved by use of only one column (e.g. at either the right or left side of the backlight) and one row of emitters (e.g. either the top or bottom of the backlight) and one light guide per row and column. Such an embodiment has the same number of matrix cross connections at the row and column intersections and may be a lower cost option. However, it may lose a bit of the statistical advantages of the backlight of FIG. 30 and the commensurate gain in power consumption. Additionally, as previously noted, emitters 3022 may be either white emitters or a combination of one or more colored emitters. Other embodiments making use of these principles are of course possible and are contemplated within the scope of the present application.

Figure 31:
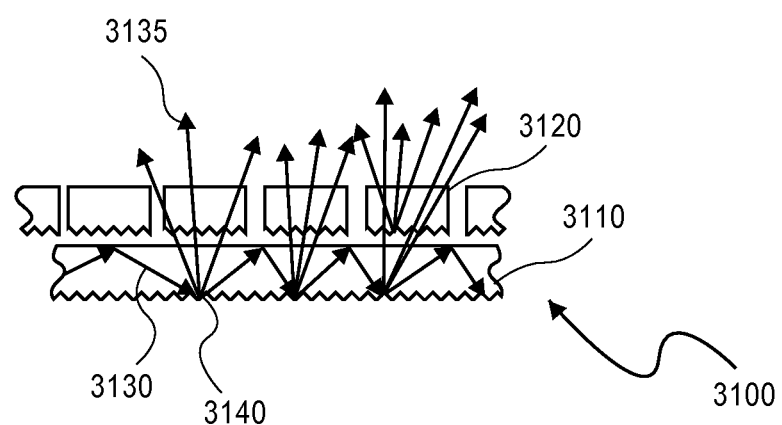
FIG. 31 shows a cross sectional view of across one light guide in one embodiment of a novel segmented backlight.

FIG. 31 shows a cross section of a backlight 3100 with one light guide 3110 primarily disposed in a row lying underneath a plurality of light guides 3120 disposed in columns. In the cross section of the backlight 3100, light ray beam 3130 is trapped in the light guide 3110 by total internal reflection until portions of the light rays 3135 are scattered, deflected into high angles that may escape by features 3140 on one surface of the light guide. These escaping light rays 3135 may pass through the overlying column light guides 3120. Likewise, light may also be trapped and subsequently scattered by the overlying light guides 3120. In operation, where both light guides are illuminated at full brightness, the scattered light from both light guides 3110 & 3120 will sum to full brightness. Where both are not illuminated, no light may be seen at their intersections. Where one light guide is illuminated and another is not, the light will sum to a lower value equal to the contribution from the illuminated light guide. Thus, a backlight made in accordance with the principles disclosed herein (e.g. backlight 200) may be considered, by analogy, as an N×M display with very high crosstalk in the rows and columns.

Figure 32A:
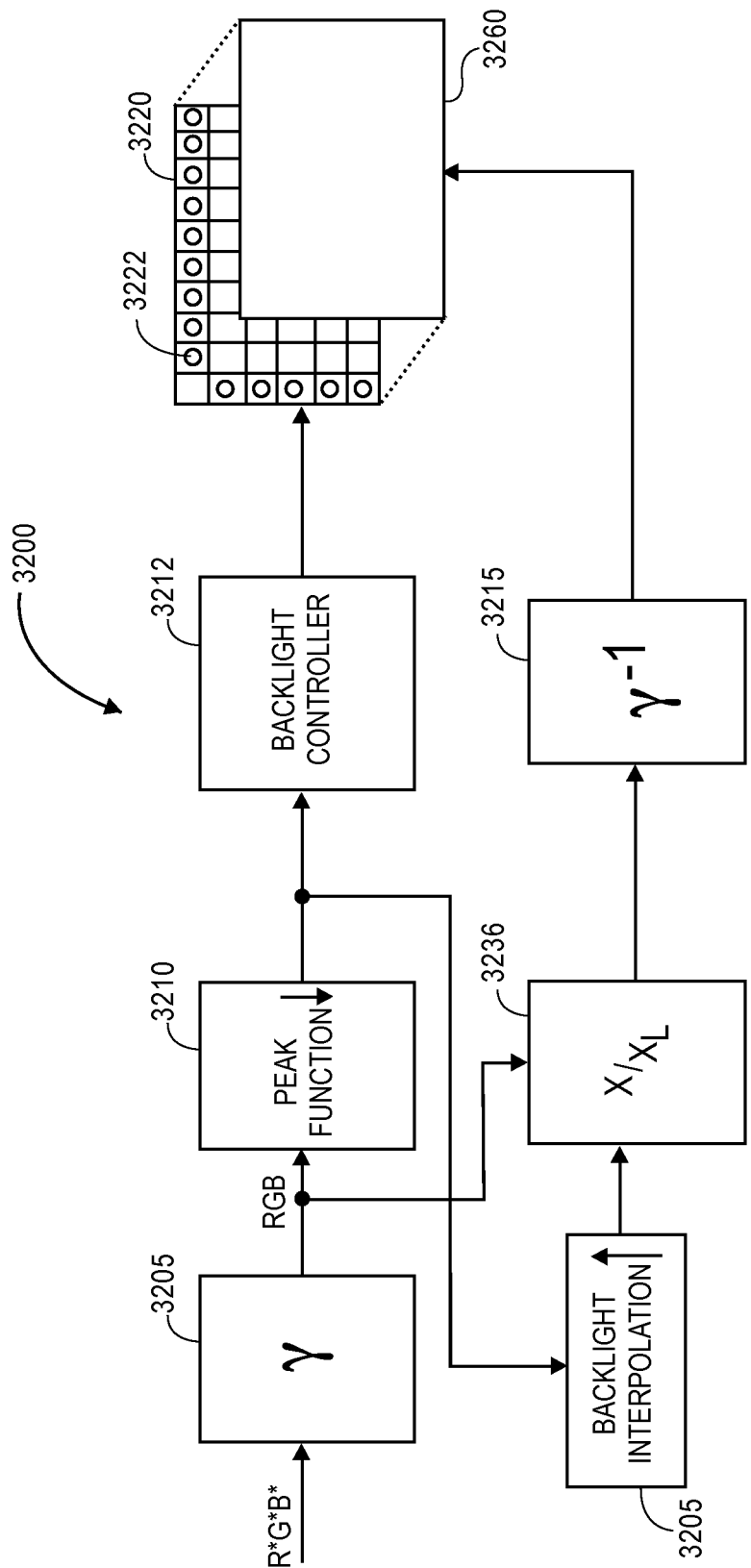
FIGS. 32A and 32B depict two display systems comprising novel segmented backlights in connection with a monochrome and a multiprimary colored front panel respectively.
Figure 32B:
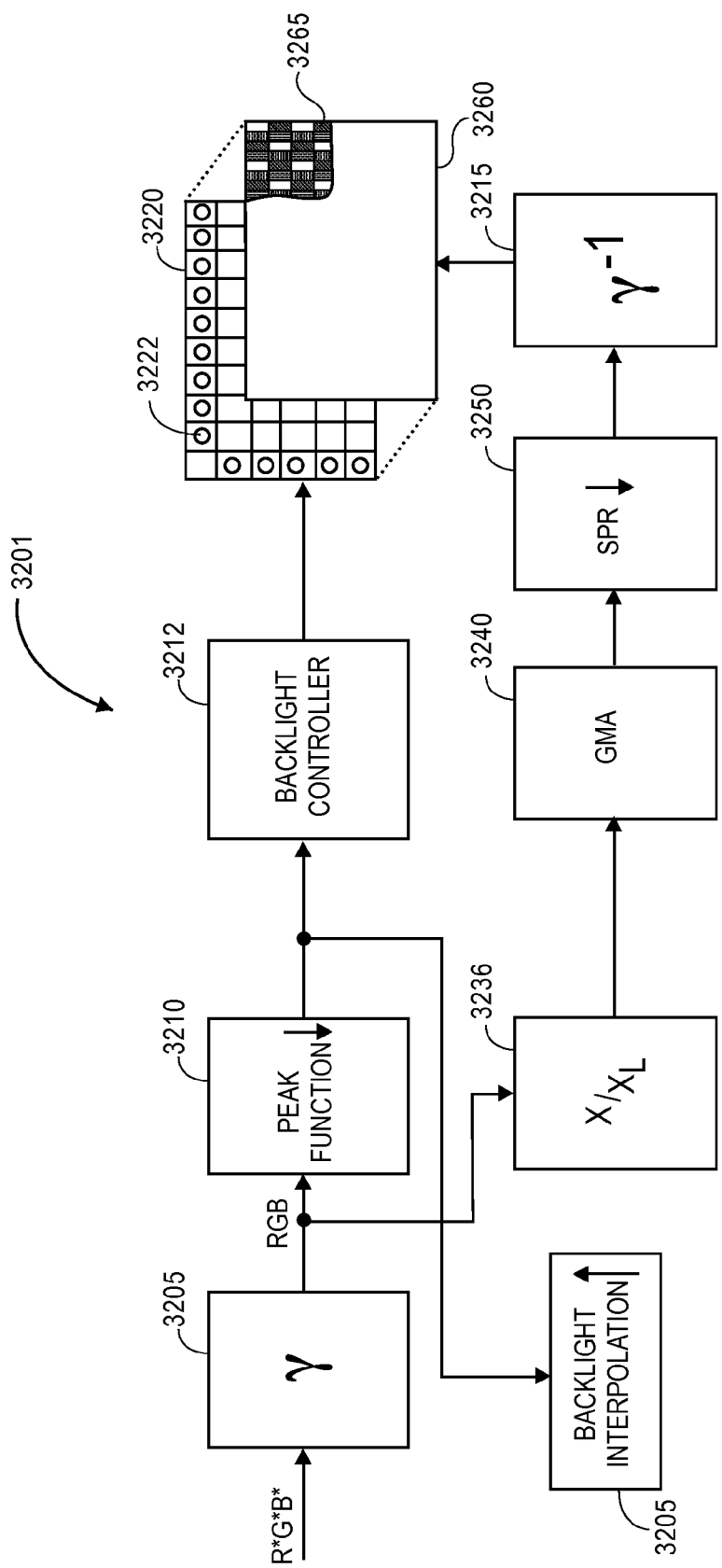
Figure 33:
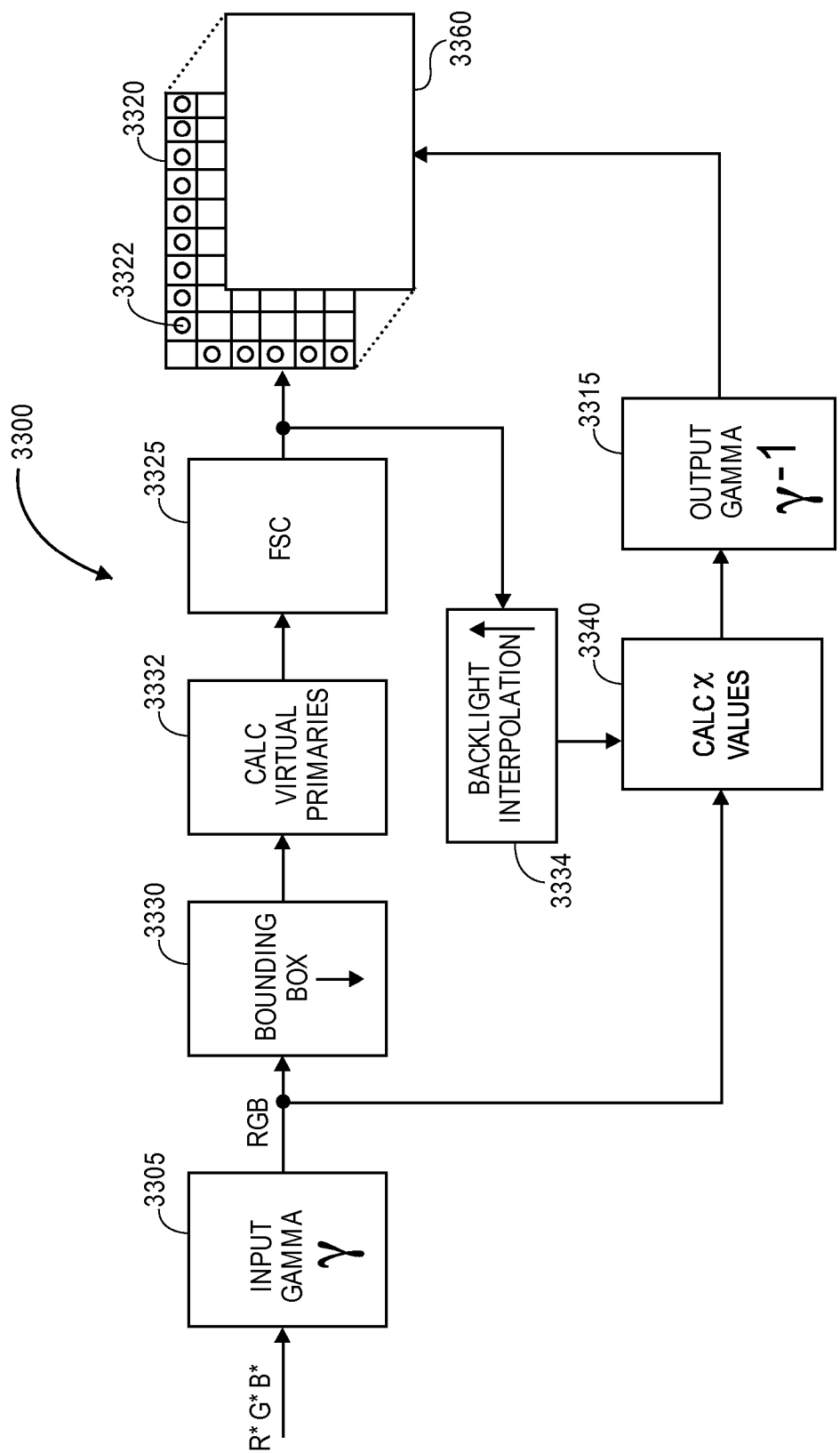
FIG. 33 depicts a display system comprising a novel segmented backlight in connection with a hybrid virtual primary-field sequential control system and methodology.

Such a segmented backlight with very high crosstalk may be advantageous for variety of display systems. For example, FIGS. 32A and 32B are two block diagrams of display systems might employ such a backlight, one with a monochrome front panel and one with a colored subpixelated front panel respectively. FIG. 32A depicts the block diagram of display system 3200 using a segmented backlight 3220 to illuminate a transmissive spatial light modulator 3260, such as a monochrome LCD. Typically, the spatial light modulator 3260 would be higher resolution than backlight 3220, but may be the same or even lower.

In operation, system 3200 could accept an input image data stream, such as e.g. a perceptually, gamma, digitally quantized R*G*B* image. Such data may be linearized by Gamma Function 3205. This linear RGB signal may be surveyed by Peak Function 3210 to find the peak brightness values of for pixels that map to, or lie within the area illuminated by, the rows and columns of the matrix backlight 3220. In one embodiment, light emitters 3222 could be broad spectrum, for instance, white light sources. In such a case, the RGB values may be surveyed for the maximum red, green, or blue values that map to each given column and each given row.

In another embodiment, light emitters 3222 could be comprised of independently controllable color primaries such as red, green, and blue. In such a case, the RGB values may be surveyed for the maximum red, green, and blue values that map to each given column and each given row independently. When the image to be rendered during a given frame is analyzed prior to assigning intensity values to individual colored emitters, there are certain degrees of freedom and constraints that may be taken into account. For merely one example, if in row M the maximum value for red across row M required by the image is a middle range intensity value and such maximum value is localized to, for example, one particular intersection of orthogonal light guides (say at (M, S) where S is the column number of that intersection), then that red intensity may be split between the red emitter for row M and the red emitter for column S.

One possible assignment of intensity values would be to set the red emitters of both column S and row M sufficiently such that each would separately contribute the required red intensity value at intersection (M,S)—and allow the front panel to restrict the amount of red light to the proper required level. However, such a choice might not be optimal from a power savings perspective. Another embodiment might be to assign all the red light from one red emitter (either row or column, if possible) and to reduce the amount in the other emitter. In such an embodiment, the uses of second order statistics might provide an improvement. For example, if it were the case that the middle range intensity value for red at (M, S) were also the local maximum across column S, then choice of red intensity for the two red emitters may be influenced by the next highest red intensity value required for column M and row S. The choice of intensity values for colored emitters would selected according to many possible optimization schemes—with the algorithm optimizing for many possible metrics, e.g. power savings, etc.

In addition to spatial considerations for assigning intensity values, temporal consideration may also be used—either alone or in combination with spatial considerations. For example, another mode of operation may be to scan rows or columns with the desired illumination. For example, the columns may be kept dark save for one column at a time, being illuminated for a brief time. This may proceed in an ordered or random fashion. It may be in an orderly sequence from top to bottom or bottom to top. Similarly, the rows may be scanned in an ordered or random fashion. It may be in an orderly sequence from right to left or left to right. This scanning sequence may be in phase or step with the address scanning of the spatial light modulator illuminated by the backlight such that it allows the modulator, such as LCD pixels, to reach desired transmittance values before being illuminated.

With continued reference to FIG. 32, Peak Function 3210 output may be a form of matrix encoded down sampled image, denoted by the down arrow. The peak values may then be sent to Backlight Controller 3212 and subsequently to the light emitters 3222 of the backlight 3220. The peak values may also be sent to Backlight Interpolation block 3205 which may calculate the illumination that is present under each pixel of the image to be rendered on the spatial light modulator 3260. Such calculations may be accomplished according to a theoretical model of illumination based upon image data values. Alternatively, the calculations may be based on empirical data of measured illumination according to image data values applied.

Backlight Interpolation 3205 output may be an upsampled image denoted by the up arrow representing the backlight 3220 illumination $X_L$. The linear RGB image values X may then be divided by the interpolated backlight illumination values $X_L$ in the $X/X_L$ block 3236. The $X/X_L$ image may then be gamma correction quantized to match the gamma of the display in the Gamma Correction ($\gamma^{-1}$) block 3215. When the backlight 3220 illumination $X_L$ is convolved with the $X/X_L$ image on the spatial light modulator 3260, the desired image X may then be reconstructed.

The matrix backlight may also improve subpixel rendered RGBW or other multiprimary display systems. FIG. 32B depicts a block diagram of a display system 3201 using segmented backlight 3220 to illuminate a transmissive multiprimary (e.g. RGBW, RGBC, RGBY and the like) color filtered 3265 spatial light modulator 3260 such as an LCD using one of the layouts taught in several of the co-owned patent applications mentioned above. An incoming perceptually, gamma, digitally quantized R*G*B* image is linearized by the Gamma Function 3205. The linear RGB signal is surveyed by the Peak Function 3210 to find the peak brightness values of pixel that map to, lie within the area illuminated by, the rows and columns of the matrix backlight 3220. For light emitters 3222 that are broad spectrum, for instance, white light sources, the RGB values may be surveyed for the maximum red, green, or blue values that map to each given column and each given row in a manner taught in (new backlight control app). For light emitters 3222 which are comprised of independently controllable color primaries such as red, green, and blue, the RGB values may be surveyed for the maximum red, green, and blue values that map to each given column and each given row independently. The Peak Function's 3210 output could be in a form of matrix encoded down sampled image, denoted by the down arrow. The peak values may then be sent to the Backlight Controller 3212 and subsequently to the light emitters 3222 of the backlight 3220. The peak values may also be sent to the Backlight Interpolation block 3205 which calculates the illumination that is present at each pixel of the image to be rendered on the spatial light modulator 3260.

The Backlight Interpolation's 3205 output may be an upsampled image denoted by the up arrow representing the backlight 3220 illumination $X_L$. The linear RGB image values X may be divided by the interpolated backlight illumination values $X_L$ in the $X/X_L$ block 3236. The RGB $X/X_L$ image may then be converted to an RGBW $X/X_L$ image in the Gamut mapping Algorithm (GMA) block 3240 using any suitable GMA method. This RGBW $X/X_L$ image may then be subpixel rendered, possibly using any suitable method described herein. The subpixel rendered RGBW $X/X_L$ image may then be gamma correction quantized to match the gamma of the display in the Gamma Correction ($\gamma^{-1}$) block 3215. When the backlight 3220 illumination $X_L$ is convolved with the subpixel rendered RGBW $X/X_L$ image on the spatial light modulator 3260, the desired image X may be reconstructed.

The matrix backlight may also improve Field Sequential Color systems. Consider the block diagram 3300 of a display system using a segmented backlight 3320 to illuminate a transmissive spatial light modulator 3360. An incoming perceptually, gamma, digitally quantized R*G*B* image may be linearized by the Gamma Function 3305. The linear RGB signal may be surveyed by the Bounding Box block 3330 to find the smallest box that bounds the color and brightness values of pixels that map to, lie within the area illuminated by, the rows and columns of the matrix backlight 3320. The values from the Bounding Box block 3330 may be used to calculate a set of virtual primaries in the Calc Virtual Primaries block 3332. These virtual primary values may then be used by the FSC to control the field sequential color brightness values of the light emitters 3322 in the segmented backlight 3320. It may be noted that these emitters may be comprised of red, green, blue LEDs, or red, green, blue, and cyan (or emerald green) LEDs in this or in any herein mentioned embodiment. The color and brightness of the light emitters 3320 may also be sent to the Backlight Interpolation block 3334 which calculates the illumination that is present under each pixel of the image to be rendered on the spatial light modulator 3360.

The Backlight Interpolation's 3334 output may be an upsampled image denoted by the up arrow. Using the interpolated illumination and linear RGB values to be rendered, the $\chi$ values are found by the Calc $\chi$ Values block 3340. These $\chi$ values are the relative transmission values that when convolved with the backlight illumination values for each of the color fields may sum substantially to the desired color to be rendered on the display. The $\chi$ values may be gamma corrected and quantized to match the transmissive spatial light modulator's 3360 quantized electro-optical transfer function by the Output Gamma block 3315.

It may be instructive to consider the case of a black&white movie on TV with a color station icon in the corner. Most of the columns and rows of the matrix light backlight 3320 will have virtual primaries that collapse to varying levels of grey. The column(s) and row(s) that intersect at the icon may have virtual primaries that have a large color gamut. At the intersection, this gamut may be substantially fully available. Those portions of each of the column(s) and row(s) that intersect with the columns and rows illuminated by levels of grey may blend in a substantially linearly manner with the wide color gamut virtual primaries to form pastel virtual primaries with a reduced color gamut spread. The Backlight Interpolation block 3334 will note this and the Calc χ Values block 3340 will compensate accordingly. The final result may be a black&white image with a substantially full color icon in the corner, possibly with very little, if any, color break-up visible in the rendered image.

While the techniques and implementations have been described with reference to exemplary embodiments, it will be understood by those skilled in the art that various changes may be made and equivalents may be substituted for elements thereof without departing from the scope of the appended claims. In addition, many modifications may be made to adapt a particular situation or material to the teachings without departing from the essential scope thereof. Therefore, the particular embodiments, implementations and techniques disclosed herein, some of which indicate the best mode contemplated for carrying out these embodiments, implementations and techniques, are not intended to limit the scope of the appended claims.

What is claimed is:

1. A display system comprising:
   a spatial light modulator for displaying an output color image formed from input image color data, the spatial light modulator substantially comprising a subpixel repeating group including a first subpixel configured to transmit a light having a first primary color, a second subpixel configured to transmit a light having a second primary color, a third subpixel configured to transmit a light having a third primary color, and a clear subpixel configured to selectively transmit a light substantially having one of the first to third primary colors, the first to third primary colors being different from each other;
   a plurality of individually addressable colored light emitters disposed as a backlight to provide light for forming the output color image on the spatial light modulator, each light emitter configured to produce light substantially having one of the first to third primary colors; and
   a controller circuitry for controlling light from the plurality of individually addressable colored light emitters, the controller circuitry configured to use the input image color data to determine a value for each of the individually addressable colored light emitters such that an output image color in one of the subpixels of the spatial light modulator depends on the color of the light from the light emitters,
   wherein the controller circuitry is configured to control the spatial light modulator and the light emitters such that the clear subpixel selectively transmits the light having one of the first to third primary colors as desired.

2. The display system of claim 1 wherein the plurality of individually addressable colored light emitters is configured to produce light in the plurality of primary colors of the subpixel repeating group.

3. The display system of claim 1 wherein the plurality of individually addressable colored light emitters is configured to produce light in the saturated primary colors of the subpixel repeating group.

4. The display system of claim 3 wherein the plurality of individually addressable colored light emitters is tuned to produce light having a specific range of wavelengths for the saturated primary color.

5. The display system of claim 1 wherein the plurality of individually addressable colored light emitters are configured to produce light in red, green, blue and cyan colors.

6. The display system of claim 1 wherein the controller circuitry is configured to control the color of the light from the light emitters such that the clear subpixel functions as a first backlight controlled primary color in a first region of the output color image and functions as a second backlight controlled primary color in a second region of the output color image.

7. The display system of claim 1 wherein the controller circuitry is configured to perform a peak function operation using the input image color data to produce, for each light emitter in a first color, a peak value of the first color in a region of the input image color data corresponding to a local area of a point spread function support of the light emitter.

8. The display system of claim 1 wherein the controller circuitry is configured to further use the values for each of the individually addressable colored light emitters to produce a low resolution version of the input image color data.

9. The display system of claim 1 wherein the spatial light modulator is a liquid crystal display panel.

10. The display system of claim 1 wherein the plurality of individually addressable colored light emitters comprises an array of light emitting diodes.

11. The display system of claim 1 wherein the input image color data is specified as one of red, green and blue color values, red, green, blue, and cyan color values, red, green, blue, and emerald color values, and YCbCr color values.

12. A display system comprising:
    a multi-primary spatial light modulator for displaying an output color image formed from an input signal comprising a frame of color input values, the frame having a first image resolution, the spatial light modulator substantially comprising a subpixel repeating group including a first subpixel configured to transmit a light having a first primary color, a second subpixel configured to transmit a light having a second primary color, a third subpixel configured to transmit a light having a third primary color, and a clear subpixel configured to selectively transmit a light substantially having one of the first to third primary colors, the first to third primary colors being different from each other;
    a plurality of individually addressable colored light emitters disposed as a backlight to provide light for forming the output color image on the spatial light modulator, each light emitter configured to produce light colors substantially having one of the first to third primary colors;
    a circuitry for carrying out a first gamut mapping operation for converting each color input value to a first multi-primary color signal in the color space of the plurality of individually addressable colored light emitters, the first gamut mapping operation producing a frame of converted color values;
    a controller circuitry for filtering the frame of converted color values to produce a frame of filtered color values having a second, lower resolution than the frame of color input values, the individually addressable colored light emitters displaying the frame of filtered color values;

an interpolator for carrying out an interpolation operation for calculating brightness values and color values from the frame of filtered color values at each location of the frame of input color values;

a circuitry for carrying out a second gamut mapping operation for converting each color input value to a second multi-primary color signal in the color space of the spatial light modulator using the brightness values and color values calculated by the interpolation means; and a subpixel renderer for carrying out a subpixel rendering operation for filtering the second multi-primary color signal for display on the spatial light modulator at the same time as the individually addressable colored light emitters display the frame of filtered color values.

13. The display system of claim 12 wherein the color input values are specified according to a set of input primary colors, and wherein the first gamut mapping operation converts each color input value from the color space of the input primary colors to the first multi-primary color signal in the color space of the plurality of individually addressable colored light emitters.

14. The display system of claim 12 wherein the controller circuitry is configured to filter the frame of converted color values using a maximum brightness function that computes a maximum brightness in an area of the frame of input color values overlying a first one of the plurality of individually addressable colored light emitters.

15. The display system of claim 12 wherein the controller circuitry is configured to filter the frame of converted color values using one of a sync function and a windowed sync function.

16. The display system of claim 12 wherein the first gamut mapping operation includes a metamer select function for selecting a metamer for the first multi-primary color signal.

17. The display system of claim 12 wherein the interpolation operation uses a point spread function of one of the plurality of individually addressable colored light emitters for calculating brightness values and color values from the frame of filtered color values at each location of the frame of input color values.

18. A display system comprising:
a spatial light modulator for displaying an output color image formed from an input signal comprising a set of color input values, the spatial light modulator substantially comprising a set of individually controllable transmissive elements including a first transmissive element configured to transmit a light having a first primary color, a second transmissive element configured to transmit a light having a second primary color, a third transmissive element configured to transmit a light having a third primary color, and a clear transmissive element configured to selectively transmit a light substantially having one of the first to third primary colors as desired, the first to third primary colors being different from each other;

a plurality of individually addressable colored light emitters disposed as a backlight to provide light for forming a color image on the spatial light modulator, each light emitter configured to produce light substantially having one of the first to third primary colors;

for a plurality of regions, said regions comprising a set of point spread functions of a set of said light emitter, circuitry for carrying out a first mapping operation for selecting a set of virtual primaries that bound each color input value within each said region, said virtual primaries comprising a plurality of intensities of said plurality of said light emitters within said set of point spread functions;

field sequential control circuitry for controlling the duration and illumination of said virtual primaries over a set of fields comprising an intermediate color signal formed by said light emitters within each said region to produce an intermediate color image onto said spatial light modulator; and a circuitry for controlling said set of transmissive elements within each said region to modulate said intermediate color image to produce said output color image.

19. The display system of claim 18 wherein one of said plurality of regions is the entire set of transmissive elements upon said spatial light modulator.

20. The display system of claim 18 wherein said set of virtual primaries is selected to optimize the performance of said display system according to a set of operating criteria.

21. The display system of claim 20 wherein said set of operating criteria comprises at least one of a group, said group comprising: reducing flicker, reducing power consumption, reducing color breakup, increasing dynamic range, and reducing quantization error.

22. The display system of claim 20 wherein said set of virtual primaries is selected to minimize the difference of luminance of said virtual primaries.

23. The display system of claim 20 wherein said field sequential control circuitry controls the duration and illumination of said virtual primaries to optimize the performance of said display system according to a set of operating criteria.

24. The display system of claim 23 wherein said set of operating criteria comprises at least one of a group, said group comprising reducing out of gamut conditions and reducing power consumption.

25. The display system of claim 18 wherein said circuitry for assigning further comprises circuitry for selecting a set of coefficient values for each transmissive element to control the modulation of said intermediate color image for each field in which a virtual primary is illuminated.

26. A display system comprising:
a backlight outputting light in accordance with a first control signal, said backlight comprising:
a plurality of N×M light guides, wherein N light guides are disposed in a first direction and M light guides are disposed a second direction, said light guides overlapping and forming an N×M set of optically communicating intersections;
a plurality of N×M individually addressable light emitter units, each of said N×M light emitter units being a point light source associated with and optically connected to one of said N×M light guides respectively, each light emitter unit capable of producing broad spectrum light in one of a plurality of colors;
a spatial light modulator for displaying an output color image, said spatial light modulator receiving light from said backlight and modulating said light in accordance to a second control signal and comprising a subpixel repeating group including a first subpixel configured to transmit a light having a first primary color, a second subpixel configured to transmit a light having a second primary color, a third subpixel configured to transmit a light having a third primary color, and a clear subpixel configured to selectively transmit a light substantially having one of the first to third primary colors, the first to third primary colors being different from each other; and
a controller circuitry for providing said first signal and said second signal, said controller circuitry configured for receiving input color image data and determining said first and said second control signals and outputting said first signal to said plurality of individually addressable light emitter units and outputting said second control signal to said spatial light modulator such that the combination of said light from said backlight and modulated by said spatial light modulator produces an output image based upon said input color image data, wherein each of said N×M light emitter units is configured to produce light substantially having one of the first to third primary colors, and wherein the controller circuitry is configured to control the spatial light modulator and the light emitter units such that the clear subpixel selectively transmits a light having one of the primary colors of the color subpixels as desired.

27. The display system of claim 26 wherein said light emitter units comprise broad spectrum CCFL tubes.

28. The display system of claim 26 wherein said light emitter units comprise broad spectrum LED emitters.

29. The display system of claim 26 wherein said light emitter units comprise a set of individually addressable colored LED emitters, said set capable of emitting broad spectrum light.

30. The display system of claim 26 wherein said spatial light modulator comprises a monochrome LCD display.

31. The display system of claim 26 wherein said spatial light modulator comprises a multiprimary LCD display.

\* \* \* \* \*